United States Patent
Oyagi et al.

(10) Patent No.: US 10,764,565 B2
(45) Date of Patent: Sep. 1, 2020

(54) COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(71) Applicant: NINTENDO CO., LTD., Kyoto (JP)

(72) Inventors: Yasuyuki Oyagi, Kyoto (JP); Junji Morii, Kyoto (JP); Taku Matoba, Kyoto (JP); Katsuhisa Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/654,575

(22) Filed: Oct. 16, 2019

(65) Prior Publication Data
US 2020/0053348 A1 Feb. 13, 2020

Related U.S. Application Data

(63) Continuation of application No. 15/372,148, filed on Dec. 7, 2016, now Pat. No. 10,506,218, which is a
(Continued)

(30) Foreign Application Priority Data

| Mar. 12, 2010 | (JP) | 2010-056513 |
| Dec. 16, 2010 | (JP) | 2010-279994 |
| Dec. 28, 2010 | (JP) | 2010-293291 |

(51) Int. Cl.
*H04N 13/31* (2018.01)
*G06F 1/16* (2006.01)
(Continued)

(52) U.S. Cl.
CPC ............. *H04N 13/31* (2018.05); *A63F 13/26* (2014.09); *A63F 13/92* (2014.09); *G06F 1/1692* (2013.01);
(Continued)

(58) Field of Classification Search
None
See application file for complete search history.

(56) References Cited

U.S. PATENT DOCUMENTS 5,577,176 A * 11/1996 Friedman ................ G06F 3/038
345/427
5,684,529 A  11/1997 Yoshimi et al.
(Continued)

FOREIGN PATENT DOCUMENTS

| EP | 1 720 131 | 11/2006 |
| EP | 2 157 545 | 2/2010 |
(Continued)

OTHER PUBLICATIONS

Office Action dated Jan. 12, 2018 received in U.S. Appl. No. 13/046,027.
(Continued)

*Primary Examiner* — Ke Xiao
*Assistant Examiner* — Jed-Justin Imperial
(74) *Attorney, Agent, or Firm* — Scully, Scott, Murphy & Presser, P.C.

(57) ABSTRACT

An image taken of a three-dimensional virtual space including a virtual designating object and an object arranged therein is displayed. When the position of the virtual designating object does not coincide with the object, the virtual designating object is arranged in a predetermined orientation. The position of the virtual designating object is determined based on an acquired designated position on a two-dimensional image, which is generated from the three-
(Continued)

dimensional virtual space taken by a virtual camera. When the position of the virtual designating object corresponds to the object, the displayed orientation of the virtual designating object is based on the position.

17 Claims, 25 Drawing Sheets

Related U.S. Application Data continuation of application No. 13/046,027, filed on Mar. 11, 2011, now abandoned.

(51) Int. Cl.
G06F 3/0481 (2013.01)
G06F 3/0482 (2013.01)
G06F 3/0484 (2013.01)
A63F 13/26 (2014.01)
A63F 13/92 (2014.01)
H04N 13/243 (2018.01)
H04N 13/398 (2018.01)
G06F 3/14 (2006.01)
G06T 15/20 (2011.01)
G06T 19/20 (2011.01)
H04N 13/324 (2018.01)
G02F 1/1333 (2006.01)
G06F 3/041 (2006.01)
G06F 3/045 (2006.01)
G06F 3/147 (2006.01)

(52) U.S. Cl.
CPC .......... *G06F 3/0481* (2013.01); *G06F 3/0482* (2013.01); *G06F 3/04845* (2013.01); *G06F 3/1423* (2013.01); *G06T 15/205* (2013.01); *G06T 19/20* (2013.01); *H04N 13/243* (2018.05); *H04N 13/398* (2018.05); *G02F 1/13338* (2013.01); *G06F 3/045* (2013.01); *G06F 3/0412* (2013.01); *G06F 3/147* (2013.01); *G06T 2219/016* (2013.01); *H04N 13/324* (2018.05)

(56) References Cited

U.S. PATENT DOCUMENTS

| | | | |
|---|---|---|---|
| 5,964,830 A | 10/1999 | Durrett | |
| 6,020,891 A | 2/2000 | Rekimoto | |
| 6,057,833 A | 5/2000 | Heidmann et al. | |
| 6,160,574 A | 12/2000 | Oba et al. | |
| 6,252,624 B1 | 6/2001 | Yuasa et al. | |
| 6,313,864 B1 | 11/2001 | Tabata et al. | |
| 6,325,287 B1 | 12/2001 | Nakajima et al. | |
| 6,342,900 B1 | 1/2002 | Ejima et al. | |
| 6,384,859 B1 | 5/2002 | Matsumoto et al. | |
| 6,474,819 B2 | 11/2002 | Yoder et al. | |
| 6,708,046 B1 | 3/2004 | Takagi | |
| 6,820,056 B1 | 11/2004 | Harif | |
| 6,897,865 B2 | 5/2005 | Higashiyama | |
| 7,371,163 B1 | 5/2008 | Best | |
| 7,374,490 B2 | 5/2008 | Tahara et al. | |
| 7,519,218 B2 | 4/2009 | Takemoto et al. | |
| 7,666,096 B2 | 2/2010 | Novelo | |
| 7,843,429 B2 | 11/2010 | Pryor | |
| 8,115,814 B2 | 2/2012 | Iwase et al. | |
| 8,189,038 B2 | 5/2012 | DeCusatis et al. | |
| 8,202,094 B2 | 6/2012 | Spector | |
| 8,305,428 B2 | 11/2012 | Hu | |
| 8,384,770 B2 | 2/2013 | Konno et al. | |
| 8,456,466 B1 | 6/2013 | Reisman et al. | |
| 8,512,152 B2 | 8/2013 | Ehara et al. | |
| 8,633,947 B2 | 1/2014 | Kitahara | |
| 8,780,183 B2 | 7/2014 | Ito | |
| 8,854,356 B2 | 10/2014 | Oyagi et al. | |
| 8,894,486 B2 | 11/2014 | Konno et al. | |
| 8,952,956 B2 | 2/2015 | Sato et al. | |
| 9,128,293 B2 | 9/2015 | Ohta | |
| 9,278,281 B2 | 3/2016 | Ito et al. | |
| 2001/0019946 A1 | 9/2001 | Okuda | |
| 2002/0008906 A1 | 1/2002 | Tomita | |
| 2002/0078291 A1 | 6/2002 | Sutton et al. | |
| 2002/0187833 A1 | 12/2002 | Nishiyama et al. | |
| 2003/0174204 A1 | 9/2003 | Otani et al. | |
| 2004/0095357 A1 | 5/2004 | Oh et al. | |
| 2004/0240709 A1 | 12/2004 | Shoemaker | |
| 2005/0078108 A1 | 4/2005 | Swift et al. | |
| 2005/0131857 A1 | 6/2005 | Fujiki et al. | |
| 2005/0164784 A1 | 7/2005 | Yamamoto et al. | |
| 2005/0176486 A1 | 8/2005 | Nishimura et al. | |
| 2005/0202869 A1 | 9/2005 | Miyamoto et al. | |
| 2005/0209525 A1 | 9/2005 | Bojovic et al. | |
| 2005/0239521 A1 | 10/2005 | Harada et al. | |
| 2005/0253924 A1 | 11/2005 | Mashitani | |
| 2005/0270368 A1 | 12/2005 | Hashimoto | |
| 2006/0038833 A1 | 2/2006 | Mallinson et al. | |
| 2006/0060463 A1 | 3/2006 | Tokusashi | |
| 2006/0119597 A1 | 6/2006 | Oshino | |
| 2006/0171582 A1 | 8/2006 | Eichhorn | |
| 2006/0192776 A1 | 8/2006 | Nomura et al. | |
| 2006/0203085 A1 | 9/2006 | Tomita | |
| 2007/0001003 A1 | 1/2007 | Lee et al. | |
| 2007/0018968 A1 | 1/2007 | Iwamoto et al. | |
| 2007/0111803 A1 | 5/2007 | Moro et al. | |
| 2007/0146325 A1* | 6/2007 | Poston ................ | G06F 3/0317 345/163 |
| 2007/0273644 A1 | 11/2007 | Mondine Natucci | |
| 2008/0070684 A1 | 3/2008 | Haigh-Hutchinson | |
| 2008/0071559 A1 | 3/2008 | Arrasvuori | |
| 2008/0100620 A1 | 5/2008 | Nagai et al. | |
| 2008/0199046 A1 | 8/2008 | Sasagawa et al. | |
| 2008/0222555 A1 | 9/2008 | Coyne | |
| 2008/0225007 A1 | 9/2008 | Nakadaira et al. | |
| 2008/0240549 A1 | 10/2008 | Koo et al. | |
| 2008/0284842 A1 | 11/2008 | Hu | |
| 2009/0027330 A1 | 1/2009 | Aida | |
| 2009/0059497 A1 | 3/2009 | Kuwahara et al. | |
| 2009/0060490 A1 | 3/2009 | Kuwahara et al. | |
| 2009/0070476 A1 | 3/2009 | Brackx et al. | |
| 2009/0163274 A1 | 6/2009 | Kando | |
| 2009/0224999 A1 | 9/2009 | Kuwahara et al. | |
| 2009/0275366 A1 | 11/2009 | Schilling | |
| 2009/0278764 A1 | 11/2009 | Kuwahara et al. | |
| 2009/0278974 A1 | 11/2009 | Kuwahara et al. | |
| 2009/0284584 A1 | 11/2009 | Wakabayashi et al. | |
| 2009/0285484 A1 | 11/2009 | Mallinson et al. | |
| 2009/0295743 A1 | 12/2009 | Nakajoh | |
| 2010/0020222 A1 | 1/2010 | Jones et al. | |
| 2010/0033429 A1 | 2/2010 | Olivan Bescos | |
| 2010/0048290 A1 | 2/2010 | Baseley et al. | |
| 2010/0115455 A1 | 5/2010 | Kim | |
| 2010/0257252 A1 | 10/2010 | Dougherty et al. | |
| 2010/0316367 A1 | 12/2010 | Kuwahara et al. | |
| 2011/0018828 A1 | 1/2011 | Wu et al. | |
| 2011/0034103 A1 | 2/2011 | Fong et al. | |
| 2011/0157159 A1 | 6/2011 | Chen et al. | |
| 2011/0175928 A1 | 7/2011 | Hashimoto | |
| 2011/0185299 A1 | 7/2011 | Hinckley et al. | |
| 2011/0209102 A1 | 8/2011 | Hinckley et al. | |
| 2011/0209104 A1 | 8/2011 | Hinckley et al. | |
| 2011/0221750 A1 | 9/2011 | Sato et al. | |
| 2011/0304702 A1 | 12/2011 | Ito | |
| 2011/0304703 A1 | 12/2011 | Ito | |

FOREIGN PATENT DOCUMENTS

| | | |
|---|---|---|
| EP | 2 172 252 | 4/2010 |
| EP | 2 187 295 | 5/2010 |
| JP | 4-180180 | 6/1992 |
| JP | 6-339155 | 12/1994 |
| JP | 9-74573 | 3/1997 |
| JP | 9-192349 | 7/1997 |

(56) References Cited

FOREIGN PATENT DOCUMENTS

| | | |
|---|---|---|
| JP | 9-201472 | 8/1997 |
| JP | 10-51711 | 2/1998 |
| JP | 10-174127 | 6/1998 |
| JP | 2000-069404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-223458 | 8/2002 |
| JP | 2002-230586 | 8/2002 |
| JP | 2002-281526 | 9/2002 |
| JP | 2003-067784 | 3/2003 |
| JP | 2003-107603 | 4/2003 |
| JP | 2003-264851 | 9/2003 |
| JP | 2003-348621 | 12/2003 |
| JP | 2004-007214 | 1/2004 |
| JP | 2004-109330 | 4/2004 |
| JP | 2004-126116 | 4/2004 |
| JP | 2004-287902 | 10/2004 |
| JP | 2005-020559 | 1/2005 |
| JP | 2005-073038 | 3/2005 |
| JP | 2005-110120 | 4/2005 |
| JP | 2005-122572 | 5/2005 |
| JP | 2005-151162 | 6/2005 |
| JP | 2005-165776 | 6/2005 |
| JP | 2005-218779 | 8/2005 |
| JP | 2005-250950 | 9/2005 |
| JP | 2005-286714 | 10/2005 |
| JP | 2006-024175 | 1/2006 |
| JP | 2006-033476 | 2/2006 |
| JP | 2006-060516 | 3/2006 |
| JP | 2006-072667 | 3/2006 |
| JP | 2006-086099 | 3/2006 |
| JP | 2006-129929 | 5/2006 |
| JP | 2006-271663 | 10/2006 |
| JP | 2007-012025 | 1/2007 |
| JP | 2007-256960 | 10/2007 |
| JP | 2008-502206 | 1/2008 |
| JP | 2008-068060 | 3/2008 |
| JP | 2008-077437 | 4/2008 |
| JP | 2008-510254 | 4/2008 |
| JP | 2008-146109 | 6/2008 |
| JP | 2008-521110 | 6/2008 |
| JP | 2009-048658 | 3/2009 |
| JP | 2009-070370 | 4/2009 |
| JP | 2009-089435 | 4/2009 |
| JP | 4260215 | 4/2009 |
| JP | 2009-148466 | 7/2009 |
| JP | 4358181 | 8/2009 |
| JP | 2009-205556 | 9/2009 |
| JP | 2009-223904 | 10/2009 |
| JP | 2009-278456 | 11/2009 |
| JP | 2010-505175 | 2/2010 |
| JP | 2010-046554 | 3/2010 |
| JP | 2010-170316 | 8/2010 |
| JP | 2010-532120 | 9/2010 |
| JP | 2010-239568 | 10/2010 |
| JP | 2010-244575 | 10/2010 |
| WO | 03/105450 | 12/2003 |
| WO | 2008/013352 | 1/2008 |
| WO | 2008/038215 | 4/2008 |

OTHER PUBLICATIONS

"How to Repair DS Hinge and Shell", youtube.com, Mar. 11, 2005, https://www.youtube.com/watch?v=HxHpQTxCcT0.
"MacBook Pro", Wikepedia, Jun. 9, 2010, pp. 1-19, XP-002722879.
"Nintendo DS", Wikepedia, Jun. 10, 2010, pp. 1-13, XP-002722882.
Bookholt, A., "MacBook Pro 15", Unibody Mid 2010 LCD Replacement, ifixit.com, Apr. 13, 2010, pp. 1-27, XP-002722878.
Liszewski, A., "Hands-On With the Nintendo DSI", ohgizmo.com, May 6, 2010, pp. 1-8, XP-002722881.

Explanation of Circumstances concerning Accelerated Examination in Japanese App. No. 2011-68400 dated Apr. 18, 2011.
Extended European Search Report dated Oct. 1, 2012 received in European Patent Application No. 11150625.9.
Extended European Search Report dated Jan. 20, 2015 received in European Patent Application No. 11154362.5.
Extended European Search Report dated Jan. 5, 2015 received in European Patent Application No. 11157841.5.
Extended European Search Report dated Aug. 29, 2011 received in European Patent Application No. 11168392.6.
Chen, J., "Open Gal", gizmodo.com, Apr. 20, 2010, pp. 1-17, XP-002722880.
Kato et al., "An Augmented Reality System and its Calibration based on Marker Tracking", Transactions of the Virtual Reality Society of Japan, vol. 4, No. 4, 1999, pp. 607-616 (10 pages).
Kato et al., "Marker Tracking and HMD Calibration for a Video-Based Augmented Reality Conferencing System", iwar, pp. 85, 2nd IEEE and ACM International Workshop on Augmented Reality, 1999 (10 pages).
Notice of Allowance dated Jun. 11, 2012 received in U.S. Appl. No. 13/006,039.
Report on Nintendo DS Lite Hardware, Mar. 2, 2006, download from the internet, with a partial English ranslation (13 pages).
Report on Nintendo DS Lite Hardwire, Mar. 2, 2006, (5 pages), http://pc.watch.impress.co.jp/docs/2006/0302/nintendo.htm.
Office Action dated Apr. 25, 2013 received in U.S. Appl. No. 12/862,119.
Office Action dated Sep. 20, 2012 received in U.S. Appl. No. 12/862,119.
Office Action dated Mar. 29, 2013 received in U.S. Appl. No. 12/946,248.
Office Action dated Nov. 9, 2012 received in U.S. Appl. No. 12/946,248.
Office Action dated Apr. 2, 2014 received in U.S. Appl. No. 13/006,055.
Office Action dated Aug. 1, 2013 received in U.S. Appl. No. 13/006,055.
Office Action dated Jun. 8, 2012 received in U.S. Appl. No. 13/006,055.
Office Action dated Aug. 22, 2013 received in U.S. Appl. No. 13/029,282.
Office Action dated Jan. 21, 2014 received in U.S. Appl. No. 13/029,282.
Office Action dated May 23, 2013 received in U.S. Appl. No. 13/158,736.
Wu et al., "Picking and Snapping for 3D Input Devices", Proceedings of the XVI Brazilian Symposium on Computer Graphics and Image Processing (SIBGRAPI'03), IEEE Computer Society, 2003 (8 pages).
Yokoya et al., "Stereo Vision Based Video See-through Mixed Reality", Mixed Reality, Merging Real and Virtual Worlds, Proceedings of International Symposium on Mix Reality, Merging Real and Virtual Worlds, Jan. 1, 1999, pp. 131-145 (15 pages).
Yoon et al., "Interactive Training for Synthetic Characters", American Association for Artificial Intelligence, 1999 (6 pages).
Office Action dated Jun. 30, 2017 received in U.S. Appl. No. 13/046,027.
Office Action dated Jul. 26, 2018 received in U.S. Appl. No. 15/372,148.
Notice of Allowance dated Jul. 9, 2019 received in U.S. Appl. No. 15/372,148.
Office Action dated Feb. 26, 2019 received in U.S. Appl. No. 15/372,148.
U.S. Pat. No. 6,020,891, JP 10-51711.
U.S. Pat. No. 6,325,287, JP 2000-148904.
U.S. Pat. No. 6,708,046, JP 2001-165144.
U.S. Patent Application Publication No. 2001/0019946, JP 2001-251396, JP 2001-251398, JP 2001-251399.
U.S. Patent Application Publication No. 2005/0131857, JP 2005-122572.
U.S. Patent Application Publication No. 2005/0202869, JP 2010-046554.
U.S. Patent Application Publication No. 2005/0239521, WO 03/105450.

(56) References Cited

OTHER PUBLICATIONS

U.S. Patent Application Publication No. 2005/0270368, JP 2008-502206.
U.S. Patent Application Publication No. 2006/0038833, JP 2008-510254.
U.S. Patent Application Publication No. 2006/0060463, JP 2006-086099.
U.S. Patent Application Publication No. 2007/0001003, JP 2007-012025.
U.S. Patent Application Publication No. 2007/0111803, JP 4358181.
U.S. Patent Application Publication No. 2007/0273644, JP 2008-521110.
U.S. Patent Application Publication No. 2008/0070684, JP 2008-068060.
U.S. Patent Application Publication No. 2008/0100620, JP 2006-072667.
U.S. Patent Application Publication No. 2009/0027330, JP 2009-070370.
U.S. Patent Application Publication No. 2009/0059497, JP 4260215.
U.S. Patent Application Publication No. 2009/0060490, JP 4260215.
U.S. Patent Application Publication No. 2009/0163274, JP 2009-148466.
U.S. Patent Application Publication No. 2009/0224999, JP 4260215.
U.S. Patent Application Publication No. 2009/0278974, JP 4260215.
U.S. Patent Application Publication No. 2009/0285484, JP 2010-244575.
U.S. Patent Application Publication No. 2010/0316367, JP 4260215.

* cited by examiner

Fig.5
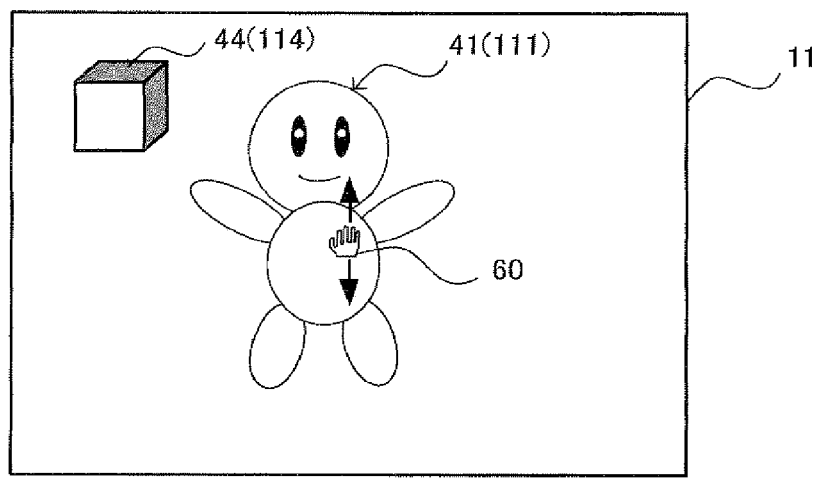
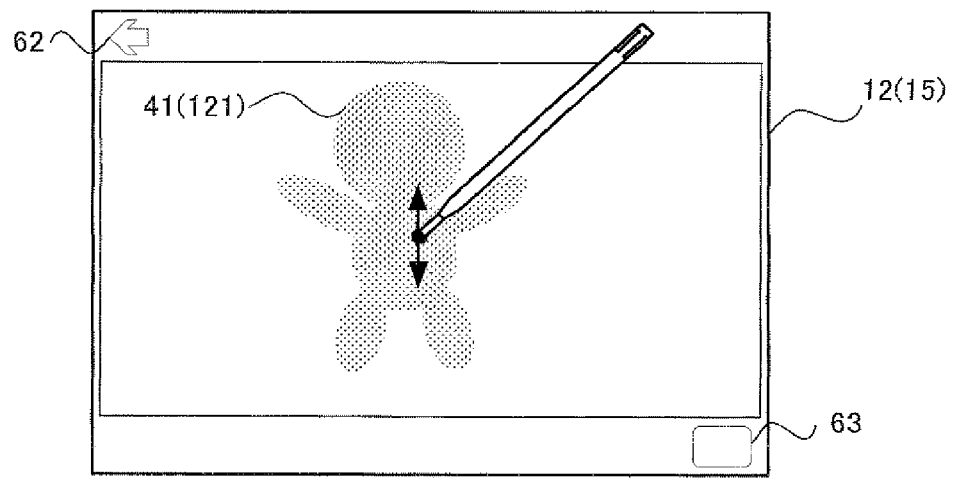

Fig.8
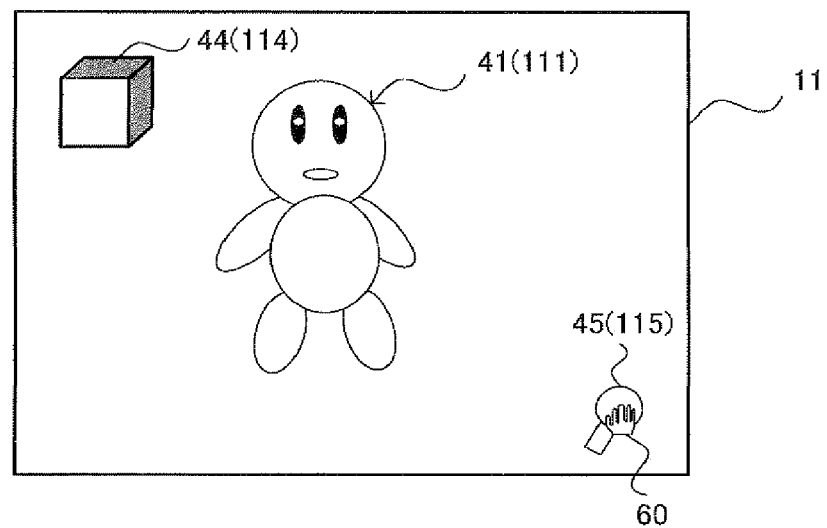
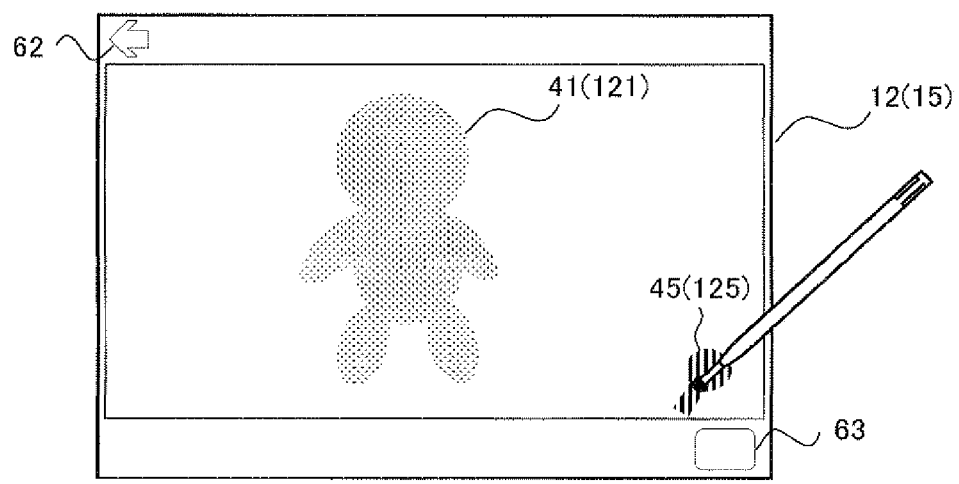

Fig.9
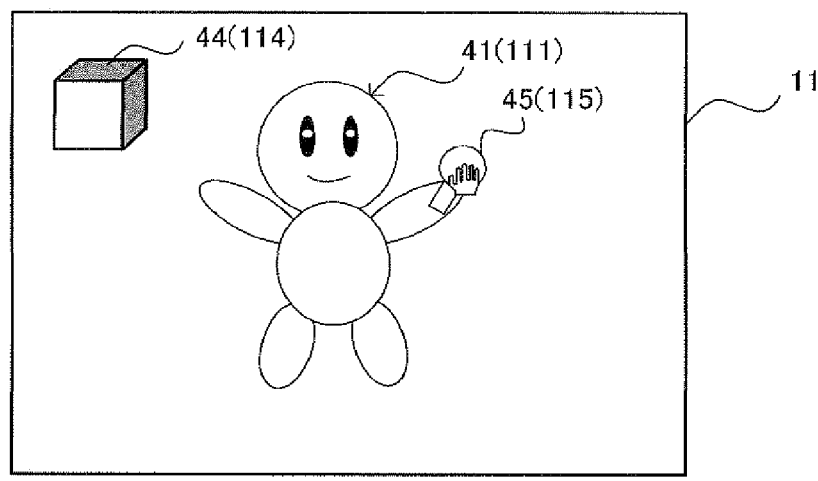
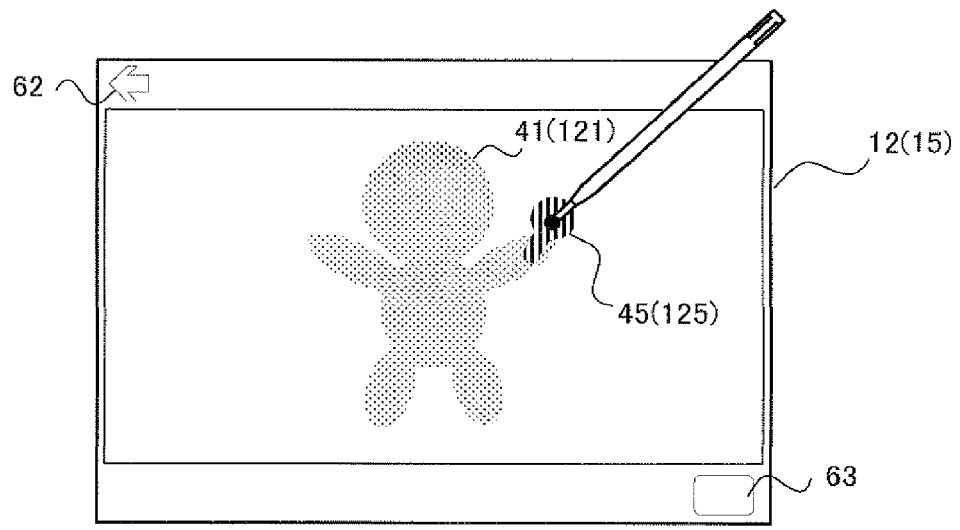

COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

This application is a continuation of U.S. application Ser. No. 15/372,148, filed Dec. 7, 2016, which is a continuation of U.S. application Ser. No. 13/046,027, filed Mar. 11, 2011, which claims benefit of Japanese Patent Application No. 2010-293291, filed Dec. 28, 2010, Japanese Patent Application No. 2010-279994, filed Dec. 16, 2010, and Japanese Patent Application No. 2010-056513, filed Mar. 12, 2010, the entire contents of each of which are incorporated herein by reference.

BACKGROUND AND SUMMARY

Technical Field

The technology presented herein relates to a display control program, a display control apparatus, a display control system, and a display control method, for displaying a display object in two or more display areas and allowing a user to perform an operation on the display object.

Description of the Background Art

Conventionally, there have been display control programs having two or more display areas, which display a display object in one of the two or more display areas and an image for operation in the other of the two or more display areas so as to perform an operation on the image for the operation, thereby operating the display object. For example, a game apparatus disclosed in Japanese Laid-Open Patent Publication No. 2005-218779 (hereinafter, referred to as Patent Literature 1) displays on an upper screen an image in which part of a game space is obliquely viewed, and on a lower screen, an image in which the entirety of the game space is viewed from above. A player plays a game by performing an operation on the lower screen.

The game apparatus disclosed in Patent Literature 1, however, displays on the upper screen a result of an operation performed on the lower screen and thus, may not be sufficient for giving the user a feeling of an experience as if the user is directly operating the object displayed on the upper screen. That is, in the apparatus disclosed in Patent Literature 1, the user performs an operation on the operation screen, which is the lower screen, while seeing the operation screen. As a result of the operation, a state in which the object moves is displayed on the upper screen. Therefore, it is difficult for the user to obtain the feeling of the experience as if the user is directly operating the object displayed on the upper screen.

SUMMARY

Therefore, a feature of the present technology is to provide a display control program, a display control apparatus, a display control system, and a display control method which allow the user to obtain the feeling of the experience as if the user is directly operating the display object.

In order to achieve the above feature, the present technology employs the following features.

An embodiment of the present technology is a display control program executed by a computer of a display control apparatus. The display control program causes the computer to function as: first display control means; second display control means; and control means. The first display control means displays in a first display area a first image in which a predetermined display object is viewed from a predetermined direction. The second display control means displays in a second display area, which is different from the first display area, a second image in which the predetermined display object is viewed from substantially the same direction as the predetermined direction, while the predetermined display object is being displayed in the first display area. The control means controls the predetermined display object included in the first image and the second image, based on a designated position detected by designated position detection means for detecting designation of a position, the designation being performed by a user on the second display area.

Here, the "substantially the same direction" may be exactly the same direction, or directions different from each other by a predetermined angle.

According to the above configuration, images in which a predetermined display object is viewed from substantially the same direction are displayed in the first display area and the second display area. The user is able to operate the predetermined display object displayed in the first display area and the second display area by designating a position in the second display area. This allows the user to operate the predetermined display object in the second display area, while seeing the predetermined display object included in the first image displayed in the first display area. The user is able to change the shape of the predetermined display object, move the predetermined display object, or change an orientation of the predetermined display object, for example. This allows the user to obtain a feeling of an experience as if the user is directly operating the predetermined display object.

Further, in another embodiment, the second image may be an image taken of substantially the same imaging region as that of the first image. Here, the "substantially the same imaging region" indicate images taken of substantially the same space region. One region may be larger than the other region (in the vertical direction and/or the horizontal direction) by about 30%.

According to the above configuration, images taken, of substantially the same imaging region, from substantially the same direction are displayed in the first display area and the second display area. This allows the user to associate the display object displayed in the second display area with the predetermined display object displayed in the first display area, and obtain the feeling of the experience as if the user is directly operating the predetermined display object while seeing the predetermined display object included in the first image.

Further, in another embodiment, the second image may have substantially the same size as the first image. Here, the "images having substantially the same size" may be images as such one image is enlarged (in the vertical direction and/or the horizontal direction) relative to the other image by about 30%.

According to the above configuration, images having substantially the same size are displayed in the first display area and the second display area. This allows the user to easily operate the predetermined display object in the second display area, while seeing the predetermined display object displayed in the first display area.

Further, in another embodiment, the predetermined display object included in the second image may have substantially the same size as the predetermined display object included in the first image. Here, the "substantially the same size" may be sizes as such the predetermined display object included in one image is larger than the predetermined display object included in the other image (in the vertical direction and/or the horizontal direction) by about 30%.

According to the above configuration, the predetermined display object having substantially the same size is displayed in the first display area and the second display area. This allows the user to easily operate the predetermined display object in the second display area, while seeing the display object displayed in the first display area.

Further, in another embodiment, the second image is an image in which the predetermined display object is viewed from substantially the same position as that from which the first image is taken.

According to the above configuration, images which are taken from substantially the same position and substantially the same direction are displayed in the first display area and the second display area. According to this, for example, if the predetermined display object is displayed on the right side of the first display area, the predetermined display object is displayed on the right side of the second display area as well. Therefore, the user is able to easily associate the display object displayed in the second display area with the predetermined display object displayed in the first display area, and obtain the feeling of the experience as if the user is directly operating the predetermined display object while seeing the predetermined display object included in the first image.

Further, in another embodiment, the second image may be an image in which the predetermined display object is displayed in a simplified manner as compared to the first image. Here, "display in the simplified manner" indicates displaying the predetermined display object included in the second image in a simplified manner, as compared to the predetermined display object included in the first image, by displaying the predetermined display object in fewer colors, displaying only the contour of the predetermined display object, or filling the predetermined display object with a predetermined pattern of a line or a dot.

According to the above configuration, the predetermined display object can be displayed in the second display area in a simplified manner. This allows the predetermined display object displayed in the first display area to be brought to the attention of the user.

Further, in another embodiment, the first image may be an image in which the predetermined display object is displayed in multiple colors, and the second image may be an image in which the predetermined display object is displayed in fewer colors as compared to the first image.

According to the above configuration, the predetermined display object can be displayed in the second display area in fewer colors. This allows the predetermined display object displayed in the second display area to be less prominent than the predetermined display object displayed in the first display area. Therefore, the predetermined display object displayed in the first display area can be brought to the attention of the user.

Further, in another embodiment, the second image may be an image in which the predetermined display object is displayed in monochrome.

According to the above configuration, the predetermined display object can be displayed in monochrome in the second display area. This allows the presentation of the predetermined display object displayed in the second display area to be less prominent than the predetermined display object displayed in the first display area. Therefore, the predetermined display object displayed in the first display area can be brought to the attention of the user.

Further, in another embodiment, the designated position detection means may be provided on the second display area, and detects a position of contact on the second display area as the designated position.

According to the above configuration, the user is able to designate a position in the second display area by contacting the second display area. For example, a touch panel may be employed as the designated position detection means. This allows the user to easily operate the predetermined display object by contacting the second display area, while seeing the predetermined display object displayed in the first display area. That is, if the user contacts, by using a stick or a finger, the predetermined display object displayed in the second display area to perform an operation, the stick or the finger ends up hiding the predetermined display object displayed in the second display area. Therefore, it may be difficult for the user to perform an operation if the predetermined display object is displayed only in the second display area. However, since the predetermined display object is displayed in the first display area as well, the user is able to easily operate the predetermined display object in the second display area while seeing the predetermined display object displayed in the first display area.

Further, in another embodiment, the first display control means and the second display control means may display in the first display area and the second display area the first image and the second image, respectively, in which the predetermined display object present in a virtual space is taken by a virtual camera.

According to the above configuration, the predetermined display object present in the virtual space can be displayed in the first display area and the second display area.

Further, in another embodiment, the first display control means may display as the first image an image in which a plurality of display objects present in a virtual space are viewed from the predetermined direction. In this case, the display control program further causes the computer to function as display object selection means for selecting at least one of the plurality of display objects, which satisfies a predetermined condition. Then, the second display control means displays, in the second display area, as the second image an image in which the display object selected by the display object selection means from among the plurality of display objects is displayed in a display mode different from that of the display object which is not selected by the display object selection means.

According to the above configuration, the display object selected from among the plurality of the display objects by the display object selection means can be displayed in the second display area in a display mode different from that of the display object which is not selected by the display object selection means. This allows, for example, a user-operable-object to be displayed in a color different from that of a user-inoperable-object. This allows the user to easily recognize the user-operable-object, for example.

Further, in another embodiment, the first display control means may display as the first image an image in which a plurality of display objects present in a virtual space are viewed from the predetermined direction. Furthermore, the display control program may further cause the computer to function as display object selection means. The display object selection means selects at least one of the plurality of display objects, which satisfies a predetermined condition. Furthermore, the second display control means displays as the second image an image in which only the at least one of the plurality of display objects selected by the display object selection means is viewed from substantially the same direction as the predetermined direction. The control means then controls at least one of the plurality of display objects selected by the display object selection means, which are included in the first image and the second image, based on the designated position detected in the second display area by the designated position detection means.

According to the above configuration, the plurality of display objects present in the virtual space can be displayed in the first display area and a display object, from among the plurality of display objects, which satisfies the predetermined condition, can be displayed in the second display area.

Further, in another embodiment, the display object selection means may select only a user-operable display object from among the plurality of display objects present in the virtual space.

According to the above configuration, only a user-operable display object from among the plurality of display objects are displayed in the second display area. This allows the user to easily recognize the user-operable-object and easily perform an operation on the user-operable-object.

Further, in another embodiment, in a case where there is a plurality of display objects which are selected by the display object selection means, the second display control means displays the second image in the second display area so that the respective display modes of the selected plurality of display objects are different from one another. Here, the display mode of the display object indicates how to display the display objects in terms of the color, pattern, contour, filling pattern, or the like.

According to the above configuration, the plurality of display objects displayed in the second display area are displayed in different display modes from one another. For example, one display object can be displayed in gray while the other display object is displayed in blue. Furthermore, one display object can be, for example, filled with a predetermined line pattern and displayed while the other display object is filled with a pattern different from the predetermined line pattern. This allows the user to easily recognize display objects from one another and easily perform an operation on each display object.

Further, in another embodiment, in a case where there is a plurality of display objects which are selected by the display object selection means, the second display control means displays the second image in the second display area so that the respective display modes of adjacent two of the selected plurality of display objects are different from each other.

According to the above configuration, among the plurality of display objects displayed in the second display, adjacent two of the plurality of display objects are displayed in different display modes from each other. This allows the user to easily recognize the display objects from one another and easily perform an operation on each display object.

Further, in another embodiment, the display control program may further cause the computer to function as cursor display means. The cursor display means displays a cursor indicative of a position designated by the user in the first display area at a position corresponding to the designated position detected in the second display area by the designated position detection means.

According to the above configuration, a cursor can be displayed in the first display area, corresponding to a position designated in the second display area by the user. This allows the user to verify the position where the user designated, and obtain the feeling of the experience as if the user is directly operating the predetermined display object displayed in the first display area.

Further, in another embodiment, the cursor display means may display the cursor only in the first display area.

According to the above configuration, the cursor can be displayed only in the first display area, and thereby the first display area can be brought to the attention of the user.

Further, in another embodiment, depth values may be set in the second image. In this case, the display control program further causes the computer to function as position calculation means and cursor display means. The position calculation means calculates a position in the virtual space, based on the position designated in the second display area and a depth value of the second image at the designated position. The cursor display means displays a cursor at a position calculated by the position calculation means.

According to the above configuration, the position in the virtual space can be calculated based on the depth value set in the image, and the cursor can be displayed at the calculated position. This allows accurate and easy obtainment of a virtual space position corresponding to the designated position, thereby displaying the cursor.

Further, in another embodiment, the second display area may be a display area having a display type different from that of the first display area. The display areas having different display types may be display areas having different resolutions from each other. One display area may be a display area configured to display a stereoscopic image (stereoscopically display an image) while the other display area is configured to display a planar image.

According to the above configuration, the predetermined display object can be displayed in display areas having different display types from each other.

Further, in another embodiment, the first display area may be a display area configured to display a stereoscopically visible image. In this case, the first display control means displays, in the first display area, a stereoscopic image, which is stereoscopically visible, as the first image, by displaying in the first display area a right-eye image and a left-eye image taken, of the predetermined display object within the virtual space, from the predetermined direction by using a virtual stereo camera, so that the right-eye image and the left-eye image are viewed by the use's right eye and the left eye, respectively. Furthermore, the second display area is a display area configured to display a planar image. The second display control means displays, in the second display area, as the second image a planar image taken, of the predetermined display object, from substantially the same direction as the predetermined direction, while the predetermined display object is being displayed in the first display area.

According to the above configuration, an image in which the predetermined display object is viewed by the virtual stereo camera from a predetermined direction can be displayed stereoscopically in the first display area, and an image in which the predetermined display object is viewed from substantially the same direction as the predetermined direction can be displayed in a planar manner in the second display area.

Further, in another embodiment, depth values may be set in the second image. In this case, the display control program further causes the computer to function as position calculation means and cursor display means. The position calculation means calculates a virtual space position, based on the position designated in the second display area and a depth value of the second image at the designated position. The cursor display means then arranges the cursor at the position calculated by the position calculation means, and displays the cursor by taking images of the cursor by the virtual stereo camera.

According to the above configuration, the virtual space position is calculated based on the depth value set in the image, and the cursor can be displayed stereoscopically at the calculated position.

Further, in another embodiment, the display control program may further cause the computer to function as determination means and cursor display means. The determination means determines whether or not the designated position detected in the second display area by the designated position detection means is a position where the predetermined display object is displayed. The cursor display means stereoscopically displays a cursor in the first display area at a position corresponding to the designated position, in a case where the determination result by the determination means is affirmative, so that the cursor is along on a surface of the predetermined display object displayed in the first display area.

According to the above configuration, when the user designates a predetermined display object in the second display area, the cursor can be displayed so as to be along on the surface of the predetermined display object displayed in the first display area. This allows the user to obtain a feeling of an experience as if the user is touching the surface of the predetermined display object while seeing the predetermined display object stereoscopically displayed in the first display area.

Further, in another embodiment, in a case where the determination result by the determination means is negative, the cursor display means displays the cursor in the first display area at a position corresponding to the designated position in a display mode different from that in the case where the determination result by the determination means is affirmative.

According to the above configuration, the user can easily verify, by the display mode of the cursor displayed in the first display area, whether or not the user has designated the predetermined object displayed in the second display area. For example, if the predetermined display object is not designated by the user, the cursor can be displayed in an arrow shape while, if the predetermined display object is designated by the user, the cursor can displayed in a shape of a hand.

Further, in another embodiment, the second display control means may display, in the second display area, as the second image an image taken, of the predetermined display object, by using a second virtual camera set between virtual cameras at the left and at the right which are components of the virtual stereo camera.

According to the above configuration, an image taken by a third virtual camera arranged between the virtual cameras at the left and at the right, which are the components of the virtual stereo camera, can be displayed in the second display area. This allows an image having substantially the same appearance as the stereoscopic image stereoscopically displayed in the first display area to be displayed in the second display area in the planar manner.

Further, another embodiment may be a display control program executed by a computer of a display control apparatus, and may cause the computer to function as: first display control means; second display control means; and control means. The first display control means displays a predetermined display object in a first display area. The second display control means displays in a second display area, which is different from the first display area, the predetermined display object in a display mode in a manner in which the display mode of the predetermined display object displayed in the first display area is simplified, while the predetermined display object is being displayed in the first display area. The control means controls the predetermined display object displayed in the first display area and the second display area, based on a designated position detected by position designation detection means for detecting designation of a position, the designation being performed by the user on the second display area.

According to the above configuration, while a predetermined display object is being displayed in the first display area, the predetermined display object can be displayed in the second display area in the simplified manner. The predetermined display object can be then controlled based on the position designated in the second display area. This allows the user to designate a position in the second display area, while bringing the user's attention to the predetermined display object displayed in the first display area.

Further, in another embodiment, the display control program may be implemented in an embodiment of the display control apparatus which executes the display control program. Alternatively, a plurality of devices, which realize the above means, may interact with one another, thereby being configured as one display control system. The display control system may be configured of one display control apparatus or a plurality of devices.

Further, in another embodiment, the first display area and the second display area may be a single screen.

According to the present technology, a first image in which a predetermined display object is viewed from a predetermined direction can be displayed in a first display area, and a second image in which the predetermined display object is viewed from substantially the same direction as the predetermined direction can be displayed in a second display area. The predetermined display object displayed in the first and second display areas can be controlled according to designation of a position in the second display area.

Further, in another embodiment, the display control program may be executed by one or more processors. The one or more processors, executing the display control program, generate a two-dimensional image of a three-dimensional virtual space taken by a virtual camera. The virtual space includes an object. The one or more processors, executing the display control program, acquire a designated position on the generated two-dimensional image. The designated position is provided via an input device on the generated two-dimensional image. The one or more processors, executing the display control program, determine a position within the three-dimensional virtual space as viewed from the virtual camera which corresponds to the designated position and determines whether this position within the three-dimensional virtual space coincides with the object in the three-dimensional virtual space. The one or more processors, executing the display control program, produce a cursor at the position in the three-dimensional virtual space and display an image taken of the three-dimensional virtual space which includes the virtual designating object and the object arranged therein. When the position does not coincide with the object, the cursor is arranged in a predetermined orientation.

Further, in another embodiment, when position coincides with the object, the one or more processors, executing the display control program, determine, based on the position, an orientation of the cursor and display the image taken of the three-dimensional virtual space with the cursor in the determined orientation.

According to the above configuration, the user can easily verify, by the display orientation of the cursor, whether or not the user has designated the object.

Further, in another embodiment, when the position coincides with the object, the orientation of the cursor is set along a surface of the object.

According to the above configuration, the user is able to obtain a feeling of an experience as if the user is touching the surface of the object while seeing the object.

These and other features, aspects and advantages of the present technology will become more apparent from the following detailed description of the present technology when taken in conjunction with the accompanying drawings.

BRIEF DESCRIPTION OF THE DRAWINGS

FIG. 5 is a diagram showing a state in which, when the user touches a child object image 121 displayed on the planar image display device 12 to perform a predetermined operation, respective images displayed on the stereoscopic image display device 11 and the planar image display device 12 change;

FIG. 8 is a diagram illustrating a case where the user uses an item in the game according to the present embodiment;

FIG. 9 is a diagram illustrating how the respective images displayed on the stereoscopic image display device 11 and the planar image display device 12 change when an item 45 is given to the child object 41;

DESCRIPTION OF THE PREFERRED EMBODIMENTS (Description of Game Apparatus)

Figure 1:
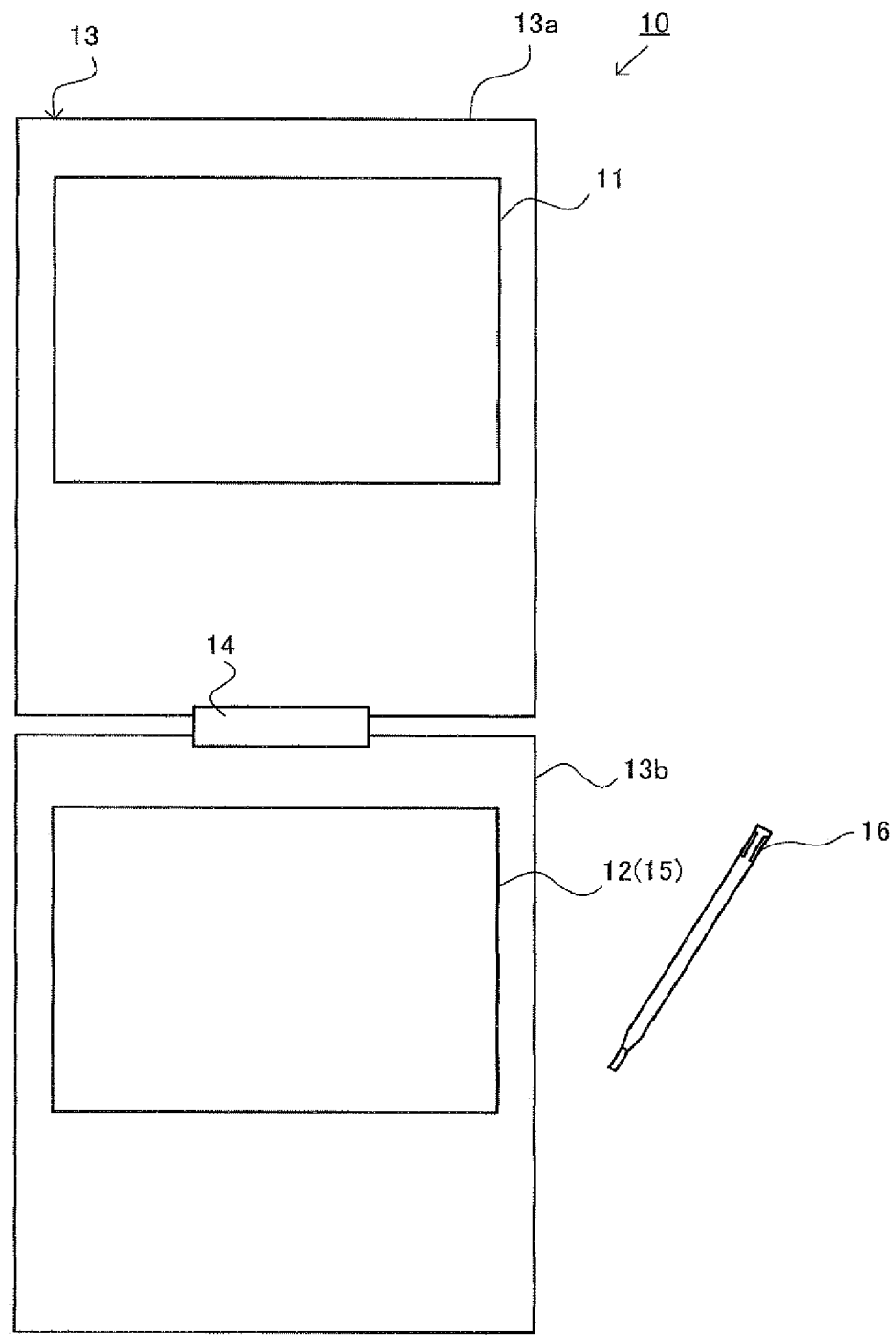
FIG. 1 is an external view of a handheld game apparatus according to an embodiment.

A game apparatus according to an embodiment of the technology presented herein will be described, with reference to the accompanying drawings. FIG. 1 is an external view of a handheld game apparatus according to an embodiment. In FIG. 1, a game apparatus 10 includes a stereoscopic image display device 11 capable of displaying a stereoscopic image, and a planar image display device 12 capable of displaying a two-dimensional planner image. A housing 13 is configured of an upper housing 13a and a lower housing 13b. The stereoscopic image display device 11 is accommodated in the upper housing 13a, and the planar image display device 12 is accommodated in the lower housing 13b.

The upper housing 13a and the lower housing 13b are connected via a hinge portion 14. The upper housing 13a and the lower housing 13b are connected to each other via the hinge portion 14 so as to be openable and closable (foldable).

The stereoscopic image display device 11 is a liquid crystal display capable of displaying an image (stereoscopically visible image) which is stereoscopically visible by the naked eye, and a lenticular lens type display device or a parallax barrier type display device is used. In the present embodiment, the stereoscopic image display device 11 of a parallax barrier type is used. The stereoscopic image display device 11 displays an image having a stereoscopic effect by using a left-eye image and a right-eye image. That is, the stereoscopic image display device 11 allows a user to view the image for a left eye with her/his left eye, and the image for a right eye with her/his right eye by utilizing a parallax barrier so that a stereoscopic image (a stereoscopically visible image) exerting a stereoscopic effect on a user can be displayed.

The planar image display device 12 is a display device capable of displaying a planar image. Although a liquid crystal display is used as the planar image display device 12 in the present embodiment, any other display device, such as a display device using an EL (Electro Luminescence), or the like may be used.

The respective screens of stereoscopic image display device 11 and the planar image display device 12 have the same size and a predetermined resolution (256 dots×192 dots, for example). In addition, a display device having any resolution may be used.

A touch panel 15, which is a designated position detection device, is mounted on the screen of the planar image display device 12. The touch panel 15 may be of any type such as a resistive film type, an optical type (infrared type), or a capacitive coupling type. In the present embodiment, the touch panel 15 is of the resistive film type. The touch panel 15 detects a position on the screen of the planar image display device 12 in response to the user touching the screen of the planar image display device 12 by using a stick 16. The position detected by the touch panel 15 corresponds to the position on the screen of the planar image display device 12. The user can designate the position on the screen not only by the stick 16 but also by a finger. In the present embodiment, the touch panel 15 has the same resolution (detection accuracy) as that of the planar image display device 12. However, the resolution of the touch panel 15 may not necessarily be the same as the resolution of the planar image display device 12.

Figure 2:
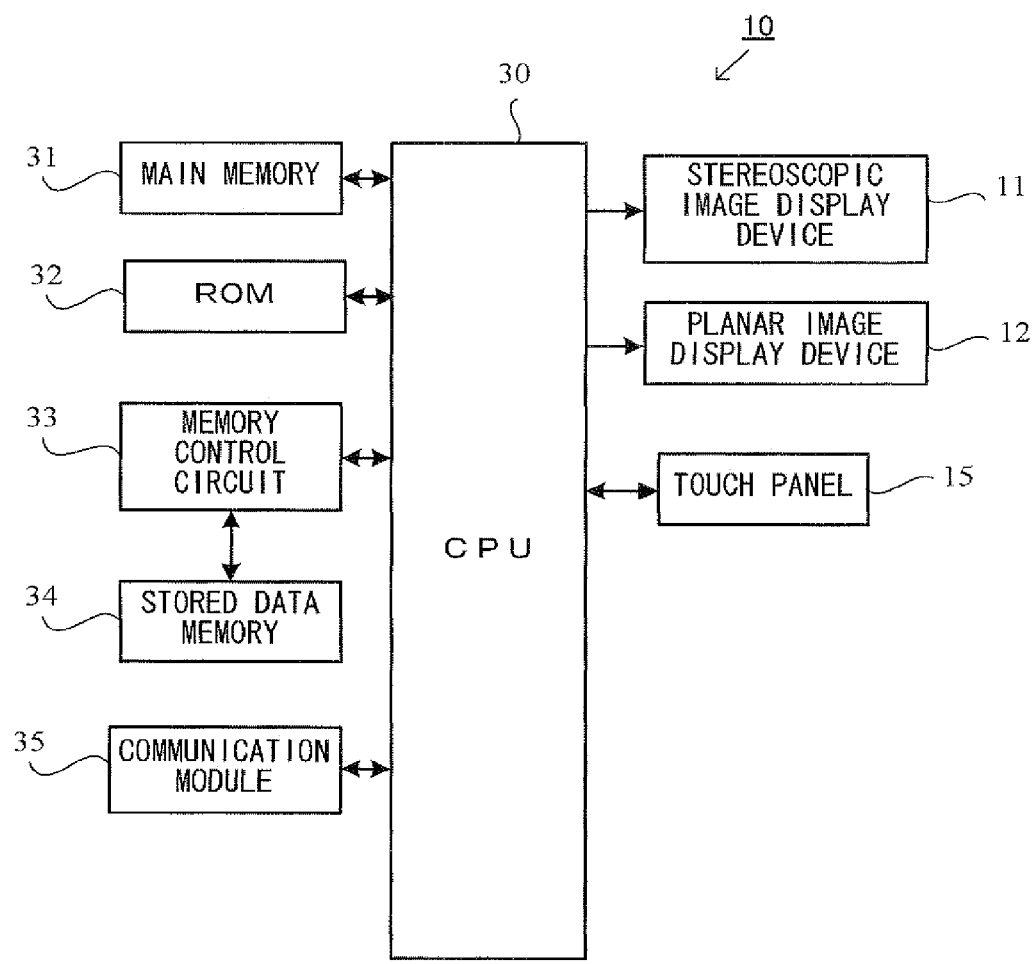
FIG. 2 is a block diagram illustrating an internal configuration of the game apparatus 10.

FIG. 2 is a block diagram illustrating an internal configuration of the game apparatus 10. As shown in FIG. 2, other components included in the game apparatus 10 are a CPU 30, a main memory 31, a ROM 32, a memory control circuit 33, a stored data memory 34, and a communication module 35. These electronic components are mounted on an electronic circuit substrate and accommodated in the lower housing 13b (or the upper housing 13a).

The CPU 30 is information processing means for executing a predetermined program. In the present embodiment, the predetermined program is stored in the ROM 32 of the game apparatus 10, and a game process described below is executed by the CPU 30 executing the predetermined program.

The main memory 31, the ROM 32, and the memory control circuit 33 are connected to the CPU 30. The stored data memory 34 is connected to the memory control circuit 33. The main memory 31 is a readable/writable semiconductor memory. The main memory 31 includes an area for temporarily storing the predetermined program, a work area, and a buffer area of the CPU 30. That is, the main memory 31 stores various types of data used for the game process described below, stores the predetermined program stored in the ROM 32, and the like. The ROM 32 is a non-volatile memory and used for storing the predetermined program. The stored data memory 34 is implemented as a non-volatile storage medium and, for example, a NAND flash memory is used. The memory control circuit 33 is a circuit for controlling reading of data from the stored data memory 34 or writing of data to the stored data memory 34, in accordance with an instruction from the CPU 30.

The predetermined program executed by the CPU 30 may be stored in advance in the ROM 32, may be obtained from the stored data memory 34, or may be obtained from another apparatus by means of communication with the another apparatus via the communication module 35.

The communication module 35 has a function of performing wired or wireless communication with the another apparatus. The communication module 35 has a function of performing, for example, infrared communication with the another apparatus. The communication module 35 may have a function of connecting to a wireless LAN in a method based on, for example, IEEE 802.11.b/g standard, or have a function of performing communication with the another apparatus by means of the Bluetooth (registered trademark) technology. Furthermore, the communication module 35 may also have a function of connecting to a mobile communication network by means of a communication scheme used for mobile phones, and the like.

The touch panel 15 is connected to the CPU 30. The touch panel 15 is connected to an interface circuit (not shown), and the interface circuit generates a predetermined form of touch position data, based on a signal outputted from the touch panel 15, and outputs the touch position data to the CPU 30. For example, the touch position data represents a coordinate of a position, on which an input is made, on an input surface of the touch panel 15. The interface circuit reads a signal outputted from the touch panel 15, and generates the touch position data every predetermined time. The CPU 30 acquires the touch position data via the interface circuit to recognize the position on which the input is made on the touch panel 15.

The stereoscopic image display device 11 and the planar image display device 12 are connected to the CPU 30. The stereoscopic image display device 11 and the planar image display device 12 display images, according to respective instructions from the CPU 30. As described above, the stereoscopic image is displayed on the stereoscopic image display device 11, and the planar image is displayed on the planar image display device 12.

(Outline of Game)

Figure 3:
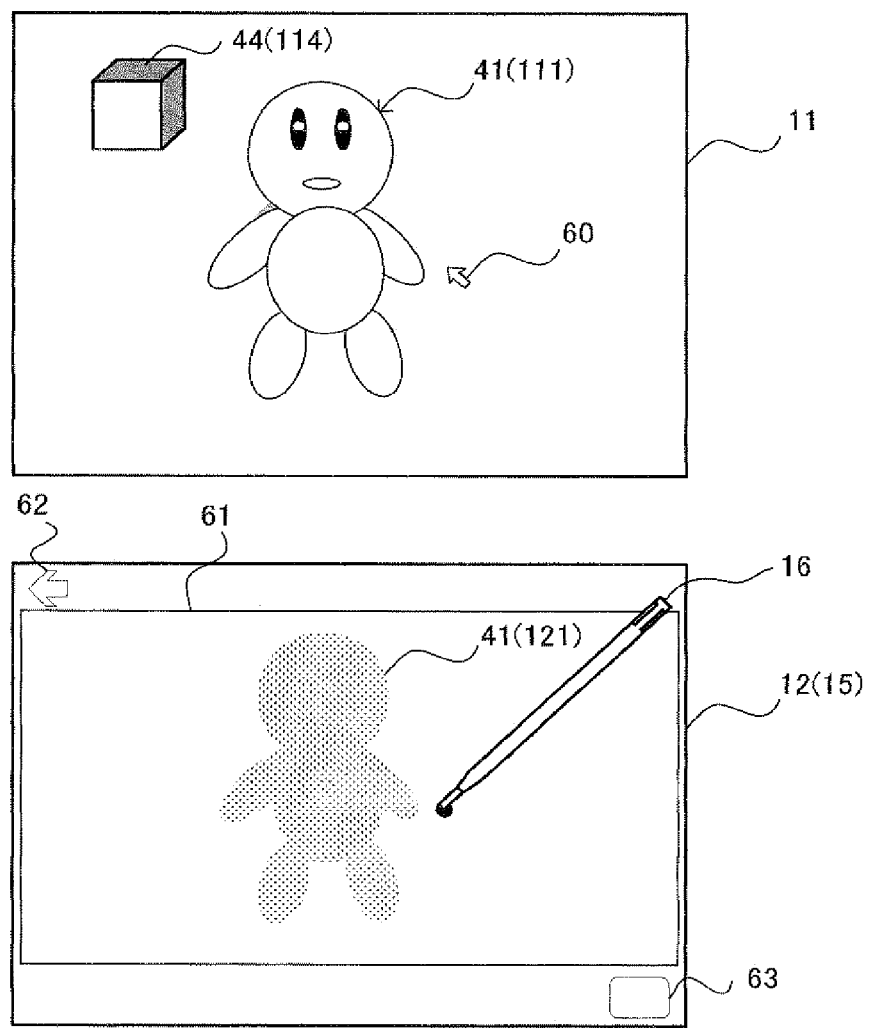
FIG. 3 is a diagram illustrating an example of game images displayed on respective screens of a stereoscopic image display device 11 and a planar image display device 12, while a game according to the present embodiment is being executed.

Next, an outline of a game according to a present embodiment will be described, with reference to FIG. 3 to FIG. 9. FIG. 3 is a diagram illustrating an example of game images displayed on respective screens of a stereoscopic image display device 11 and a planar image display device 12, while the game according to the present embodiment is being executed.

As shown in FIG. 3, on the screen of the stereoscopic image display device 11, a child object image 111, in which a child object 41 representing a child present in a virtual space is displayed stereoscopically (displayed in a stereoscopically visible manner), and a furniture object image 114, in which a furniture object 44 is displayed stereoscopically, are displayed. The child object image 111 and the furniture object image 114 are displayed, for example, in 32-bit color on the screen of the stereoscopic image display device 11. In addition, a cursor 60 is displayed on the screen of the stereoscopic image display device 11. The cursor 60 is arranged at a position, in the virtual space, which corresponds to a position touched by a user on a touch panel 15 (the screen of the planar image display device 12). The cursor 60 is then displayed on the screen of the stereoscopic image display device 11.

Figure 4:
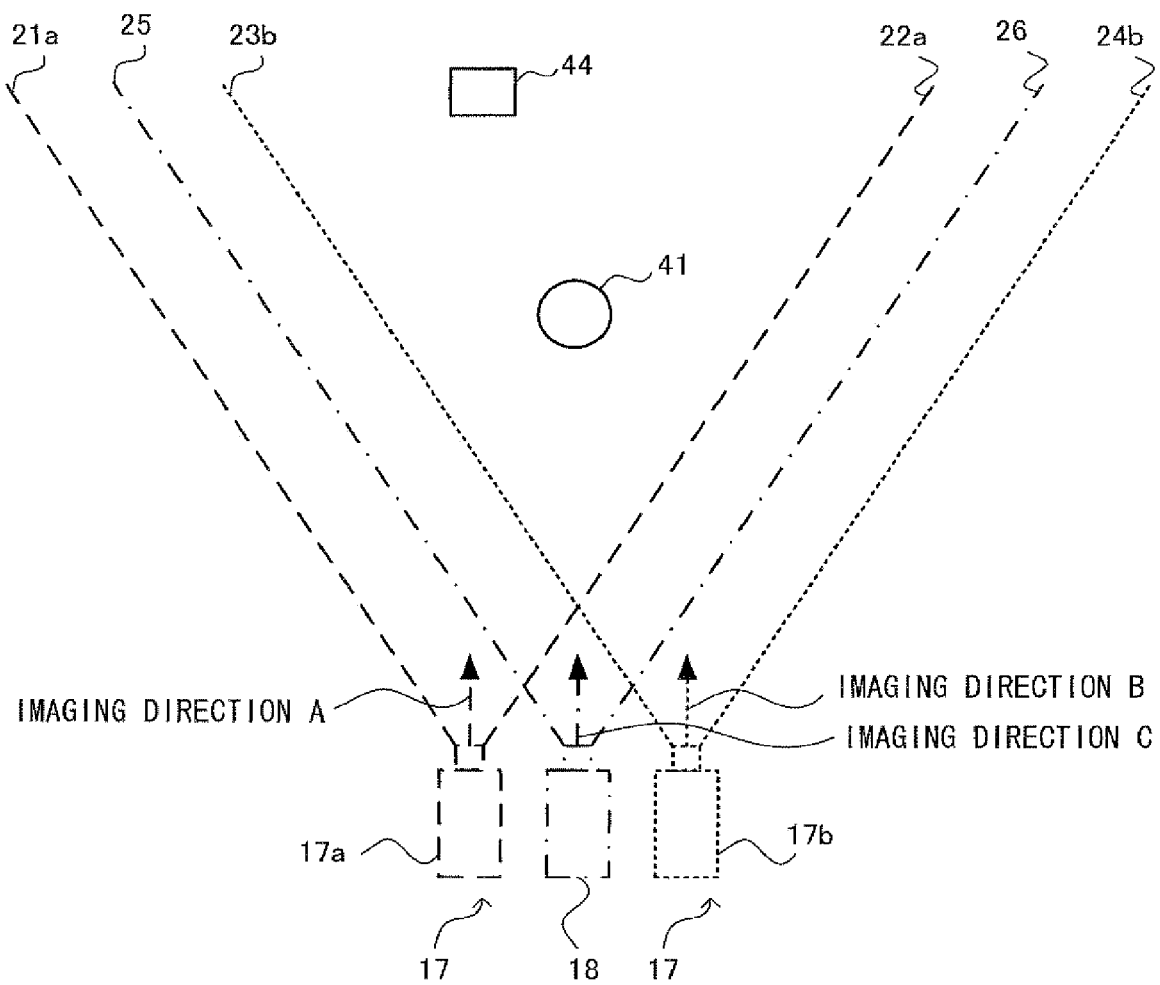
FIG. 4 is a diagram illustrating a state in which images of objects present in the virtual space are taken by a virtual stereo camera 17, the state being viewed from above the virtual space.

A stereoscopic image, which includes the child object 41 and the furniture object 44, (an image displayed on the screen of the stereoscopic image display device 11) is an image taken of the virtual space by a virtual stereo camera, and which is an image (a stereoscopically visible image) which exerts a stereoscopic effect on the user. FIG. 4 is a diagram illustrating a state in which images of respective objects present in the virtual space are taken by a virtual stereo camera 17, the state being viewed from above the virtual space. As shown in FIG. 4, a left-eye image and a right-eye image are taken by a left-eye virtual camera 17a and a right-eye virtual camera 17b, respectively. The left-eye virtual camera 17a and the right-eye virtual camera 17b are components of the virtual stereo camera 17. By the taken left-eye image being viewed with the user's left eye and the taken right-eye image being viewed with the user's right eye, the user can view the image having the stereoscopic effect. An imaging direction A of the virtual camera at the left 17a, which is the component of the virtual stereo camera 17, and an imaging direction B of the virtual camera at the right 17b, which is the component of the virtual stereo camera 17, are the same. For example, the imaging direction A of the left-eye virtual camera 17a is a direction of a straight line which divides in half an angle formed between a line 21a and a line 22a which together indicate an angle of view of the left-eye virtual camera 17a. Similarly, the imaging direction B of the right-eye virtual camera 17b is a direction of a straight line which divides in half an angle formed between a line 23b and a line 24b which together indicate an angle of view of the right-eye virtual camera 17b. In addition, a point of view of the virtual stereo camera 17 coincides with a point of view of the user. As shown in FIG. 4, the child object 41 is present at a position closer to the virtual stereo camera than the furniture object 44 is. Therefore, as shown in FIG. 3, the user feels an experience as if the child object 41 exists in front of the user itself.

A planar image display area 61 is provided in the central portion of the screen of the planar image display device 12. An operation button 62 and an item selection button 63 are displayed on the upper portion and the lower portion of the screen of the planar image display device 12, respectively. The operation button 62 is used for pausing or ending the game. When ending the game, the user touches the operation button 62 by using the stick 16, thereby pausing or ending the game. The item selection button 63 is used for selecting an item described below.

A child object image 121 is displayed in the planar image display area 61. The child object image 121 is an image in which the child object 41, which is displayed on the screen of the stereoscopic image display device 11, is displayed in one color (gray) and in a planar manner. Specifically, the child object image 121 is a silhouette of an image of the child object 41 present in the virtual space, which is taken by a virtual camera 18 set at the middle of the left-eye virtual camera 17a and the right-eye virtual camera 17b. In this case, an imaging direction (an imaging direction C shown in FIG. 4) of the virtual camera 18 is the same as the imaging directions of the virtual stereo camera 17. In addition, an angle of view of the virtual camera 18 is the same as the angle of view of the virtual stereo camera 17. Therefore, the image (the image taken of the virtual space including the child object 41), which is displayed in the planar image display area 61, has substantially the same size as the image (the image taken of the virtual space including the child object 41 and the furniture object 44), which is displayed on the stereoscopic image display device 11, and these images are images taken of substantially the same virtual space region. That is, the image displayed on the planar image display device 12 is an image (here, an image reduced by a predetermined ratio in the vertical direction of the screen) obtained by reducing the image displayed on the stereoscopic image display device 11, according to a ratio in size of the screen of the stereoscopic image display device 11 to the planar image display area 61. Also, an imaging range of the image (a virtual space region displayed in the image) displayed on the planar image display device 12 is substantially the same as an imaging range of the image displayed on the stereoscopic image display device 11.

Therefore, the child object image 121 displayed on the screen of the planar image display device 12 has substantially the same size as the child object image 111 displayed on the stereoscopic image display device 11. The child object image 121 is the child object 41 present in the virtual space, which is viewed from the same direction.

The furniture object 44, which is displayed on the stereoscopic image display device 11, is not displayed in the planar image display area 61. In the present embodiment, the silhouette of only an object (the child object 41) which can be operated by the user, i.e. a user-operable-object, is displayed on the screen (the planar image display area 61) of the planar image display device 12. Since the furniture object 44 is not a user-operable-object, the silhouette of the furniture object 44 is not displayed on the screen of the planar image display device 12.

Here, the imaging ranges of the respective images taken by the virtual stereo camera 17 and the image taken by the virtual camera 18 will be described. As shown in FIG. 4, the imaging range (the angle of view) of the left-eye virtual camera 17a is an area which includes the child object 41 and the furniture object 44, and which is surrounded by the line 21a and the line 22a. The imaging range (the angle of view) of the right-eye virtual camera 17b is an area, which includes the child object 41 and the furniture object 44, and which is surrounded by the line 23b and the line 24b. The left-eye image taken by the left-eye virtual camera 17a and the right-eye image taken by the right-eye virtual camera 17b are synthesized and displayed on the stereoscopic image display device 11, thereby displaying the stereoscopic image exerting the stereoscopic effect on the user. Here, only an area including the child object 41 and the furniture object 44, which is surrounded by the line 22a and the line 23b, is displayed on the stereoscopic image display device 11. That is, the range of the stereoscopic image (the imaging range of the virtual stereo camera 17) displayed on the stereoscopic image display device 11 is an area in which the imaging range of the left-eye virtual camera 17a and the imaging range of the right-eye virtual camera 17b are overlapped one on the other. The following are reasons why the overlapping area only is displayed. That is, if the stereoscopic image including a non-overlapping area is displayed on the screen of the stereoscopic image display device 11, part of the stereoscopic image becomes an image having the stereoscopic effect, while other part becomes an image having no stereoscopic effect, and which is a state in which "what should be visible is invisible" or "what should be invisible is visible" for the user. Therefore, an image taken of the overlapped area of the respective imaging ranges of the virtual cameras at the left and the right (17a and 17b) is displayed on the screen of the stereoscopic image display device 11.

On the other hand, as shown in FIG. 4, the imaging range of the virtual camera 18 is an area including the child object 41 and the furniture object 44, which is surrounded by a line 25 and a line 26. The imaging range of the virtual camera 18 is an area including the imaging range (the above-described overlapping area) of the virtual stereo camera 17, and which is larger than the imaging range of the virtual stereo camera 17. However, the virtual cameras at the left and the right (17a and 17b, respectively), which are the components of the virtual stereo camera 17, are close to each other, and the imaging range of the virtual stereo camera 17 is substantially the same as the imaging range of the virtual camera 18. Therefore, the image displayed on the planar image display device 12 is an image taken of substantially the same virtual space region as that of the image displayed on the stereoscopic image display device 11. The imaging range of the virtual camera 18 may be exactly the same as the imaging range of the virtual stereo camera 17.

Next, the user touches the child object image 121 by using the stick 16 to perform a predetermined operation, thereby causing the child object 41 present in the virtual space to perform a predetermined movement.

FIG. 5 is a diagram showing a state in which, when the user touches the child object image 121 displayed on the planar image display device 12 to perform the predetermined operation, the respective images displayed on the stereoscopic image display device 11 and the planar image display device 12 change. As shown in FIG. 5, when the user operates the stick 16 such as stroking the chest of the child object image 121 by using the stick 16, the child object image 111 displayed on the stereoscopic image display device 11 changes. Specifically, when the user moves the stick 16 in the up-down direction (the vertical direction) of the screen, while touching, by using the stick 16, the chest area of the child object image 121, the facial expression of the child object 41 present in the virtual space changes and the positions of both hands of the child object 41 change. The child object image 111 displayed on the stereoscopic image display device 11 and the child object image 121 displayed on the planar image display device 12 also change in the same manner, according to the change of the child object 41.

When the user touches the child object image 121 by using the stick 16, the cursor 60 is displayed on the screen of the stereoscopic image display device 11 at a position corresponding to the touch position. For example, if the user touches the head of the child object image 121 on the planar image display device 12, the cursor 60 is displayed on the stereoscopic image display device 11 on the head of the child object 41. In addition, if the user touches the child object image 121 by using the stick 16, the shape of the cursor 60 changes from an arrow shape shown in FIG. 3 to a shape of a human hand shown in FIG. 5.

Figure 6A:
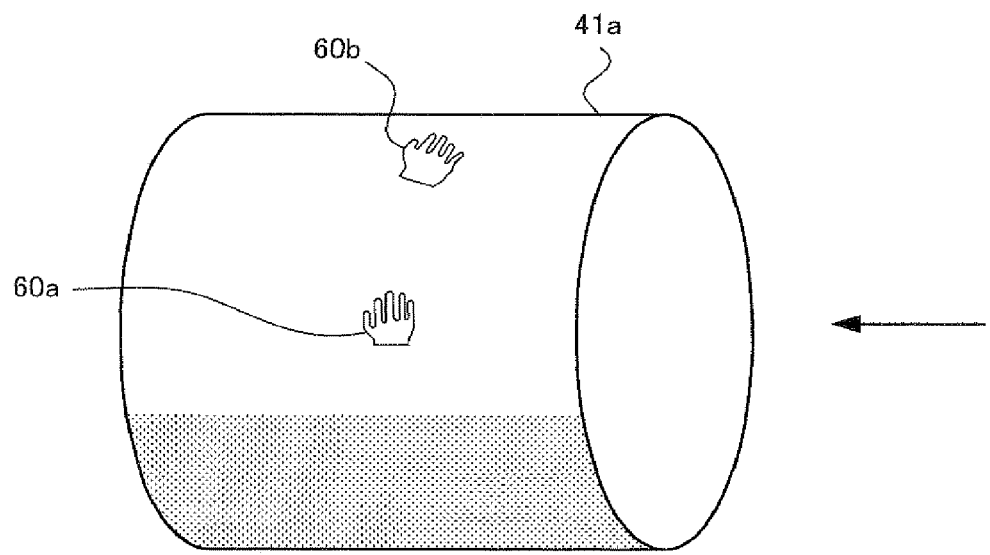
FIG. 6A is a diagram illustrating how a cursor 60 is displayed, and a part of a child object 41 displayed on the stereoscopic image display device 11, which is enlarged and viewed obliquely from the front.
Figure 6B:
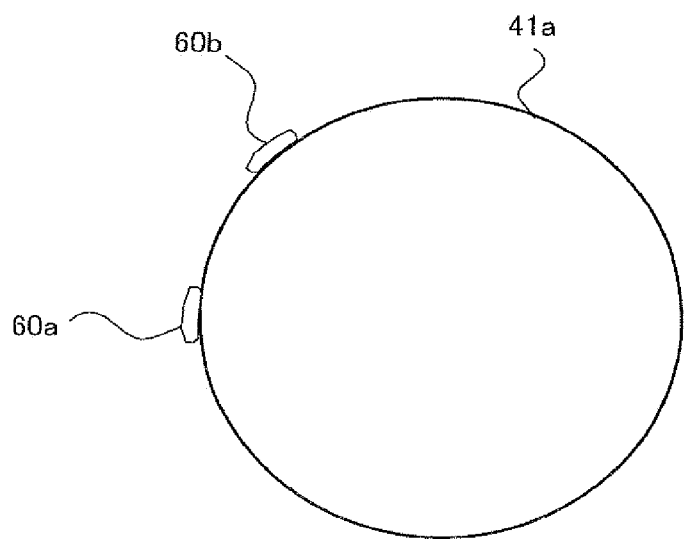
FIG. 6B is a diagram illustrating the part of the child object 41 viewed from a direction as indicated by an arrow shown in FIG. 6A.

Furthermore, the cursor 60 is displayed so as to be along on a surface of the child object 41. FIG. 6A is a diagram illustrating how the cursor 60 is displayed, and a part of the child object 41 displayed on the stereoscopic image display device 11, which is enlarged and viewed obliquely from the front. FIG. 6B is a diagram illustrating the part of the child object 41 viewed from a direction indicated by an arrow in FIG. 6A. In FIG. 6A and FIG. 6B, 41a indicates a part (a part of an arm, for example) of the child object 41. The part 41a is formed in a simple columnar shape for the purpose of explanation. As shown in FIG. 6A and FIG. 6B, the cursor 60 (the cursors 60a and 60b) is stereoscopically displayed so as to be along the surface of the part 41a. When the user sees the stereoscopic child object 41 (the child object image 111) displayed on the stereoscopic image display device 11, it appears as if the cursor 60 is present on the surface of the stereoscopic child object 41. This allows the user to obtain the feeling of the experience as if the user is stroking the child object 41, by performing an operation of stroking on the screen of the planar image display device 12 by using the stick 16, while seeing the screen of the stereoscopic image display device 11.

As described above, the game according to the present embodiment, the child object 41 and the furniture object 44 present in the virtual space are stereoscopically displayed on the screen of the stereoscopic image display device 11. On the screen of the planar image display device 12, the silhouette of only the child object 41, which is a user-operable-object, is displayed (only the child object image 121, which is the silhouetted child object 41, is displayed). The user then touches the child object image 121 displayed on the screen of the planar image display device 12 by using the stick 16. As described above, the silhouette of the child object is displayed on the planar image display device 12, and the user touches the silhouette by using the stick 16. This allows the user to easily operate the object while seeing the screen of the stereoscopic image display device 11, and obtain the feeling of the experience as if the user is operating the object.

That is, since the object is stereoscopically displayed on the stereoscopic image display device 11, it is difficult for the user to directly touch on the screen of the stereoscopic image display device 11 to operate the displayed object. The user feels an experience as if the stereoscopically displayed object is positioned, for example, in front of the screen, or positioned far behind of the screen. For example, if it appears as if the object is present in front of the screen, and if the user attempts to directly touch the stereoscopically displayed object for operation, the user ends up attempting to touch a space in front of the screen by using the stick 16. Therefore, the user is unable to operate the desired object. Moreover, if the user touches on the screen of the stereoscopic image display device 11 to operate the stereoscopically displayed object which appears to be in front of the screen, the display position of the object felt by the user is different from the touch position, and thus the user cannot obtain the feeling of the experience as if the user is operating the object. That is, the display position of the object felt by the user is in front of the screen, while the position where user touches is on the screen. Therefore, in order to operate the object, the user ends up touching a different position in a direction perpendicular to the screen, thereby unable to obtain the feeling of the experience as if the user is directly operating the object. That is, for example, if it appears as if the object is present in front of the screen, and if the user touches the screen by using the stick 16, the stick 16 falls in a state in which the stick 16 penetrates inside the object. Furthermore, if it appears as if the object is positioned in a depth direction of the screen, the user cannot move the stick deeper than the screen and therefore, the user cannot directly touch the object which appears to be present far behind of the screen. Thus, what the user sees contradicts with the reality, and which may cause detriment to the feeling of operation. However, stereoscopically displaying the object on the stereoscopic image display device 11 and displaying the silhouette of the object on the planar image display device 12 as described above allows the user to operate the object by touching the screen of the planar image display device 12, while seeing the object displayed on the stereoscopic image display device 11. Therefore, the user obtains the feeling of the experience as if the user is directly operating the object.

Also, on the screen of the stereoscopic image display device 11, the cursor 60 is displayed at a position corresponding to the position touched by the user on the screen of the planar image display device 12. Therefore, the user can obtain the feeling of the experience as if the user is directly operating the object displayed on the stereoscopic image display device 11 without the necessity of directly touching the screen of the stereoscopic image display device 11.

The object is displayed in 32-bit color on the screen of the stereoscopic image display device 11. The object is an image having fine detail recognizable of each part (for example, the head, body, arms, and the like of the child object 41) of the object. On the other hand, the silhouette of the object is displayed on the planar image display device 12 and therefore, the presentation is less prominent, as compared to the object displayed on the stereoscopic image display device 11. The user tends to be more attracted to beautiful color images than less prominent monochromatic images. Therefore, it is easy for the user to perform the touch operation on the screen of the planar image display device 12 by using the stick 16, while gazing at the object displayed on the screen of the stereoscopic image display device 11.

Furthermore, since only the operable object is displayed on the planar image display device 12, the user can easily recognize the operable object. Merely by glancing at the silhouette displayed on the screen of the planar image display device 12, the user can recognize and touch the operable object, and thereafter operate the object while seeing the object displayed on the screen of the stereoscopic image display device 11. That is, after seeing the screen of the planar image display device 12 and touching the silhouette of the object, the user can operate the object, while seeing the screen of the stereoscopic image display device 11, and without the necessity of seeing the screen of the planar image display device 12.

Figure 7:
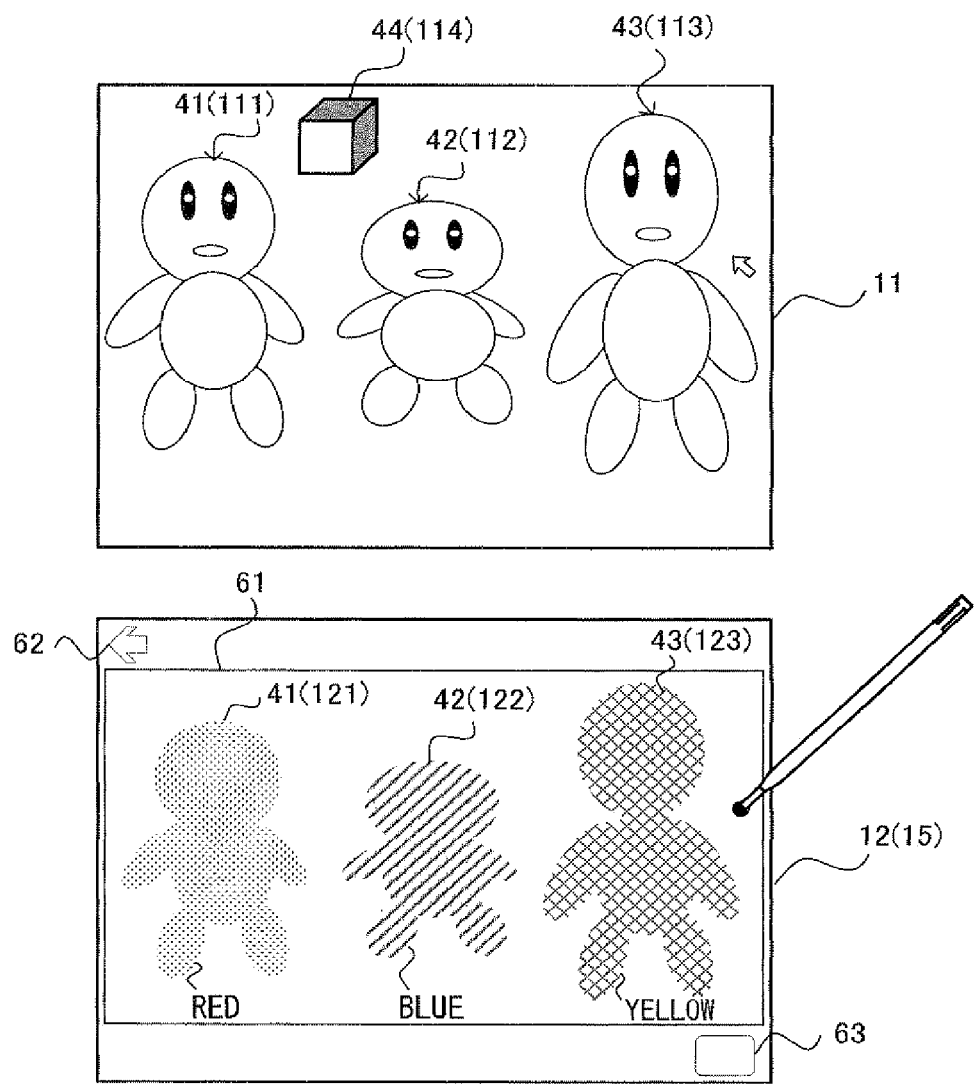
FIG. 7 is a diagram illustrating images displayed on the respective screens of the stereoscopic image display device 11 and the planar image display device 12 when there is a plurality of operable objects.

Next, a case where there is a plurality of operable objects will be described. FIG. 7 is a diagram illustrating images displayed on the respective screens of the stereoscopic image display device 11 and the planar image display device 12 when there is the plurality of operable objects. As shown in FIG. 7, on the screen of the stereoscopic image display device 11, the child object 41 (the child object image 111), a child object 42 (a child object image 112), a child object 43 (a child object image 113), and the furniture object 44 (the furniture object image 114) are displayed. On the other hand, on the screen (the planar image display area 61) of the planar image display device 12, the child object image 121, a child object image 122, and a child object image 123 are displayed. The child object image 121, the child object image 122, and the child object image 123 are images displayed in the planar manner of the silhouetted child object 41, the silhouetted child object 42, and the silhouette child object 43, respectively. Respective display modes of the child object image 121, the child object image 122, and the child object image 123 are different from one another. For example, the child object image 121 is displayed in red, the child object image 122 is displayed in blue, and the child object image 123 is displayed in yellow.

Next, the game, in which an item is used, will be described, with reference to FIG. 8 and FIG. 9. FIG. 8 is a diagram illustrating a case where the user uses an item in the game according to the present embodiment. When the user moves the stick 16 on the screen of the planar image display device 12 while touching an item selection button 63 by using the stick 16, an item 45 (an item image 115 which is stereoscopically displayed) emerges on the stereoscopic image display device 11 in a state in which the item 45 is held by the cursor 60 (hand). The item 45 is a user-operable-object. On the other hand, an item image 125 is displayed on the planar image display device 12. The item image 125 is the silhouette of the item 45 present in the virtual space. As shown in FIG. 8, the item image 125 (the silhouette of the item 45) is displayed in a display mode different from that of the child object image 121 of the child object 41. For example, the item image 125 is displayed in blue while the child object image 121 (the silhouette of the child object 41) is displayed in gray.

FIG. 9 is a diagram illustrating how the respective images displayed on the stereoscopic image display device 11 and the planar image display device 12 change when the item 45 is given to the child object 41. If the user moves the item image 125 to the position of a hand of the child object image 121 while touching the item image 125, the child object 41 displayed on the stereoscopic image display device 11 holds the item 45. In this case, the facial expression of the child object 41 displayed on the stereoscopic image display device 11 changes, and the child object 41 changes so as to raise both hands. Similarly, the child object image 121 displayed on the planar image display device 12 also changes. As described above, the user touches the item selection button 63 to hand the item 45 to the child object 41, thereby letting the child object 41 play with the item 45. Therefore, the child object 41 being joyous is displayed on the stereoscopic image display device 11. The user may be allowed to touch the item selection button 63 to select an item to be used from among a plurality of items. Also, the item 45 may be previously present at a predetermined position (a predetermined position in the virtual space) on the screen of the stereoscopic image display device 11, and the user touches the item image 125 displayed on the planar image display device 12 to hand the item image 125 to the child object 41.

As shown in FIG. 7 to FIG. 9, the respective display modes of the operable objects (the child objects 41 to 43 and the item 45) are changed on the screen of the planar image display device 12. This allows the user to easily associate, at a glance, the objects displayed on the stereoscopic image display device 11 with the objects displayed on the planar image display device 12, respectively. For example, when the respective silhouettes of the plurality of operable objects are displayed in the same color on the screen of the planar image display device 12, it may be difficult for the user to distinguish among the objects. Particularly, when the objects are close to one another, it is difficult for the user to distinguish the borders between the objects, and if the user attempts to touch one object for operation, the user may tend to gaze at the screen of the planar image display device 12. If so, the user is unable to perform operation while seeing the stereoscopic objects displayed on the stereoscopic image display device 11, thereby unable to obtain the feeling of the experience as if the user is directly operating the stereoscopically displayed object. However, since the respective display modes of the objects displayed on the planar image display device 12 are different from one another, the user can easily distinguish among the objects at a glance. Therefore, the user can perform operation while seeing the stereoscopic objects displayed on the stereoscopic image display device 11, and thus obtain the feeling of the experience as if the user is directly operating the stereoscopically displayed object.

As described above, in the game according to the present embodiment, stroking the child object with a hand or by using an item to make the child object joyous gives the user the feeling of the experience as if the user is raising a child, or playing with a child.

(Detail of Game Process)

Figure 10:
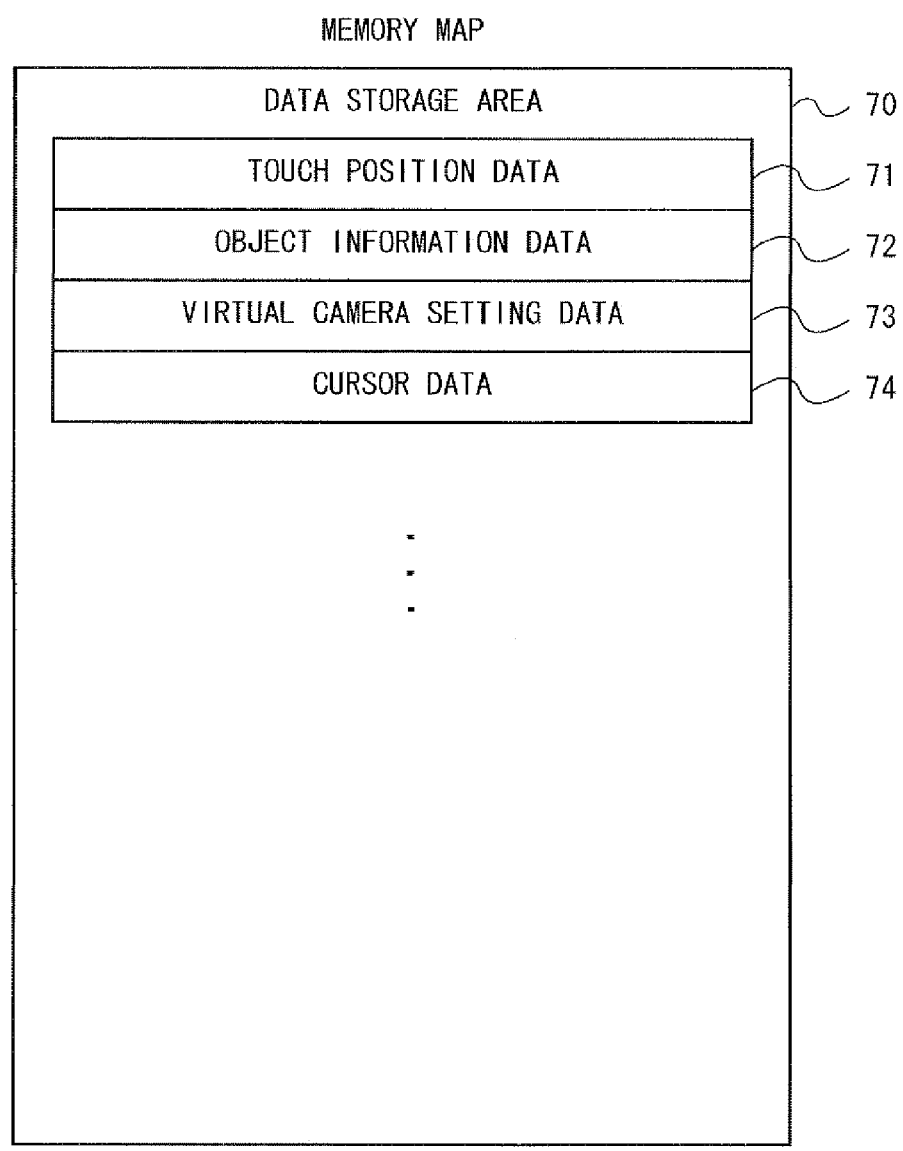
FIG. 10 is a diagram illustrating a memory map of a main memory 31 of the game apparatus 10.

Next, the game process according to the present embodiment will be described in detail, with reference to FIG. 10 to FIG. 13. Initially, main data stored in main memory 31 during the game process will be described. FIG. 10 is a diagram illustrating a memory map of the main memory 31 of the game apparatus 10. As shown in FIG. 10, touch position data 71, object information data 72, virtual camera setting data 73, cursor data 74, and the like are stored in the main memory 31. Other data stored in the main memory 31 are a predetermined program for executing the above-described game process, image data of each object, and the like.

A touch position detected by the touch panel 15 is stored in the touch position data 71. Specifically, the touch position data 71 is an array having a given length, and a coordinate value (XY coordinate system) representing a position on the touch panel 15 (on the screen of the planar image display device 12) is stored in each element of the array. In the touch position data 71, coordinate values, which represent respective touch positions detected by the touch panel 15, are stored in chronological order. Information on each object is stored in the object information data 72. Specifically, the object information data 72 is an array having a given length, and information on one object is stored in each element of the array. The object information includes a position (xyz coordinate system) of the object in the virtual space, data indicative of whether or not the object is operable, data regarding a shape of the object, and the like. For example, a position of the child object 41 in the virtual space, data which indicates that the child object 41 is operable, and shape data of each part (head, body, and the like) of the child object 41 are stored in one element of the array. The each part of the child object 41 is represented by, for example, a plurality of spheres, and the position and the diameter of each sphere are stored in the element of the array as the shape data.

Setting information on the virtual stereo camera 17 and the virtual camera 18 are stored in the virtual camera setting data 73. Specifically, the respective positions in the virtual space, the respective imaging directions, and the respective imaging ranges (the respective angles of view), and the like, of the virtual stereo camera 17 and the virtual camera 18 are stored. The imaging directions of the virtual stereo camera 17 and the imaging direction of the virtual camera 18 are set to be the same as one another. The imaging ranges of the virtual stereo camera 17 and the imaging range of the virtual camera 18 are also set to be the same as one another.

A position in the virtual space and an orientation of the cursor 60 are stored in the cursor data 74. The cursor position is a position in three-dimensional virtual space, which corresponds to the position touched by the user on the touch panel 15. The orientation of the cursor 60 is an orientation of the cursor 60 in the virtual space, and which is the orientation of the cursor 60 when displayed on the surface of the child object 41 or the like.

Figure 11:
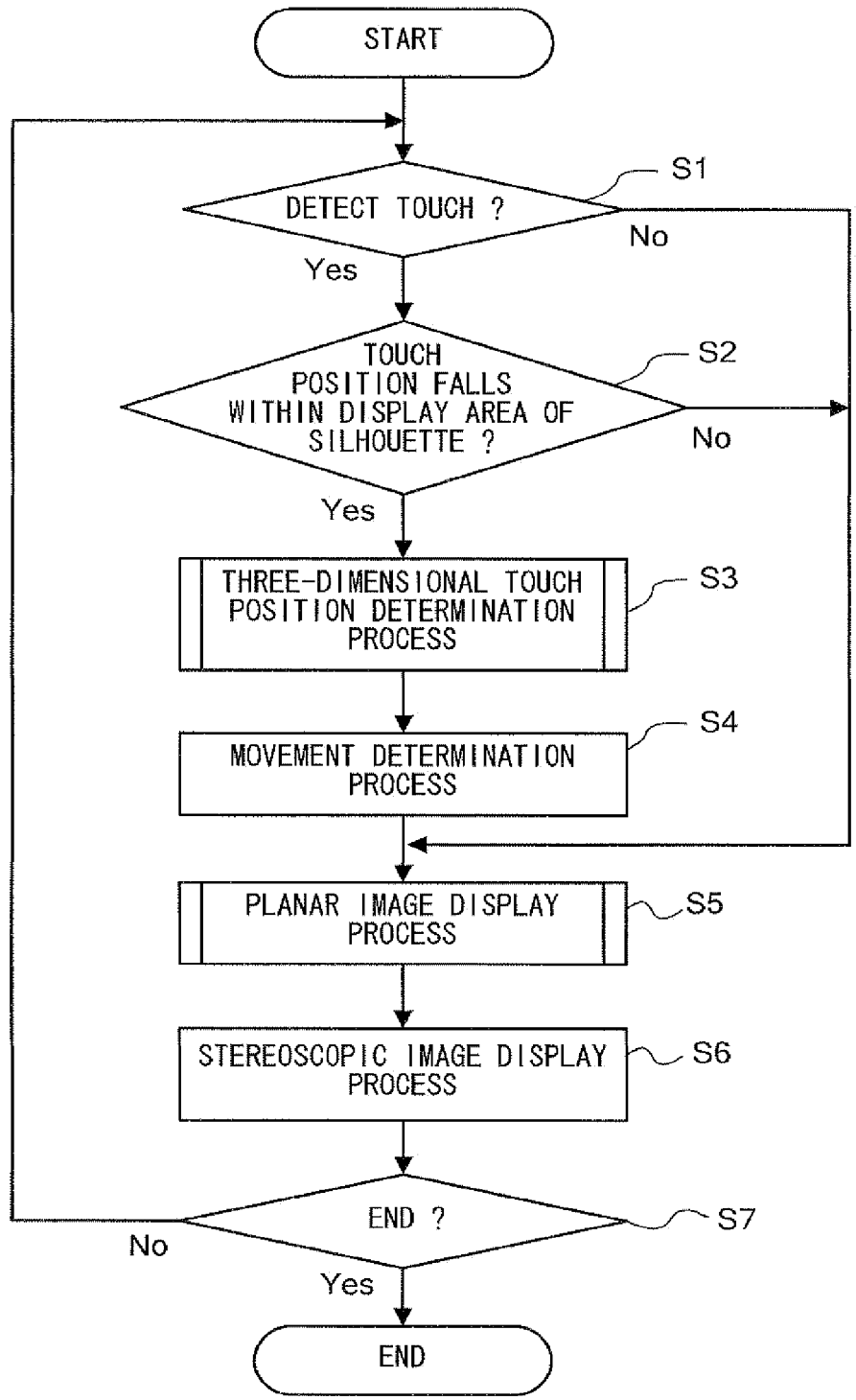
FIG. 11 is a main flowchart showing in detail a game process according to the present embodiment.
Figure 12:
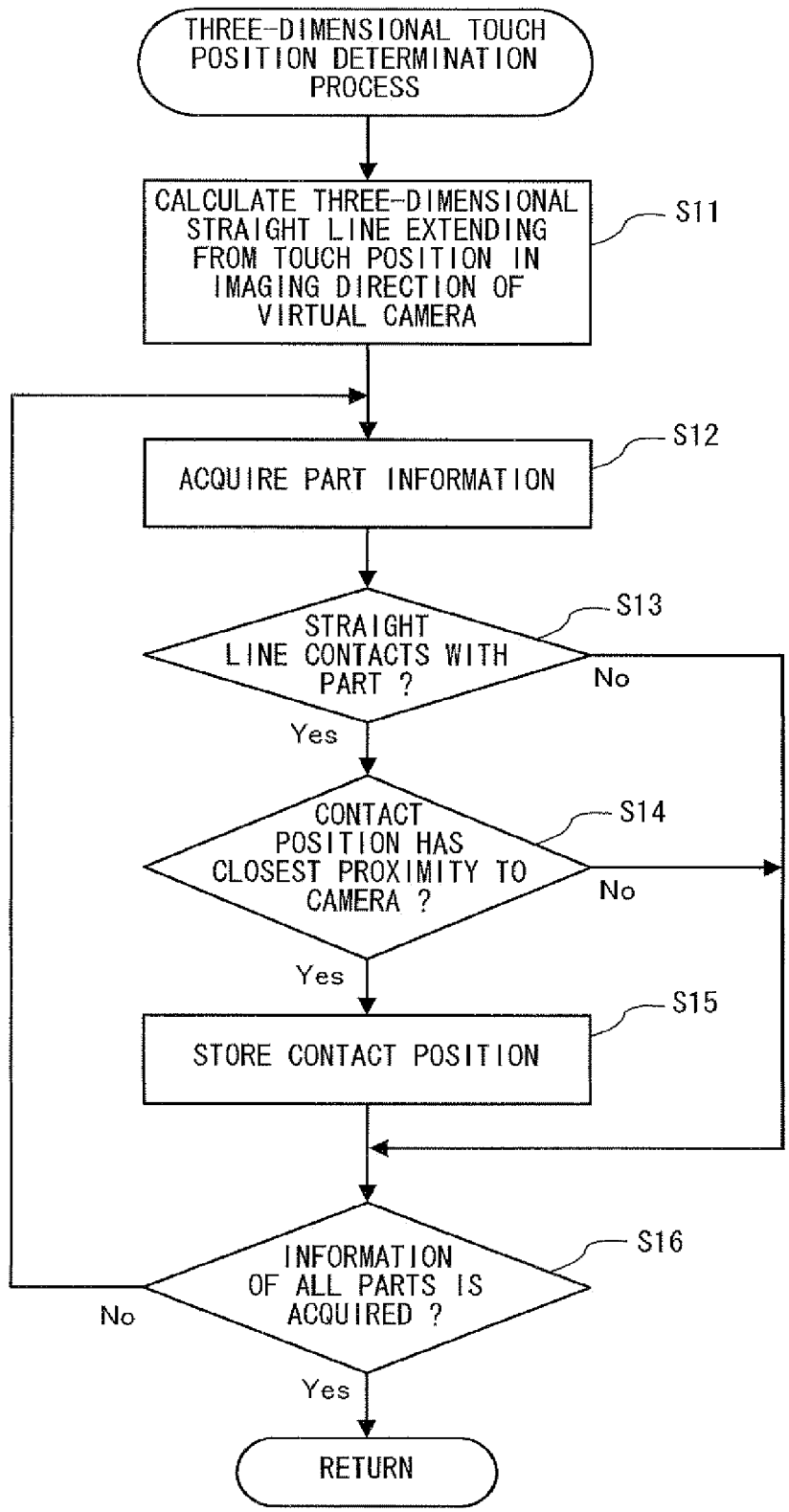
FIG. 12 is a flowchart showing in detail a three-dimensional touch position determination process (step S3)
Figure 13:
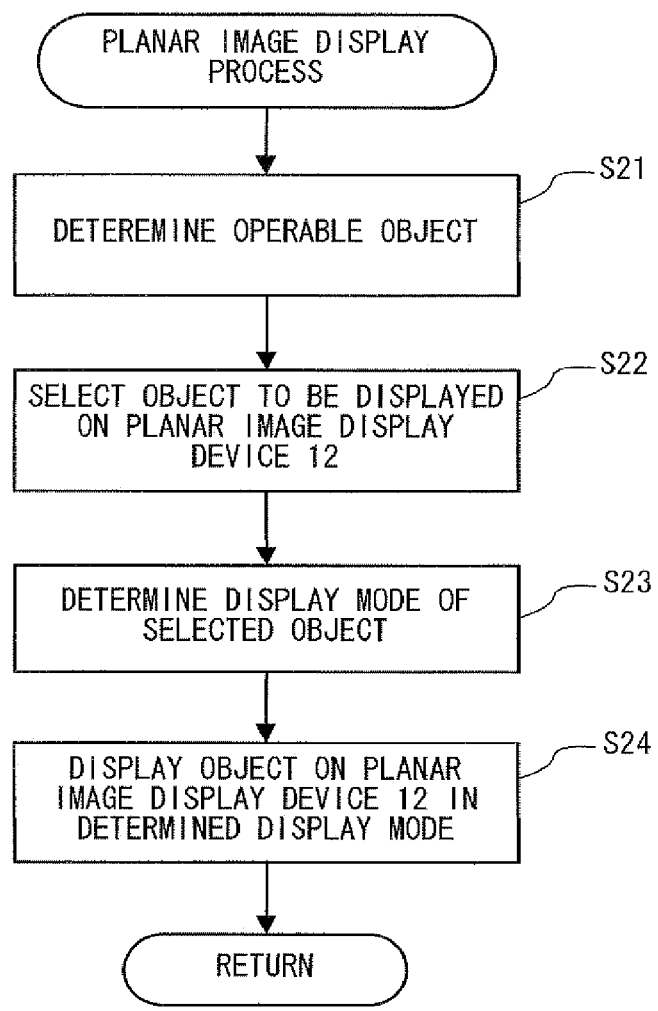
FIG. 13 is a flowchart showing in detail a planar image display process (step S5)

Next, the game process will be described in detail, with reference to FIG. 11 to FIG. 13. FIG. 11 is a main flowchart showing in detail the game process according to the present embodiment. When the game apparatus 10 is powered on, the CPU 30 of the game apparatus 10 executes a boot program stored in the ROM 32 to initialize each unit, such as the main memory 31. Next, the predetermined program stored in the ROM 32 is loaded into the main memory 31 and the CPU 30 starts executing the program. The flowchart shown in FIG. 11 shows a process performed after the above-described process is completed. In FIG. 11, the description of processes which do not directly relate to the present invention is omitted. A processing loop of step S1 through step S7 shown in FIG. 11 is repeatedly executed for each frame (for example, 1/30 second, which is referred to as frame time).

Initially, in step S1, the CPU 30 determines whether or not the touch panel 15 has detected a touch. If the touch panel 15 has detected the touch, the CPU 30 stores the touch position in the touch position data 71 as the latest touch position. The CPU 30 next executes a process of step S2. On the other hand, if the touch panel 15 does not detect the touch, the CPU 30 next executes a process of step S6.

In step S2, the CPU 30 determines whether or not the touch position detected in step S1 falls within a display area of the silhouette (the object). Specifically, the CPU 30 determines whether or not the latest touch position falls within the respective display areas of the object images (121, 122, 123, 125, or the like) displayed on the screen of the planar image display device 12 in an immediately preceding frame in step S6 (described below). If the determination result is affirmative, the CPU 30 next executes a process of step S3. On the other hand, if the determination result is negative, the CPU 30 next executes the process of step S6.

In step S3, the CPU 30 executes a three-dimensional touch position determination process. The process of step S3 determines a position of the cursor 60 in the virtual space, which corresponds to the latest touch position detected in step S1. The process of step S3 will be described in detail, with reference to FIG. 12. FIG. 12 is a flowchart showing in detail the three-dimensional touch position determination process (step S3).

In step S11, the CPU 30 calculates a three-dimensional straight line extending from the latest touch position in the imaging direction of the virtual camera. The CPU 30 calculates the three-dimensional straight line, based on the latest touch position (the touch position detected in step S1) and the imaging direction of the virtual camera 18, which is stored in the virtual camera setting data 73. For example, the CPU 30 performs a coordinate transform to calculate a position (x, y, z) on a virtual plane in the three-dimensional virtual space, which corresponds to the latest touch position (X, Y) being represented two-dimensionally. The virtual plane is a plane representing the touch panel 15 in the virtual space. The virtual plane passes through the point of view of the user (the position of the virtual camera 18), and is perpendicular to the imaging direction of the virtual camera 18. The CPU 30 then calculates a straight line passing through the three-dimensional position (x, y, z) and extending in the imaging direction of the virtual camera. Next, the CPU 30 executes a process of step S12.

In step S12, the CPU 30 acquires part information on each object. Specifically, the CPU 30 refers to the object information data 72 to acquire the shape data of one part, among the plurality of parts, of the object touched in step S2. Next, the CPU 30 executes a process of step S13.

In step S13, the CPU 30 determines whether or not the straight line calculated in step S11 contacts with the part acquired in step S12. If the determination result is affirmative, the CPU 30 next executes a process of step S14. On the other hand, if the determination result is negative, the CPU 30 next executes a process of step S16.

In step S14, the CPU 30 determines whether or not the contact position has the closest proximity to the virtual camera. Specifically, the CPU 30 calculates a contact position (a coordinate of a point of intersection of the calculated straight line with a sphere representing the acquired part) of the straight line calculated in step S11 with the part acquired in step S12. Next, the CPU 30 calculates a distance between the calculated contact position and the virtual camera 18. The CPU 30 then compares the calculated distance with the closest proximity stored in the main memory 31 (which is stored in step S15 described below). If the contact position has the closest proximity to the virtual camera 18, the CPU 30 next executes a process of step S15. On the other hand, if the contact position does not have the closest proximity to the virtual camera 18, the CPU 30 next executes a process of step S16.

In step S15, the CPU 30 stores in the cursor data 74 the contact position (the point of intersection of the straight line with the part) calculated in step S14. Also, the CPU 30 stores in the main memory 31 the distance (the distance between the contact position and the virtual camera 18) calculated in step S14 as the closest proximity. Next, the CPU 30 executes the process of step S16.

In step S16, the CPU 30 determines whether or not information of all parts has been acquired. If the information of all parts has not been acquired, the CPU 30 executes again the process of step S12. By the processes of step S12 through step S16 being repeatedly executed, the positions of all touched parts of the object, which contact with the straight line calculated in step S11, are calculated. Then, among the calculated contact positions, the position closest to the virtual camera 18 (a position closest to the user) is calculated as the cursor position. On the other hand, when the information of all parts has been acquired, the CPU 30 ends the three-dimensional touch position determination process.

Returning to FIG. 11, the CPU 30 next executes a process of step S4. In step S4, the CPU 30 executes a movement determination process. In step S4, operation performed on the touched object is determined, and the movement of the object is determined according to the operation. Specifically, the CPU 30 refers to the touch position data 71 to determine the operation performed on the touched object. More specifically, the CPU 30 determines the operation performed by the user, based on the touch positions in the past several frames stored in the touch position data 71 in chronological order. In step S4, for example, it is determined whether or not the operation performed by the user is the operation that the user strokes the chest of the child object 41 in the up-down directions as shown in FIG. 5. Or, in step S4, for example, it is determined whether or not the operation performed by the user is the operation that the user holds and moves the item 45 shown in FIG. 8. As described above, in step S4, based on the touch positions in the past several frames, a type of operation performed by the user is determined. Then, according to the determined type of operation, the movement of the touched object is determined. For example, if the operation performed by the user is the operation that the user strokes the chest of the child object 41 in the up-down directions as shown in FIG. 5, the CPU 30 determines a movement of the child object 41 so that the child object 41 changes the facial expression and raises both hands. The CPU 30 next executes the process of step S5.

In step S5, the CPU 30 executes a planar image display process. The process of step S5 displays the silhouette of the object on the screen of the planar image display device 12, or the like. The process in step S5 will be described in detail, with reference to FIG. 13. FIG. 13 is a flowchart showing in detail the planar image display process (step S5).

In step S21, the CPU 30 determines an operable object. Specifically, the CPU 30 determines the object to display on the screen, based on a first determination and a second determination. That is, the CPU 30 determines, as the first determination, whether or not the type of the object applies to the user-operable-object. Also, the CPU 30 determines, as the second determination, whether or not a distance between the object and the user is equal to or less than a predetermined distance.

Specifically, at the first determination in step S21, the CPU 30 determines whether or not each object applies to the user-operable-object. For example, the child objects 41 through 43 and the item 45 are previously set as the user-operable-objects. On the other hand, the furniture object 44 is previously set as user-inoperable-object. In the first determination, the CPU 30 determines whether or not each object applies to the user-operable-object, based on the type of the each object.

Next, in the second determination of step S21, the CPU 30 determines whether or not the distance between the object and the user (the virtual stereo camera 17 or the virtual camera 18) is equal to or less than the predetermined distance. The CPU 30 determines the operable object, based on the first determination and the second determination. That is, the CPU 30 conducts the first determination and the second determination on each object. If the object whose result of both the first determination and the second determination are affirmative is set as the operable object. The CPU 30 then stores data indicative of whether or not the object is operable in the main memory 31 (updates the object information data 72).

As described above, the operable object is defined not only depending on the type thereof, but also depending on the distance between the object and the user (the virtual stereo camera 17 or the virtual camera 18). For example, if the child object 42 is present at a position being farther than the predetermined distance away from the user, the child object 42 is not set as the operable object. As described above, in the game according to the present embodiment, by performing the predetermined operation while seeing the child object displayed on the stereoscopic image display device 11, the user can obtain the feeling of the experience as if the user is actually touching a child. However, if the user is allowed to operate a child object present out of user's reach, it causes the user to feel a sense of discomfort. Therefore, although the object is of the operable type, if the object is farther than the predetermined distance away from the user, the object is set as an inoperable object.

After step S21, the CPU 30 next executes a process of step S22.

In step S22, the CPU 30 selects an object to be displayed on the screen of the planar image display device 12. Specifically, the CPU 30 refers to the object information data 72 to select an operable object. As described above, the data indicative of whether or not each object is operable is stored in the object information data 72 by the process of step S21. The CPU 30 selects an operable object as the object to be displayed on the screen of the planar image display device 12. Next, the CPU 30 executes a process of step S23.

In step S23, the CPU 30 determines a display mode of the object selected in step S22. Specifically, if there is a plurality of objects which have been selected in step S22, the CPU 30 determines the respective display modes of the objects so that the respective display modes are different from one another. For example, if the child object 41, the child object 43, and the item 45 are the selected, the CPU 30 determines gray, blue, and red as the respective display modes of the child object 41, the child object 43, and the item 45. Next, the CPU 30 executes a process of step S24.

In step S24, the CPU 30 displays each object on the screen of the planar image display device 12 in the respective display mode determined in step S23. Specifically, in step S24, the CPU 30 hides the objects other than the objects selected in step S22, displays the respective silhouettes of the objects selected in step S22, and takes an image of the virtual space by using the virtual camera 18. This allows the CPU 30 to display the selected objects on the screen of the planar image display device 12 in the respective display modes determined in step S23 (displays the respective silhouettes of the selected objects).

In step S24, a state in which the silhouette (the object) moves according to the movement of the object determined in step S4. Moreover, the CPU 30 displays an operation button 62 and an item selection button 63 on the upper left and the lower right of the screen, respectively. The CPU 30 then ends the planar image display process.

Returning to FIG. 11, the CPU 30 next executes a process of step S6. In step S6, the CPU 30 executes a stereoscopic image display process. In step S6, the CPU 30 arranges the cursor 60 in the virtual space, takes an image of the virtual space by using the virtual stereo camera 17, and displays the stereoscopic image on the screen of the stereoscopic image display device 11. Specifically, the CPU 30 determines the orientation of the cursor 60, and arranges the cursor 60 having the shape of the human hand at the position of the cursor 60, which is determined in step S3 (that is, arranges the cursor 60 on a surface of the touched object). Specifically, the CPU 30 determines the orientation of the cursor 60, based on a plane, in the virtual space, tangential to the part of the object at the position of the cursor 60 determined in step S3, and arranges the cursor 60 in the virtual space. On the other hand, if the determination result in step S2 is negative, the CPU 30 arranges the cursor 60 having the arrow shape in the virtual space at a predetermined position corresponding to the latest touch position. Next, the CPU 30 takes the left-eye image and the right-eye image by using the virtual stereo camera 17. Next, the CPU 30 longitudinally divides each of the left-eye image and the right-eye image into rectangle-shaped images and synthesizes resulting images. For example, the CPU 30 divides each of the left-eye image and the right-eye image into rectangle-shaped images each having one line of pixels aligned in the vertical direction, and alternately aligns the rectangle-shaped images of each image, thereby synthesizing the two images. The CPU 30 then outputs the synthesized image to the stereoscopic image display device 11. By seeing the synthesized image through the parallax barrier in the stereoscopic image display device 11, the user can view the left-eye image with the user's left eye and view the right-eye image with the user's right eye. This allows the user to see an image having the stereoscopic effect. Similar to the screen of the planar image display device 12, the state, in which the object moves according to the movement of the object determined in step S4, is displayed on the screen of the stereoscopic image display device 11.

Figure 14:
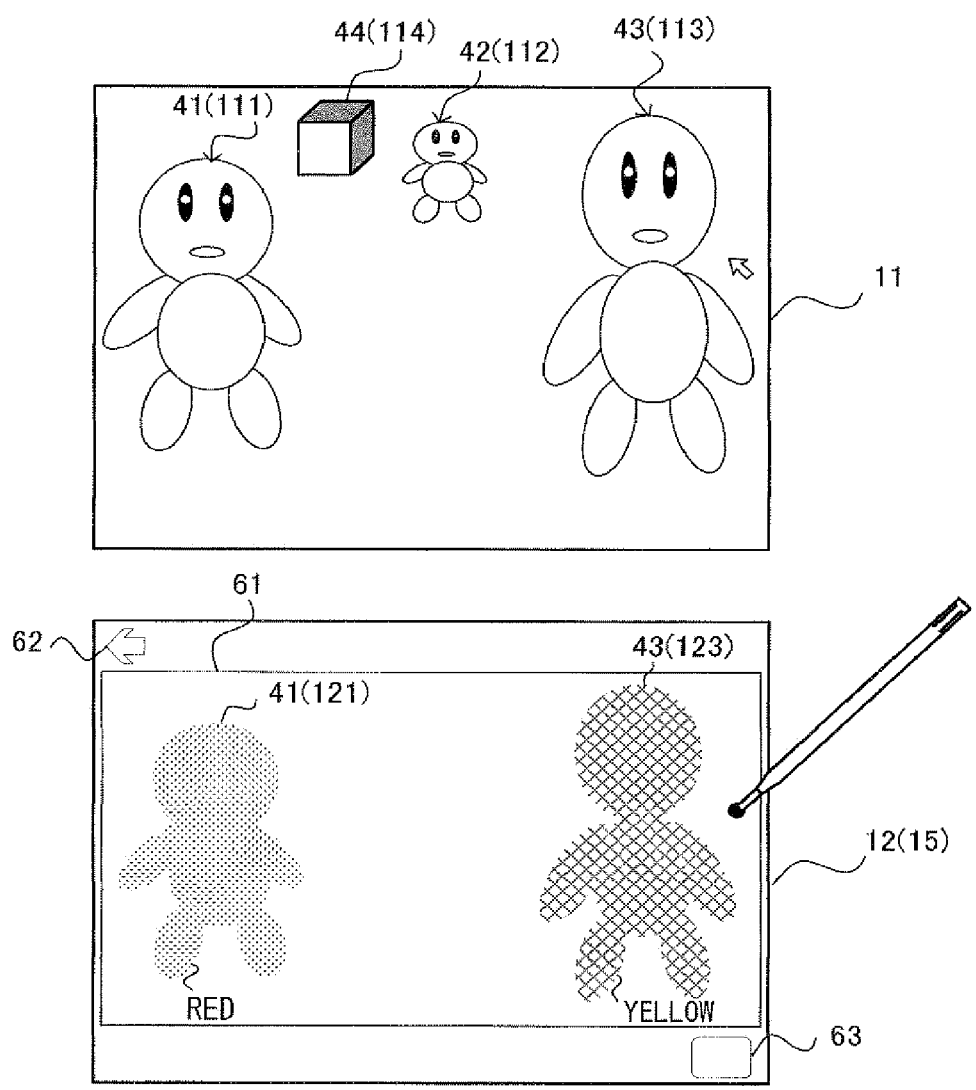
FIG. 14 is a diagram illustrating an example of images displayed on the respective screens of the planar image display device 12 and the stereoscopic image display device 11.

FIG. 14 is a diagram illustrating an example of images displayed on the respective screens of the planar image display device 12 and the stereoscopic image display device 11. As shown in FIG. 14, since the child object 42 is farther than the predetermined distance away from the user, the child object 42 is not determined to be the operable object in step S21. Moreover, since the furniture object 44 is not previously set as the user-operable-object, thus inoperable object. Because of this, the child object 42 and the furniture object 44 are not displayed on the screen of the planar image display device 12. The child object 41 and the child object 43 are previously set as the user-operable-objects, and the respective distances thereof from the user is equal to or less than the predetermined distance. Therefore, the child object 41 and the child object 43 are displayed on the screen of the planar image display device 12. In this case, the child object 41 and the child object 43 are displayed on the screen of the planar image display device 12 in different display modes. For example, on the screen of the planar image display device 12, the child object 41 is displayed in red and the child object 43 is displayed in yellow, both in the planar manner. If the child object 42 moves and the distance thereof from the user becomes equal to or less than the predetermined distance, the child object 42 is displayed on the screen of the planar image display device 12. Each child object moves in the virtual space, according to a predetermined rule. The CPU 30, for example, changes the position of each child object over time, or changes the position of each child object, according to the operation by the user. When the child object 42 moves from the position farther than the predetermined distance away from the user, as shown in FIG. 14, to the position having the distance equal to or less than the predetermined distance from the user as shown in FIG. 7, that is, when the child object 42 approaches and enters within a range in which the user can touch the child object 42, the child object 42 is displayed on the screen of the planar image display device 12.

Next, the CPU 30 executes a process of step S7.

In step S7, the CPU 30 determines whether or not to end the game process. For example, if the operation button 62 is pressed by the user, the CPU 30 ends the game process. If the game process is not ended, the CPU 30 executes again the process of step S1. This is the end of the description of the flowchart shown in FIG. 11.

As described above, in the game according to the present embodiment, each object in the virtual space is stereoscopically displayed on the screen of the stereoscopic image display device 11, and the planar image taken of the same virtual space region is displayed on the screen of the planar image display device 12. The respective silhouettes of only operable objects are displayed on the screen of the planar image display device 12, and inoperable objects are not displayed. The operation on each object displayed on the stereoscopic image display device 11 is performed by touching the screen of the planar image display device 12. This allows the user to obtain the feeling of the experience as if the user is directly operating the object included in the stereoscopically visible image, while seeing the stereoscopically visible image displayed on the screen of the stereoscopic image display device 11.

The content and the order of the above-described processes shown in the flowcharts are merely illustrative. For example, the process of step S3 may be substituted by the following process. That is, the information on the imaging direction (position information in the imaging direction) of the virtual camera 18 may be embedded in the displayed result (the result of the process of step S5), and the position in the three-dimensional virtual space, which corresponds to the position designated by the user on the touch panel 15, may be obtained from the information.

Moreover, in the present embodiment, only the user-operable-objects (the child objects 41 through 43), which are previously set to be so, and which are equal to or less than the predetermined distance from the virtual camera, are displayed on the planar image display device 12. In another embodiment, the objects including the user-operable objects and the user-inoperable object (the furniture object 44), which satisfy predetermined conditions, may be displayed on the planar image display device 12. Here, as described above, the predetermined conditions may be determined based on the distance from the virtual camera (the user), or may be various conditions during the advance of the game. For example, in a first game scene, a first object is set to be the operable object, and the silhouette thereof may be displayed on the screen of the planar image display device 12. In this case, if the game transits to a second game scene, which is different from the first game scene, the first object may be set to be inoperable object, and may not be displayed on the screen of the planar image display device 12. For example, a weapon object may be set to be operable only in a fight scene so that the weapon object may be operated by the user.

Moreover, in the present embodiment, if there are is a plurality of operable objects, the plurality of operable objects is displayed on the planar image display device 12 in different colors (the child object 41 is displayed in red, the child object 42 is displayed in blue, and the child object 43 is displayed in yellow). In another embodiment, each object may be displayed in any mode if the object is distinguishable at a glance when the user sees the screen of the planar image display device 12. For example, if objects having the same color are adjacent to each other (close to each other), it is difficult for the user to distinguish, at a glance, that these objects are different from one other. Therefore, by displaying the adjacent objects in different display modes on the planar image display device 12, the user is able to distinguish the objects from one another at a glance. For example, in FIG. 7, the child object 42 (the child object image 122) may be displayed in blue, and the child objects 41 (the child object image 121) and 43 (the child object image 123) may be displayed in gray.

Moreover, in the present embodiment, only the object selected in step S22 are displayed on the screen of the planar image display device 12, and if there is a plurality of such objects, they are displayed in different colors. In another embodiment, the selected objects may be displayed in the display mode different (in color, fill pattern, or the like) from that of the other objects. For example, in the case where the child objects 41 through 43 and the furniture object 44 are displayed on the screen of the stereoscopic image display device 11, and if merely the child object 41 is operable (selected), the child object 41 may be displayed in red, and the other objects (42, 43, and 44) may be displayed in gray on the screen of the planar image display device 12.

Moreover, while, in the present embodiment, the silhouette of each object is displayed (one-color display) on the planar image display device 12, each object displayed on the planar image display device 12 may be displayed in any display mode, if the object displayed on the planar image display device 12 is not prominent in the display mode, as compared to the image displayed on the stereoscopic image display device 11. For example, in another embodiment, the object having fewer colors may be displayed on the planar image display device 12. For example, if each part of the object displayed on the stereoscopic image display device 11 is displayed in 32-bit color, each part of the object displayed on the planar image display device 12 may be displayed in 8-bit color. Also, in another embodiment, merely the contour of the object may be displayed on the planar image display device 12. Moreover, in another embodiment, the object may be filled with a pattern, such as lines or dots, and displayed on the planar image display device 12. Moreover, in another embodiment, each object may be distinguishably displayed on the planar image display device 12 by changing the color intensity (brightness) of each object. Also, in another embodiment, by changing the color intensity (brightness) of each part of the object, each part of the object may be distinguishably displayed on the planar image display device 12.

As described above, in another embodiment, the object may be displayed on the planar image display device 12 in a simplified manner. Here, examples of the simplified display are various display modes in which the shape of the outline (contour) of the displayed object remains unchanged, such as a display mode including the silhouette display described above, in which the object whose color is reduced is displayed or the contour-only display; a display mode in which the area surrounded by the outline (contour) of the displayed object is filled with a pattern of lines or dots; and a display mode in which the brightness of the displayed object is changed. That is, the object displayed on the planar image display device 12 may be displayed in any display mode if the object is simplified as compared to the object displayed on the stereoscopic image display device 11.

Furthermore, in another embodiment, the object displayed on the stereoscopic image display device 11 and the object displayed on the planar image display device 12 may be displayed in the same display mode (the same color, the same contour, the same filling pattern, or the like), except for that the former is a stereoscopic image and the latter is a planar image. That is, the object is stereoscopically displayed on the stereoscopic image display device 11, and the object, not the silhouette thereof (without being simplified), may be displayed in the planar manner on the planar image display device 12. As described above, a stereoscopically visible image of the object may be displayed on the stereoscopic image display device 11, while the same object may be displayed on the planar image display device 12, which is different from the stereoscopic image display device 11, in the same display mode but in the planar manner. Then, designation may be made on the screen of the planar image display device 12 and thereby the object may be operated. This allows the user to easily operate the object, while seeing the object displayed on the stereoscopic image display device 11. That is, if the object is displayed on the stereoscopic image display device 11 in the stereoscopically visible manner and if the user attempts to directly designate on the screen of the stereoscopic image display device 11, a difference occurs between the designated position and the position of the object in the depth direction of the screen, of which the user feels an experience, as described above. Therefore, it is difficult for the user to designate the object. Also, as described above, if the user attempts to directly designate on the screen of the stereoscopic image display device 11, the user is unable to obtain the feeling of the experience as if the user is directly operating the object. However, stereoscopically displaying the object on the stereoscopic image display device 11 while displaying the same object on the planar image display device 12 in the planar manner, which is different from the stereoscopic image display device 11, allows the user to easily designate the object for operation, also obtain the feeling of the experience as if the user is directly operating the object.

Furthermore, in the present embodiment, the image (a first image) taken by the virtual stereo camera 17 is displayed on the stereoscopic image display device 11, the image (a second image) taken by the virtual camera 18, which is set at the middle of the virtual cameras 17a at the left and the virtual camera 17b at the right which are the components of the virtual stereo camera 17, is displayed on the planar image display device 12. In another embodiment, the second image may be taken by either one of the virtual cameras 17a at the left and the virtual camera 17b at the right which are the components of the virtual stereo camera 17. Also, the second image may be taken by a virtual camera, which is set at any position between the virtual cameras 17a at the left and the virtual camera 17b at the right. That is, the second image may be taken by a virtual camera set at substantially the same position as that of the virtual camera which takes the first image.

Furthermore, in the present embodiment, the image (including the object) displayed on the stereoscopic image display device 11 and the image displayed on the planar image display device 12 (in the planar image display area 61) are substantially the same image. Here, the "substantially the same image" may be images in which one of the images is enlarged in a predetermined ratio to the other of the images. For example, the length in the vertical direction (or/and the horizontal direction) of the image displayed on the planar image display device 12 may be set to be 70% of the length in the vertical direction (or/and the horizontal direction) of the image displayed on the stereoscopic image display device 11.

Furthermore, in the present embodiment, the image displayed on the stereoscopic image display device 11 and the image displayed on the planar image display device 12 are the images taken of substantially the same virtual space region. Here, the "images taken of substantially the same virtual space region" indicates images having substantially the same imaging range. The imaging range of one of the images may be wide in a predetermined ratio to the imaging range of the other of the images. For example, the imaging range of the image (the virtual space region displayed in the image) displayed on the planar image display device 12 may be set to be 70% of the imaging range (with respect to the vertical direction and/or the horizontal direction) of the image displayed on the stereoscopic image display device 11. As described above, in the present embodiment, since the imaging range of the image displayed on the planar image display device 12 is substantially the same as the imaging range of the image displayed on the stereoscopic image display device 11, the user can operate the object while seeing the screen of the stereoscopic image display device 11, and without the necessity of seeing the screen of the planar image display device 12. That is, since the respective imaging ranges of the two images are the same as each other, for example, if the child object is displayed on the right side of the screen of the stereoscopic image display device 11, the same object is displayed also on the right side of the screen of the planar image display device 12. Therefore, the user can operate the object on the screen of the planar image display device 12, while seeing the screen of the stereoscopic image display device 11 and without the necessity of verifying on the screen of the planar image display device 12.

Also, the size or the imaging range of the image displayed on the planar image display device 12 may be adjusted so that the object included in the two images has substantially the same size as each other (the object in one of the two images may be larger by about 30% than the object in the other of the two images (with respect to the vertical direction and/or the horizontal direction). For example, if the imaging range of the image displayed on the planar image display device 12 is set to be narrow, the object included in the image is displayed in an enlarged manner (zoomed). The object included in the image displayed on the planar image display device 12 is determined by the size or also the imaging range of the image itself (screen itself). Therefore, the size or the imaging range of the image displayed on the planar image display device 12 may be adjusted to an extent which does not make the user feel the sense of discomfort when performing the touch operation on the screen of the planar image display device 12, while seeing the object on the screen of the stereoscopic image display device 11.

Furthermore, the sizes of the object displayed on the two screens are not necessarily substantially the same as each other. For example, even in a case where the screen of the stereoscopic image display device 11 is several times larger than the screen of the planar image display device 12, the user can perform, without feeling the sense of discomfort, the operation on the screen of the planar image display device 12, while seeing the screen of the stereoscopic image display device 11. That is, the object included in the respective images displayed on the two screens is taken from the same direction, and thereby the appearance of the object may be the same (the same direction in which the object is seen). This allows the user to easily operate the object, while seeing one screen and designating on the other screen, regardless of the difference in size of the respective screens.

Furthermore, in the present embodiment, the one screen is configured to display a stereoscopically visible image (the stereoscopic image display device 11) and the other screen is configured to display a planar image (the planar image display device 12). In another embodiment, for example, the one screen may have high resolutions and the other screen may have with low resolutions. That is, the one screen may have a different display type from the other screen (the one screen configured to display a stereoscopically visible image and the other screen configured to display a planar image, the one screen having high resolutions and the other screen having low resolutions, or the like).

Furthermore, in the present embodiment, the respective imaging directions of the virtual cameras at the left and the right, which are the components of the virtual stereo camera 17, are the same as each other, and the imaging direction of the virtual camera 18 is also the same. In another embodiment, these imaging directions are not necessarily made coincide with one another exactly, and may be substantially the same as one another. For example, in FIG. 4, the imaging direction A of the left-eye virtual camera 17a may be a direction of a straight line which connects the child object 41 with the left-eye virtual camera 17a, and the imaging direction B of the right-eye virtual camera 17b may be a direction of a straight line which connects the child object 41 with the right-eye virtual camera 17b. When the respective imaging directions of the virtual cameras at the left and the right are thus set, the stereoscopic effects of the objects (the child object 41 and the furniture object 44) displayed on the stereoscopic image display device 11 change. Moreover, the imaging direction of the virtual camera 18 may also be different by a predetermined angle (several degrees to the low 10's of degrees) from the imaging direction of the left-eye virtual camera 17a or the right-eye virtual camera 17b. Even though the imaging direction of the virtual camera 18 is thus set so as to be different from the imaging directions of the virtual stereo camera 17 by the predetermined angle, a planar image, which is viewed from substantially the same direction in which the object stereoscopically displayed on the stereoscopic image display device 11 is viewed, is displayed on the screen of the planar image display device 12. Therefore, the user can designate the object displayed on the planar image display device 12 for operation, while seeing the stereoscopic object displayed on the stereoscopic image display device 11.

Furthermore, in the present embodiment, the stereoscopic image (the stereoscopically visible image) is displayed on the stereoscopic image display device 11, and the planar image is displayed on the planar image display device 12. In another embodiment, images viewed from substantially the same direction may be simultaneously displayed in two display areas having the same display type, respectively. For example, in another embodiment, the first image including the object may be displayed in the first display area, and the second image, which is the same as the first image, may be displayed in the planar manner in the second display area.

As described above, the first image displayed in the first display area may be an image of a predetermined display object viewed from a predetermined direction. The second image displayed in the second display area may be an image of the predetermined display object viewed from substantially the same direction as the predetermined direction. Then, the user designates a position on the second display area, thereby operating the predetermined display object in the first display area and the second display area. The images of the predetermined display object viewed from substantially the same direction are thus displayed in two display areas, and thereby the user can designate the display object included in the image displayed in the second display area, while seeing the predetermined display object, which is displayed in the first display area. This allows the user to operate the predetermined display object.

Further, while the display capable of displaying the stereoscopic image which can be viewed by the naked eye is employed in the present embodiment, the present invention is applicable to viewing the stereoscopic images by means of glasses having the time division scheme or the deflecting scheme, the anaglyphic format (the red-blue glasses format), or the like.

Furthermore, in the present embodiment, the user operates the object present in the virtual space in the game. In another embodiment, an image of an actual space taken by a stereo camera may be displayed on the stereoscopic image display device 11, and the same image may be displayed on the planar image display device 12. Then, the image displayed on the planar image display device 12 may be operated, thereby changing the image displayed on the stereoscopic image display device 11. For example, the image displayed on the planar image display device 12 may be operated, thereby enlarging or correcting the image displayed on the stereoscopic image display device 11.

Furthermore, in the above-described embodiments, the handheld game apparatus 10, which includes both the stereoscopic image display device 11 and the planar image display device 12, is assumed. In another embodiment, for example, a first display device capable of displaying a stereoscopically visible image, a second display device configured to display only a planar image, and a control apparatus which performs the above-described processes may be configured to be hardware independently of one another. Then, these components may function as the display control system by being connected with one another by wire or wirelessly. That is, the display control system may be configured of one device as the embodiment described above, or may be configured of a plurality of devices.

Further, in another embodiment, a display apparatus capable of setting, on one screen, a stereoscopic image display area, in which a stereoscopic image is displayed, and a planar image display area, in which a planer image is displayed, may be employed as the stereoscopic image display device 11 and the planar image display device 12, respectively. That is, the display apparatus capable of setting two different display areas on the same screen may be employed.

Further, in another embodiment, the display control method described above may be applied to any information processing apparatus, which includes a display device and a designated position detection device (for example, PDAs (Personal Digital Assistant), mobile phones, and the like).

Further, in the embodiment described above, the processes shown in the above-described flowcharts are performed by the CPU 30 of the game apparatus 10 executing the predetermined program. In another embodiment, a part or the entirety of the processes may be performed by a dedicated circuit included in the game apparatus 10. For example, a dedicated GPU (Graphics Processing Unit) or the like, which generates images to be displayed on the stereoscopic image display device 11 and the planar image display device 12, may be provided.

Second Embodiment (Structure of Game Apparatus of Second Embodiment)

Figure 15:
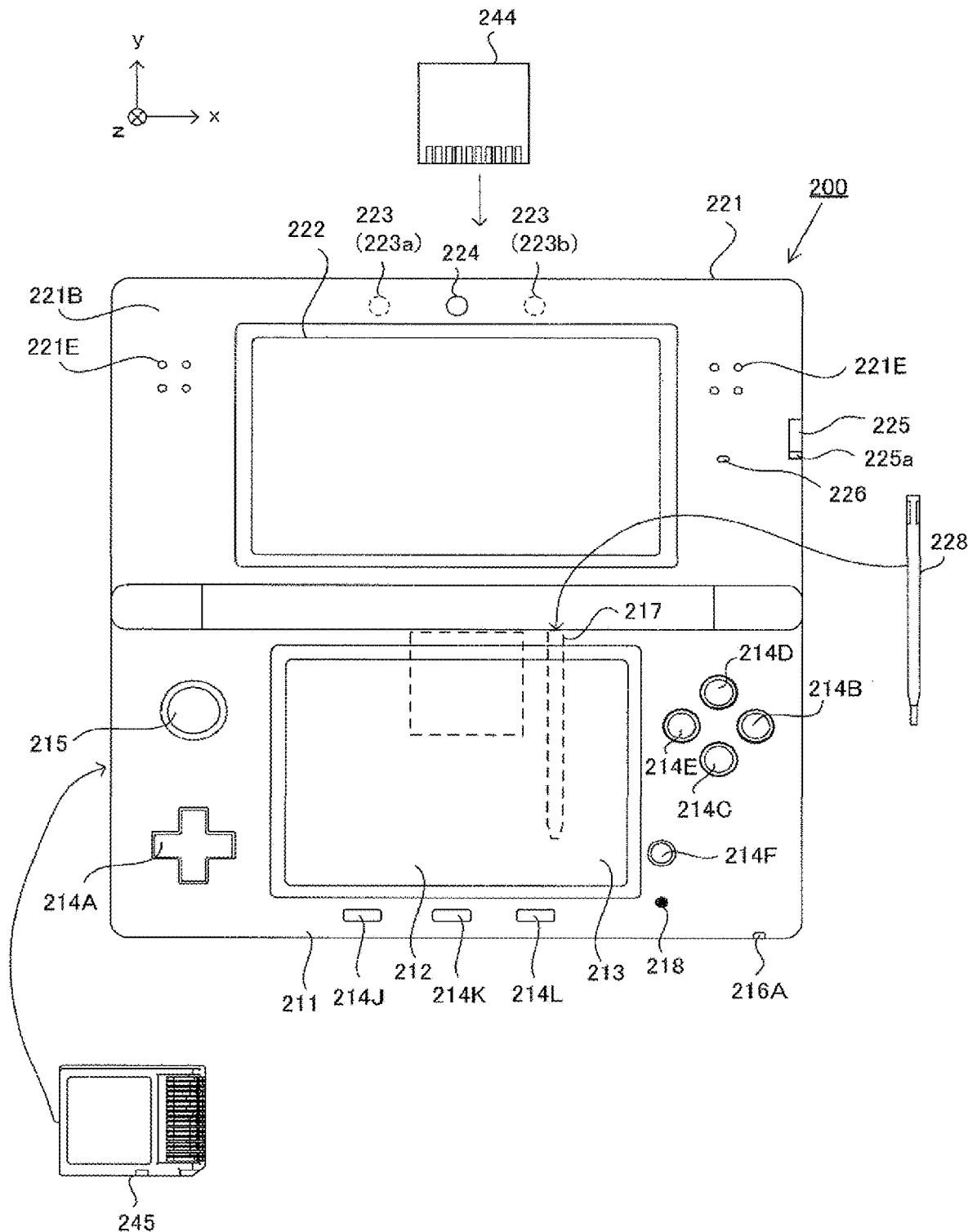
FIG. 15 is a front view showing an external of a game apparatus 200 in an opened state.
Figure 16:
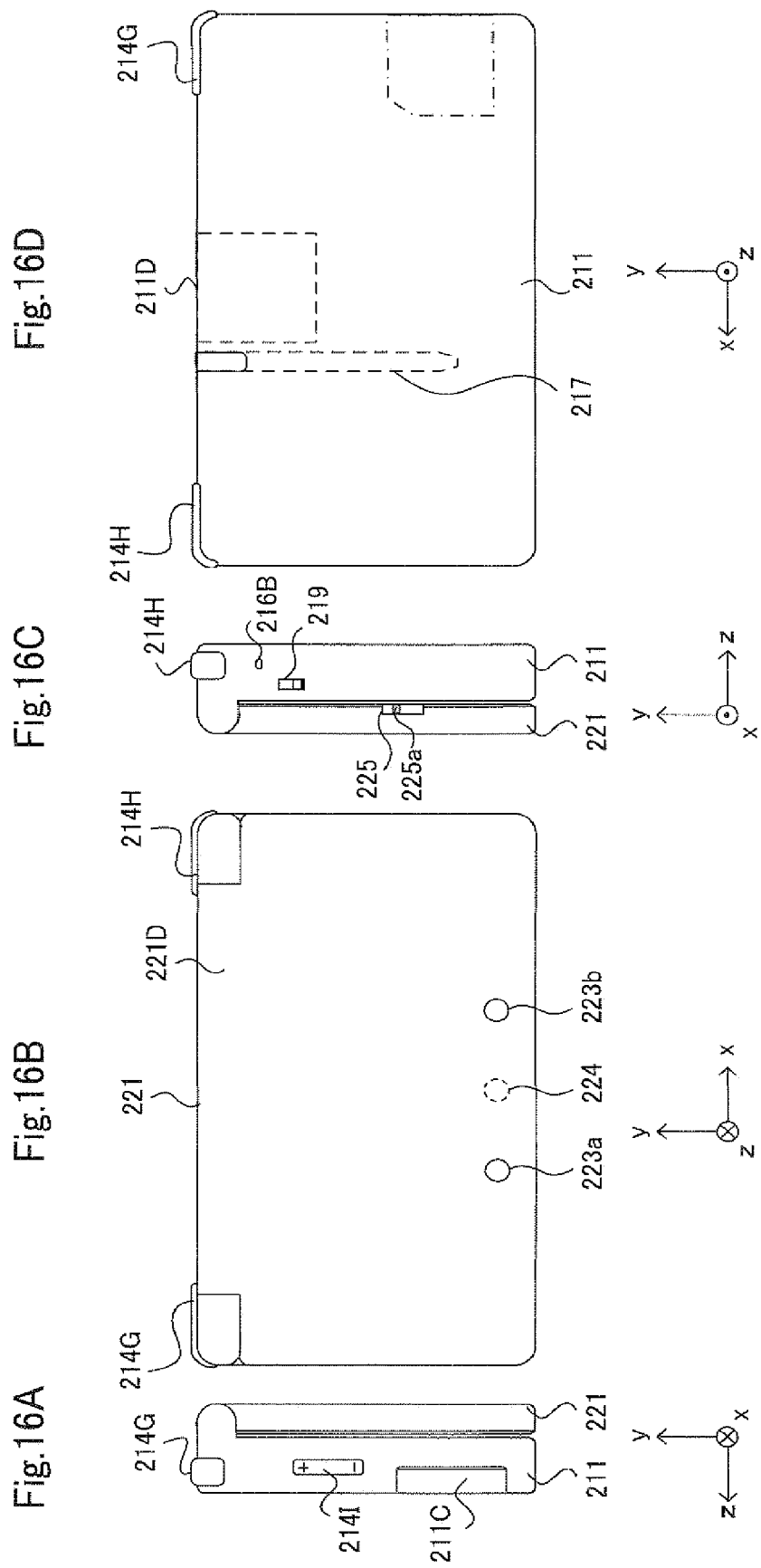
FIG. 16A is a left side view of the game apparatus 200 in a closed state.
FIG. 16B is a front view of the game apparatus 200 in the closed state.
FIG. 16C is a right side view of the game apparatus 200 in the closed state.
FIG. 16D is a rear view of the game apparatus 200 in the closed state.

Hereinafter, a game apparatus according to a second embodiment of the present technology will be described. FIG. 15 is a front view showing an external view of a game apparatus 200 in an opened state. FIG. 16A is a left side view of the game apparatus 200 in a closed state, FIG. 16B is a front view of the game apparatus 200 in the closed state, FIG. 16C is a right side view of the game apparatus 200 in the closed state, and FIG. 16D is a rear view of the game apparatus 200 in the closed state. The game apparatus 200 is a handheld game apparatus, and configured to be foldable as shown in FIG. 15 to FIG. 16D. FIG. 15 shows the game apparatus 200 in the opened state and FIG. 16A to 16D each show the game apparatus 200 in the closed state. The game apparatus 200 is able to take an image by means of an imaging section, display the taken image on a screen, and store data of the taken image. The game apparatus 200 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 200 will be described with reference to FIG. 15 to FIG. 16D. The game apparatus 200 includes a lower housing 211 and an upper housing 221 as shown in FIG. 15 to FIG. 16D. The lower housing 211 and the upper housing 221 are connected to each other so as to be openable and closable (foldable).

(Description of Lower Housing)

Initially, a structure of the lower housing 211 will be described. As shown in FIG. 15 to FIG. 16D, a lower LCD (Liquid Crystal Display) 212, a touch panel 213, operation buttons 214A to 214L, an analog stick 215, an LED 216A and an LED 216B, an insertion opening 217, and a microphone hole 218 are provided in the lower housing 211. Hereinafter, these components will be described in detail.

As shown in FIG. 15, the lower LCD 212 is accommodated in the lower housing 211. The number of pixels of the lower LCD 212 may be, for example, 320 dots×240 dots (the horizontal line×the vertical line). The lower LCD 212 is a display device for displaying an image in a planar manner (not in a stereoscopically visible manner), which is different from the upper LCD 222 described below. Although an LCD is used as a display device in the second embodiment, any other display device such as a display device using an EL (Electro Luminescence), or the like may be used. In addition, a display device having any resolution may be used as the lower LCD 212.

As shown in FIG. 15, the game apparatus 200 includes the touch panel 213 as an input device. The touch panel 213 is mounted on the screen of the lower LCD 212. In the second embodiment, the touch panel 213 is, but is not limited to, a resistive film type touch panel. A touch panel of any type such as electrostatic capacitance type may be used. In the second embodiment, the touch panel 213 has the same resolution (detection accuracy) as that of the lower LCD 212. However, the resolution of the touch panel 213 and the resolution of the lower LCD 212 may not necessarily be the same. Further, the insertion opening 217 (indicated by dashed lines in FIG. 15 and FIG. 16D) is provided on the upper side surface of the lower housing 211. The insertion opening 217 is used for accommodating a touch pen 228 which is used for performing an operation of the touch panel 213. Although an input on the touch panel 213 is usually made by using the touch pen 228, a finger of a user may be used for making an input on the touch panel 213, in addition to the touch pen 228.

The operation buttons 214A to 214L are each an input device for making a predetermined input. As shown in FIG. 15, among the operation buttons 214A to 214L, a cross button 214A (a direction input button 214A), a button 214B, a button 214C, a button 214D, a button 214E, a power button 214F, a selection button 214J, a HOME button 214K, and a start button 214L are provided on the inner side surface (main surface) of the lower housing 211. The cross button 214A is cross-shaped, and includes buttons for indicating an upward, a downward, a leftward, or a rightward direction. The buttons 214A to 214E, the selection button 214J, the HOME button 214K, and the start button 214L are assigned functions, respectively, in accordance with a program executed by the game apparatus 200, as necessary. For example, the cross button 214A is used for selection operation and the like, and the operation buttons 214B to 214E are used for, for example, determination operation and cancellation operation. The power button 214F is used for powering the game apparatus 200 on/off.

The analog stick 215 is a device for indicating a direction. The analog stick 215 has a top, corresponding to a key, which is configured to slide parallel to the inner side surface of the lower housing 211. The analog stick 215 acts in accordance with a program executed by the game apparatus 200. For example, when a game in which a predetermined object emerges in a three-dimensional virtual space is executed by the game apparatus 200, the analog stick 215 acts as an input device for moving the predetermined object in the three-dimensional virtual space. In this case, the predetermined object is moved in a direction in which the top corresponding to the key of the analog stick 215 slides. As the analog stick 215, a component which enables an analog input by being tilted by a predetermined amount, in any direction, such as the upward, the downward, the rightward, the leftward, or the diagonal direction, may be used.

Further, the microphone hole 218 is provided on the inner side surface of the lower housing 211. Under the microphone hole 218, a microphone 242 (see FIG. 17) is provided as a sound input device described below, and the microphone 242 detects for a sound from the outside of the game apparatus 200.

As shown in FIG. 16B and FIG. 16D, an L button 214G and an R button 214H are provided on the upper side surface of the lower housing 211. The L button 214G and the R button 214H act as shutter buttons (imaging instruction buttons) of the imaging section, for example. Further, as shown in FIG. 16A, a sound volume button 214I is provided on the left side surface of the lower housing 211. The sound volume button 214I is used for adjusting a sound volume of a speaker of the game apparatus 200.

As shown in FIG. 16A, a cover section 211C is provided on the left side surface of the lower housing 211 so as to be openable and closable. Inside the cover section 211C, a connector (not shown) is provided for electrically connecting between the game apparatus 200 and an external data storage memory 245. The external data storage memory 245 is detachably connected to the connector. The external data storage memory 245 is used for, for example, recording (storing) data of an image taken by the game apparatus 200.

Further, as shown in FIG. 16D, an insertion opening 211D, through which an external memory 244 having a game program stored therein is inserted, is provided on the upper side surface of the lower housing 211, and a connector (not shown) for electrically connecting between the game apparatus 200 and the external memory 244 in a detachable manner is provided inside the insertion opening 211D. A predetermined game program is executed by connecting the external memory 244 to the game apparatus 200.

Further, as shown in FIG. 15 and FIG. 16C, the first LED 216A for notifying a user of an ON/OFF state of a power supply of the game apparatus 200 is provided on the lower side surface of the lower housing 211, and the second LED 216B for notifying a user of an establishment state of a wireless communication of the game apparatus 200 is provided on the right side surface of the lower housing 211. The game apparatus 200 can make wireless communication with other devices, and the second LED 216B is lit up when the wireless communication is established. The game apparatus 200 has a function of connecting to a wireless LAN in a method based on, for example, IEEE 802.11.b/g standard. A wireless switch 219 for enabling/disabling the function of the wireless communication is provided on the right side surface of the lower housing 211 (see FIG. 16C).

A rechargeable battery (not shown) acting as a power supply for the game apparatus 200 is accommodated in the lower housing 211, and the battery can be charged through a terminal provided on a side surface (for example, the upper side surface) of the lower housing 211.

(Description of Upper Housing)

Next, a structure of the upper housing 221 will be described. As shown in FIG. 15 to FIG. 16D, an upper LCD (Liquid Crystal Display) 222, an outer imaging section 223 (an outer imaging section (left) 223a and an outer imaging section (right) 223b), an inner imaging section 224, a 3D adjustment switch 225, and a 3D indicator 226 are provided in the upper housing 221. Hereinafter, these components will be described in detail.

As shown in FIG. 15, the upper LCD 222 is accommodated in the upper housing 221. The number of pixels of the upper LCD 222 may be, for example, 800 dots×240 dots (the horizontal line×the vertical line). Although, in the second embodiment, the upper LCD 222 is an LCD, a display device using an EL (Electro Luminescence), or the like may be used. In addition, a display device having any resolution may be used as the upper LCD 222.

The upper LCD 222 is a display device capable of displaying a stereoscopically visible image. Further, in the present embodiment, a left-eye image and a right-eye image are displayed by using substantially the same display area. Specifically, the upper LCD 222 is a display device using a method in which the left-eye image and the right-eye image are alternately displayed in the horizontal direction in predetermined units (for example, every other line). Alternatively, the upper LCD 222 may be a display device using a method in which the left-eye image and the right-eye image are alternately displayed for a predetermined time period and the left-eye image and the right-eye image are viewed by the left eye and the right eye, respectively by using glasses. In the present embodiment, the upper LCD 222 is a display device capable of displaying an image which is stereoscopically visible by the naked eye, and a lenticular lens type display device or a parallax barrier type display device is used which enables the left-eye image and the right-eye image, which are alternately displayed in the horizontal direction, to be separately viewed by the left eye and the right eye, respectively. In the second embodiment, the upper LCD 222 of a parallax barrier type is used. The upper LCD 222 displays, by using the right-eye image and the left-eye image, an image (a stereoscopic image) which is stereoscopically visible by the naked eye. That is, the upper LCD 222 allows a user to view the left-eye image with her/his left eye, and the right-eye image with her/his right eye by utilizing a parallax barrier, so that a stereoscopic image (a stereoscopically visible image) exerting a stereoscopic effect on a user can be displayed. Further, the upper LCD 222 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye). Thus, the upper LCD 222 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 225 described below.

Two imaging sections (223a and 223b) provided on the outer side surface (the back surface reverse of the main surface on which the upper LCD 222 is provided) 221D of the upper housing 221 are generically referred to as the outer imaging section 223. The imaging directions of the outer imaging section (left) 223a and the outer imaging section (right) 223b are each the same as the outward normal direction of the outer side surface 221D. The outer imaging section (left) 223a and the outer imaging section (right) 223b can be used as a stereo camera depending on a program executed by the game apparatus 200. Each of the outer imaging section (left) 223a and the outer imaging section (right) 223b includes an imaging device, such as a CCD image sensor or a CMOS image sensor, having a common predetermined resolution, and a lens. The lens may have a zooming mechanism.

The inner imaging section 224 is positioned on the inner side surface (main surface) 21B of the upper housing 221, and acts as an imaging section which has an imaging direction which is the same direction as the inward normal direction of the inner side surface. The inner imaging section 224 includes an imaging device, such as a CCD image sensor and a CMOS image sensor, having a predetermined resolution, and a lens. The lens may have a zooming mechanism.

The 3D adjustment switch 225 is a slide switch, and is used for switching a display mode of the upper LCD 222 as described above. Further, the 3D adjustment switch 225 is used for adjusting the stereoscopic effect of a stereoscopically visible image (stereoscopic image) which is displayed on the upper LCD 222. A slider 225a of the 3D adjustment switch 225 is slidable to any position in a predetermined direction (along the longitudinal direction of the right side surface), and a display mode of the upper LCD 222 is determined in accordance with the position of the slider 225a. Further, a manner in which the stereoscopic image is visible is adjusted in accordance with the position of the slider 225a. Specifically, an amount of shift in the horizontal direction between a position of a right-eye image and a position of a left-eye image is adjusted in accordance with the position of the slider 225a.

The 3D indicator 226 indicates whether or not the upper LCD 222 is in the stereoscopic display mode. The 3D indicator 226 is implemented as an LED, and is lit up when the stereoscopic display mode of the upper LCD 222 is enabled. The 3D indicator 226 may be lit up only when the program processing for displaying a stereoscopically visible image is performed in a state where the upper LCD 222 is in the stereoscopic display mode.

Further, a speaker hole 221E is provided on the inner side surface of the upper housing 221. A sound is outputted through the speaker hole 221E from a speaker 243 described below.

(Internal Configuration of Game Apparatus 200)

Figure 17:
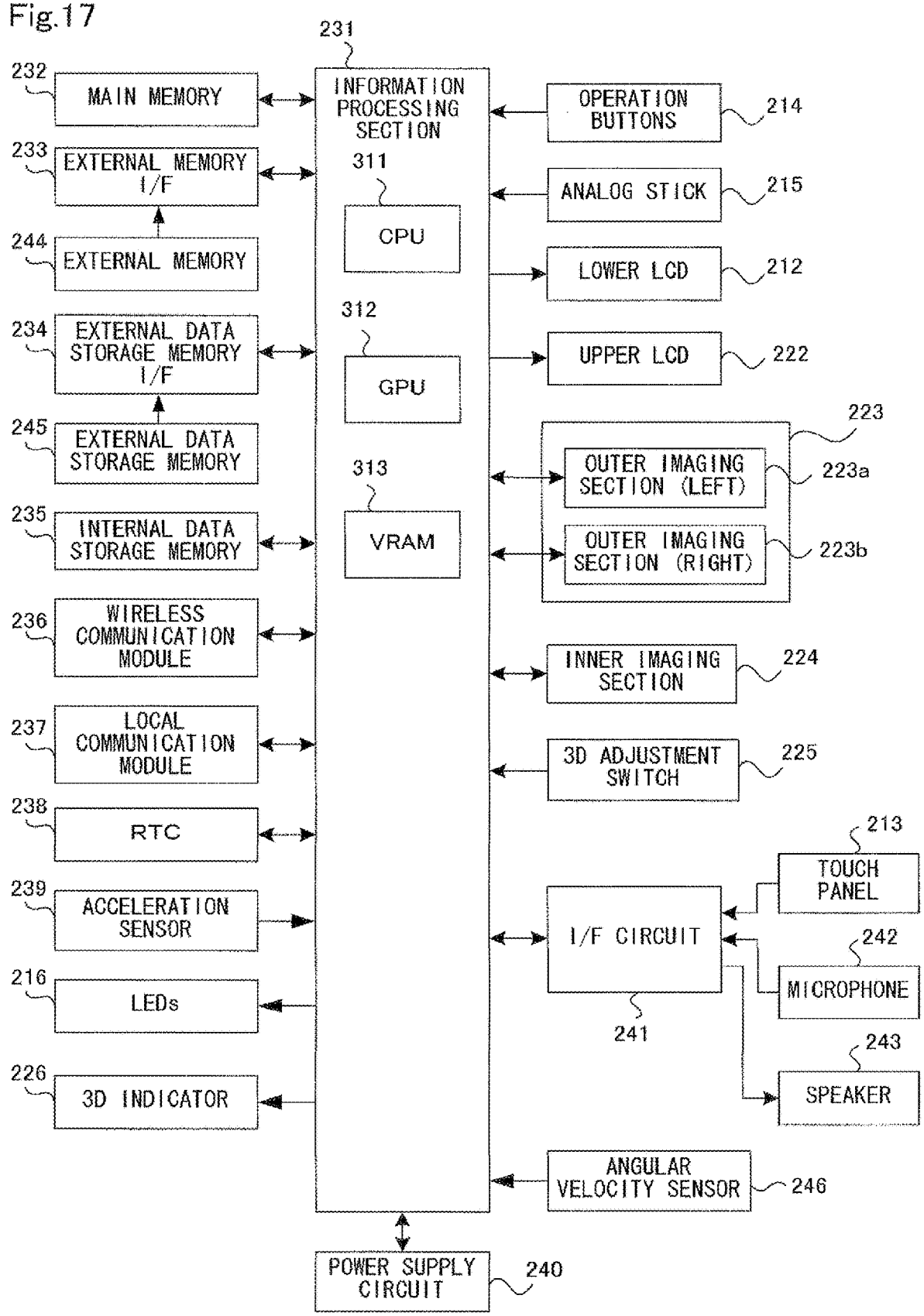
FIG. 17 is a block diagram illustrating an internal configuration of the game apparatus 200.

Next, an internal electrical configuration of the game apparatus 200 will be described with reference to FIG. 17. FIG. 17 is a block diagram illustrating an internal configuration of the game apparatus 200. As shown in FIG. 17, the game apparatus 200 includes, in addition to the components described above, electronic components such as an information processing section 231, a main memory 232, an external memory interface (external memory I/F) 233, an external data storage memory I/F 234, an internal data storage memory 235, a wireless communication module 236, a local communication module 237, a real-time clock (RTC) 238, an acceleration sensor 239, a power supply circuit 240, an interface circuit (I/F circuit) 241, and the like. These electronic components are mounted on an electronic circuit substrate, and accommodated in the lower housing 211 (or the upper housing 221).

The information processing section 231 is information processing means which includes a CPU (Central Processing Unit) 311 for executing a predetermined program, a GPU (Graphics Processing Unit) 312 for performing image processing, and the like. The CPU 311 of the information processing section 231 executes a process according to the program by executing a program stored in a memory (for example, the external memory 244 connected to the external memory I/F 233 or the internal data storage memory 235) inside the game apparatus 200. The program executed by the CPU 311 of the information processing section 231 may be acquired from another device through communication with the other device. The information processing section 231 further includes a VRAM (Video RAM) 313. The GPU 312 of the information processing section 231 generates an image in accordance with an instruction from the CPU 311 of the information processing section 231, and renders the image in the VRAM 313. The GPU 312 of the information processing section 231 outputs the image rendered in the VRAM 313, to the upper LCD 222 and/or the lower LCD 212, and the image is displayed on the upper LCD 222 and/or the lower LCD 212.

To the information processing section 231, the main memory 232, the external memory I/F 233, the external data storage memory I/F 234, and the internal data storage memory 235 are connected. The external memory I/F 233 is an interface for detachably connecting to the external memory 244. The external data storage memory I/F 234 is an interface for detachably connecting to the external data storage memory 245.

The main memory 232 is volatile storage means used as a work area and a buffer area for (the CPU 311 of) the information processing section 231. That is, the main memory 232 temporarily stores therein various types of data used for the process based on the program, and temporarily stores therein a program acquired from the outside (the external memory 244, another device, or the like), for example. In the second embodiment, for example, a PSRAM (Pseudo-SRAM) is used as the main memory 232.

The external memory 244 is non-volatile storage means for storing a program executed by the information processing section 231. The external memory 244 is implemented as, for example, a read-only semiconductor memory. When the external memory 244 is connected to the external memory I/F 233, the information processing section 231 can load a program stored in the external memory 244. A predetermined process is performed by the program loaded by the information processing section 231 being executed. The external data storage memory 245 is implemented as a non-volatile readable and writable memory (for example, a NAND flash memory), and is used for storing predetermined data. For example, images taken by the outer imaging section 223 and/or images taken by another device are stored in the external data storage memory 245. When the external data storage memory 245 is connected to the external data storage memory I/F 234, the information processing section 231 loads an image stored in the external data storage memory 245, and the image can be displayed on the upper LCD 222 and/or the lower LCD 212.

The internal data storage memory 235 is implemented as a non-volatile readable and writable memory (for example, a NAND flash memory), and is used for storing predetermined data. For example, data and/or programs downloaded through wireless communication via the wireless communication module 236 are stored in the internal data storage memory 235.

The wireless communication module 236 has a function of connecting to a wireless LAN by using a method based on, for example, IEEE 802.11.b/g standard. The local communication module 237 has a function of performing wireless communication with the same type of game apparatus in a predetermined communication method (for example, communication through a unique protocol, or infrared communication). The wireless communication module 236 and the local communication module 237 are connected to the information processing section 231. The information processing section 231 can perform data transmission to and data reception from another device via the Internet by using the wireless communication module 236, and can perform data transmission to and data reception from the same type of another game apparatus by using the local communication module 237.

The acceleration sensor 239 is connected to the information processing section 231. The acceleration sensor 239 detects magnitudes of accelerations (linear accelerations) in the directions of the straight lines along the three axial (xyz axial) directions, respectively. The acceleration sensor 239 is provided inside the lower housing 211. In the acceleration sensor 239, as shown in FIG. 15, the long side direction of the lower housing 211 is defined as x axial direction, the short side direction of the lower housing 211 is defined as y axial direction, and the direction orthogonal to the inner side surface (main surface) of the lower housing 211 is defined as z axial direction, thereby detecting magnitudes of the linear accelerations for the respective axes. The acceleration sensor 239 is, for example, an electrostatic capacitance type acceleration sensor. However, another type of acceleration sensor may be used. The acceleration sensor 239 may be an acceleration sensor for detecting a magnitude of acceleration for one axial direction or two axial directions. The information processing section 231 can receive data (acceleration data) representing accelerations detected by the acceleration sensor 239, and detect an orientation and a motion of the game apparatus 200.

The RTC 238 and the power supply circuit 240 are connected to the information processing section 231. The RTC 238 counts time, and outputs the time to the information processing section 231. The information processing section 231 calculates a current time (date), based on the time counted by the RTC 238. The power supply circuit 240 controls power from the power supply (the rechargeable battery accommodated in the lower housing 211 as described above) of the game apparatus 200, and supplies power to each component of the game apparatus 200.

The I/F circuit 241 is connected to the information processing section 231. The microphone 242 and the speaker 243 are connected to the I/F circuit 241. Specifically, the speaker 243 is connected to the I/F circuit 241 through an amplifier (not shown). The microphone 242 detects user's voice, and outputs a sound signal to the I/F circuit 241. The amplifier amplifies the sound signal outputted from the I/F circuit 241, and a sound is outputted from the speaker 243. The touch panel 213 is connected to the I/F circuit 241. The I/F circuit 241 includes a sound control circuit for controlling the microphone 242 and the speaker 243 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 213, and outputs the touch position data to the information processing section 231. The touch position data represents a coordinate of a position, on an input surface of the touch panel 213, on which an input is made. The touch panel control circuit reads a signal outputted from the touch panel 213, and generates the touch position data every predetermined time. The information processing section 231 acquires the touch position data to recognize a position on which an input is made on the touch panel 213.

The operation button 214 includes the operation buttons 214A to 214L described above, and is connected to the information processing section 231. Operation data representing an input state of each of the operation buttons 214A to 214I is outputted from the operation button 214 to the information processing section 231, and the input state indicates whether or not each of the operation buttons 214A to 214I has been pressed. The information processing section 231 acquires the operation data from the operation button 214 to perform a process in accordance with the input on the operation button 214.

The lower LCD 212 and the upper LCD 222 are connected to the information processing section 231. The lower LCD 212 and the upper LCD 222 each display an image in accordance with an instruction from (the GPU 312 of) the information processing section 231. In the second embodiment, the information processing section 231 displays a stereoscopic image (stereoscopically visible image) on the upper LCD 222.

Specifically, the information processing section 231 is connected to an LCD controller (not shown) of the upper LCD 222, and causes the LCD controller to set the parallax barrier to ON or OFF. When the parallax barrier is set to ON in the upper LCD 222, an right-eye image and a left-eye image, which are stored in the VRAM 313 of the information processing section 231, are outputted to the upper LCD 222. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the images for a right eye and the images for a left eye each of which is a rectangle-shaped image having one line of pixels aligned in the vertical direction, and an image, in which the rectangle-shaped left-eye image which is obtained through the division, and the rectangle-shaped right-eye image which is obtained through the division are alternately aligned, is displayed on the screen of the upper LCD 222. A user views the images through the parallax barrier in the upper LCD 222, so that the right-eye image is viewed with the user's right eye, and the left-eye image is viewed with the user's left eye. Thus, the stereoscopically visible image is displayed on the screen of the upper LCD 222.

The outer imaging section 223 and the inner imaging section 224 are connected to the information processing section 231. The outer imaging section 223 and the inner imaging section 224 each take an image in accordance with an instruction from the information processing section 231, and output data of the taken image to the information processing section 231.

The 3D adjustment switch 225 is connected to the information processing section 231. The 3D adjustment switch 225 transmits to the information processing section 231 an electrical signal in accordance with the position of the slider 225a.

The 3D indicator 226 is connected to the information processing section 231. The information processing section 231 controls whether or not the 3D indicator 226 is to be lit up. For example, the information processing section 231 lights up the 3D indicator 226 when the upper LCD 222 is in the stereoscopic display mode.

Further, the angular velocity sensor 246 is connected to the information processing section 231. The angular velocity sensor 246 detects an angular velocity about each axis (x axis, y axis, and z axis). The game apparatus 200 can calculate an orientation of the game apparatus 200 in real space, in accordance with an angular velocity sequentially detected by the angular velocity sensor 246. Specifically, the game apparatus 200 can calculate an angle of rotation of the game apparatus 200 about each axis by integrating, with time, the angular velocity about each axis, which is detected by the angular velocity sensor 246. This is the end of the description of the internal configuration of the game apparatus 200.

(Outline of Game of Second Embodiment)

Figure 18:
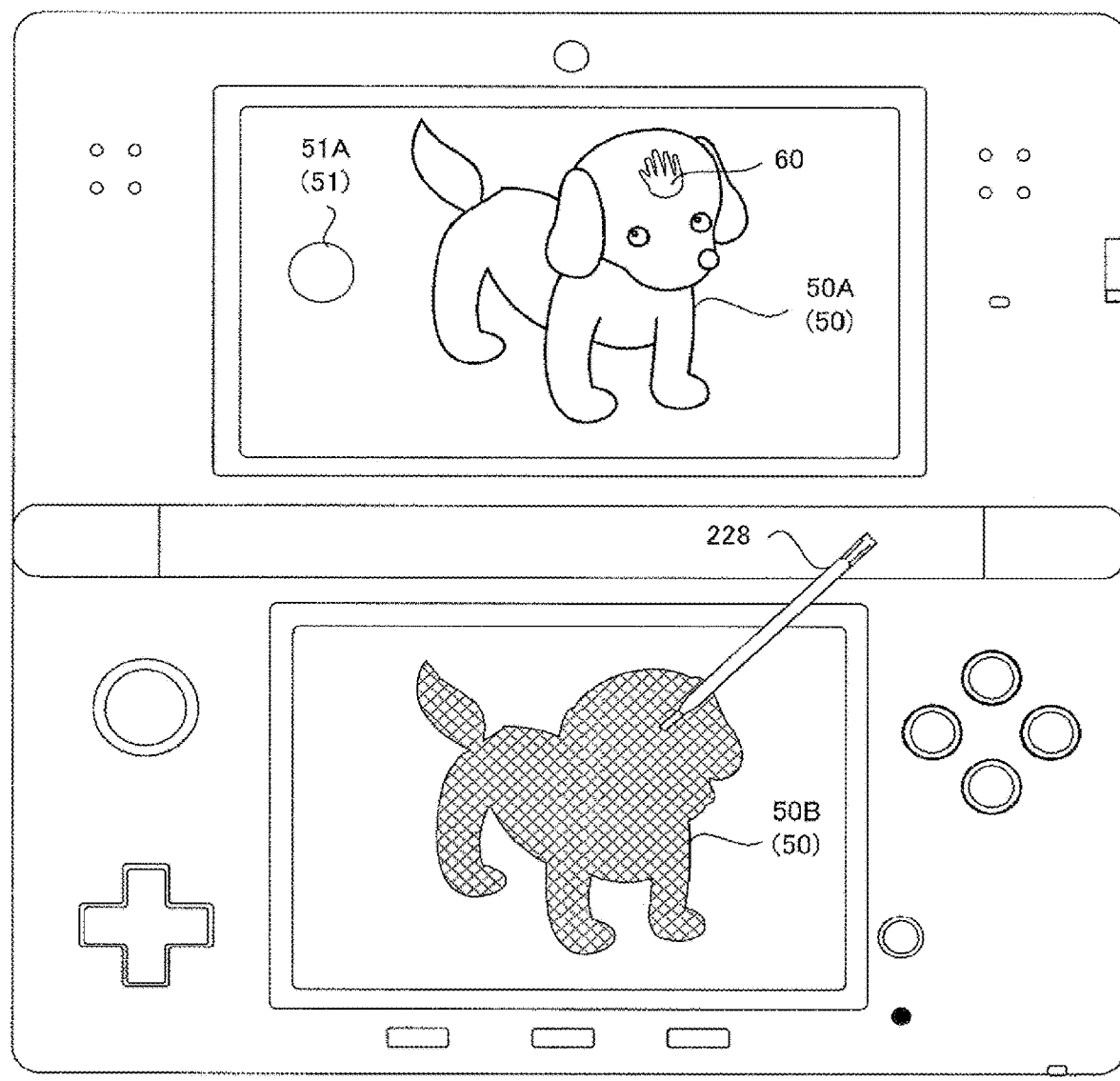
FIG. 18 is a diagram illustrating an example of game images displayed on respective screens of an upper LCD 222 and a lower LCD 212, while a game according to a second embodiment is being executed.

Next, an outline of a game according to the second embodiment will be described, with reference to FIG. 18 and FIG. 19. FIG. 18 is a diagram illustrating an example of game images displayed on the respective screens of the upper LCD 222 and the lower LCD 212, while the game according to the second embodiment is being executed. In the game according to the second embodiment, causing a dog object 50 to move in response to a touch operation of the touch panel 213 (the lower LCD 212) gives a user a feel of touching or playing with a dog.

As shown in FIG. 18, on the upper LCD 222, a stereoscopic image 50A is displayed, in which the dog object 50 representing a dog is displayed stereoscopically (displayed in a stereoscopically visible manner). The dog object 50 is a virtual object set in a three-dimensional virtual space (a space represented by XYZ coordinate system (world coordinate system)). The stereoscopic image 50A is an image taken of the dog object 50, which exists in the virtual space, by a virtual stereo camera (virtual cameras at the left and at the right; first and second virtual cameras) set in the virtual space. The left-eye image and the right-eye image are taken by the virtual stereo camera to be displayed on the upper LCD 222, and thereby the dog object 50 is stereoscopically displayed. Also, on the upper LCD 222, a stereoscopic image 51A stereoscopically displaying a ball object 51, which exists in the virtual space, is displayed. The stereoscopic image 50A and the stereoscopic image 51A are displayed in 32-bit color, for example.

On the lower LCD 212, a silhouette image 50B, in which the silhouette of the dog object 50 is displayed, is displayed. The silhouette image 50B is an image taken of the dog object 50 by a virtual camera (a third virtual camera) set at the middle between the virtual cameras at the left and at the right which are components of the virtual stereo camera), and the silhouette of the dog object 50 is displayed in the image (displayed in monochrome). The ball object 51 is not displayed on the lower LCD 212. That is, on the lower LCD 212, only the dog object 50 to be operated is displayed, and other objects are not displayed.

If the user touches the silhouette image 50B displayed on the lower LCD 212 by using the touch pen 228, a cursor 60 indicating a touched position is displayed on the upper LCD 222. That is, the cursor 60 is displayed on the upper LCD 222 at a position corresponding to the touched position on the lower LCD 212. The cursor 60 is an object representing a human hand. If the user slides the touch pen 228 on the screen while the touch pen 228 is touching the lower LCD 212, the cursor 60 moves according to the movement of the touch pen 228. In addition, the dog object 50 moves according to the movement of the touch pen 228 (the movement of the cursor 60). For example, as shown in FIG. 18, if the user moves the touch pen 228 alternately back and forth in the up-down directions while the head of the dog object 50 is being touched by the touch pen 228, the cursor 60 also moves alternately back and forth in the up-down direction of the upper LCD 222. This movement of the cursor 60 corresponds to the user's action tapping the dog object 50 on the head. In response to the user's action, the dog object 50 behaves such that the dog object 50 is joyous in being tapped on the head, for example.

Figure 19:
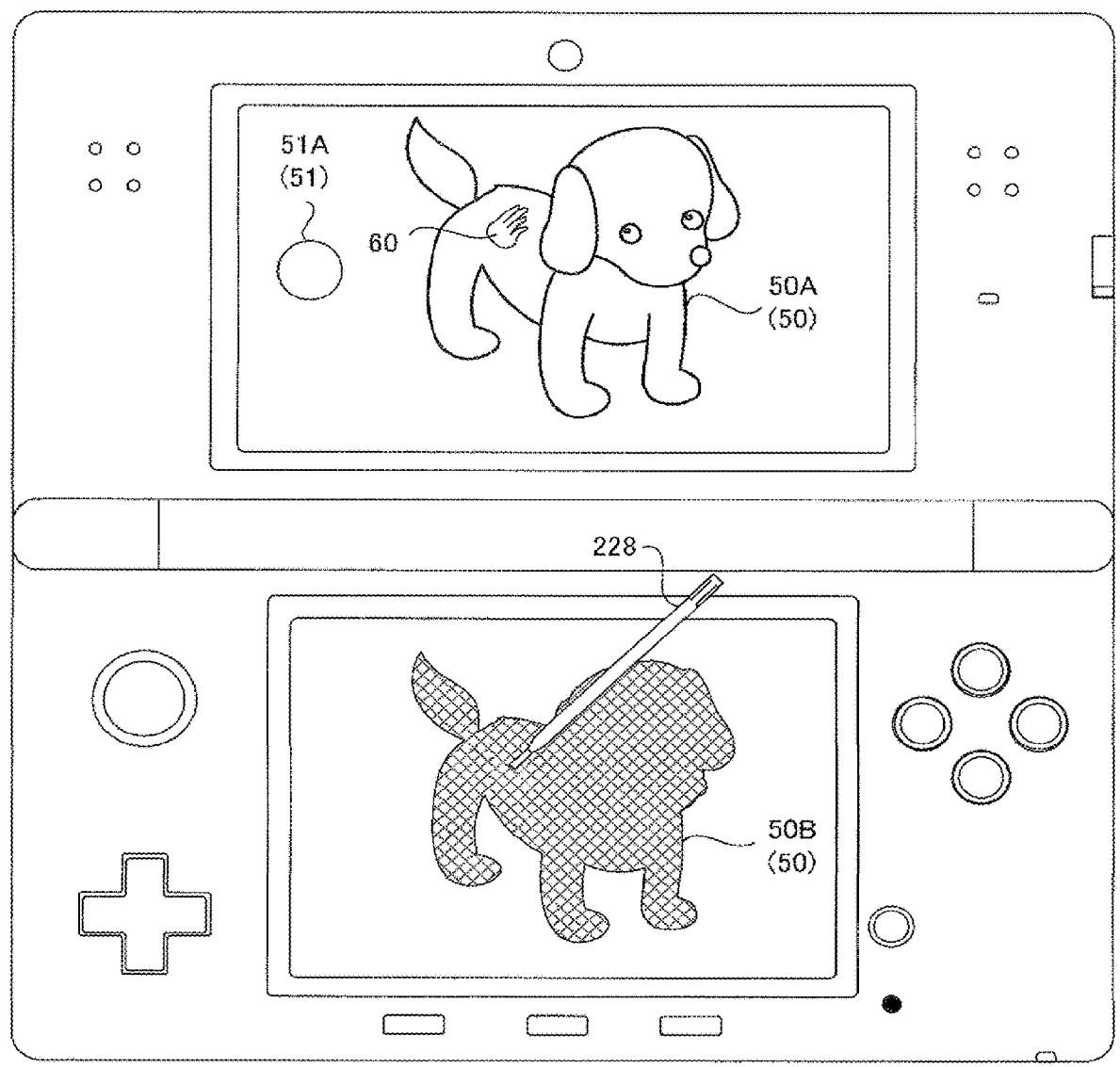
FIG. 19 is a diagram illustrating a state in which a user touches the back area of a dog object 50.

FIG. 19 is a diagram illustrating a state in which the user touches the dog object 50 on the back area. As shown in FIG. 19, if the user touches the dog object 50 on the back area, the orientation of the cursor 60 changes, as compared to the case where the user touches on the head as shown in FIG. 18. Specifically, the cursor 60 is displayed so as to be along a surface of the touched part.

As described above, the user uses the touch pen 228 (or a finger) to touch the silhouette image 50B displayed on the lower LCD 212, and thereby operates the cursor 60 displayed on the upper LCD 222. The user then uses the cursor 60 to touch the dog object 50, and thereby operates the dog object 50.

(Details of Game Process)

Figure 20:
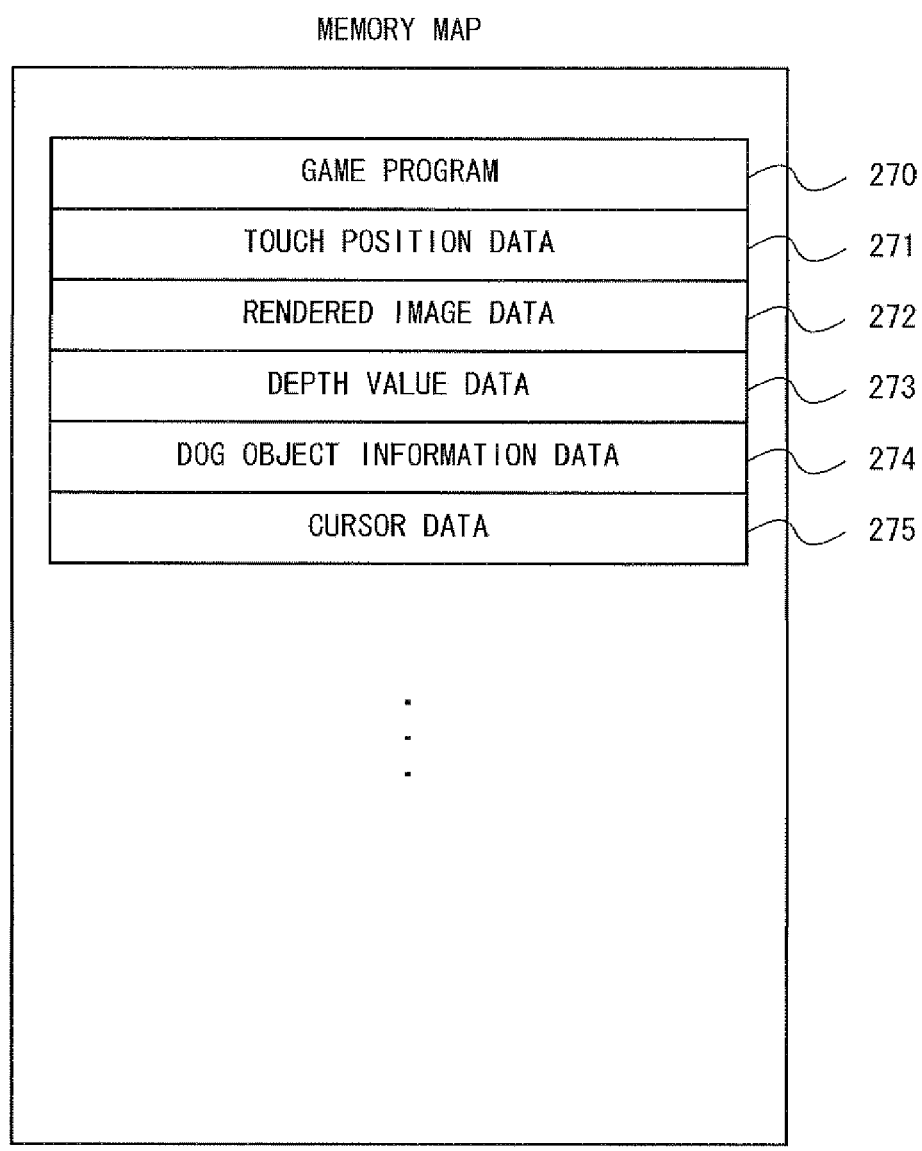
FIG. 20 is a diagram illustrating a memory map of a RAM (such as a main memory 232) of the game apparatus 200.

Next, how to determine the orientation of the cursor 60, and the process thereof in detail will be described, with reference to FIG. 20 to FIG. 22. Initially, a main data which are stored in the main memory 232 and the VRAM 313 (hereinafter, these components may be collectively called RAM) in the game process will be described. FIG. 20 is a diagram illustrating a memory map of the RAM (the main memory 232, or the like) of the game apparatus 200. As shown in FIG. 20, in the RAM, a game program 270, touch position data 271, rendered image data 272, depth value data 273, dog object information data 274, cursor data 275, and the like are stored. Other data stored in the RAM are image data of the dog object 50, data regarding button operations performed by the user, and the like.

The game program 270 is a program for causing the information processing section 231 (the CPU 311) to execute a game process shown in a flowchart described below.

In the touch position data 271, a touch position T detected by the touch panel 213 is stored. Specifically, the touch position data 271 is an array having a given length, and a coordinate value (TxTy coordinate system) representing a position on the touch panel 213 (on the screen of the lower LCD 212) is stored in each element of the array. The TxTy coordinate system is, for example, a coordinate system having as its origin a lower left end of the lower LCD 212, in which a Tx coordinate axis and a Ty coordinate axis are set in the horizontal direction and the vertical direction of the lower LCD 212, respectively. In the touch position data 271, coordinate values, which represent touch positions detected by the touch panel 213, are stored in chronological order.

The rendered image data 272 is data which includes images displayed on the upper LCD 222 and the lower LCD 212. Specifically, the rendered image data 272 includes the left-eye image and the right-eye image, which are displayed on the upper LCD 222, and the silhouette image displayed on the lower LCD 212. Each image is generated by a display process described below, and stored in the RAM as the rendered image data 272.

In the depth value data 273, a depth value (a value which represents a position in a depth direction) for each pixel of the image displayed on the lower LCD 212 is stored. Specifically, the depth value data 273 is a two-dimensional array, in which the depth values of the respective pixels of the image displayed on the lower LCD 212 are arranged in a matrix. The depth value for each pixel of the image displayed on the lower LCD 212 is stored in each element of the two-dimensional array.

The dog object information data 274 is data which indicates a position in the virtual space, a shape, or the like of the dog object 50. Specifically, the dog object information data 274 includes information regarding the position of the dog object 50 in the virtual space (the XYZ coordinate system), each part (see FIG. 23) of the dog object 50, and the like.

The cursor data 275 is data which indicates the position in the virtual space and the orientation of the cursor 60. The position of the cursor 60 is the position in the three-dimensional virtual space, which corresponds to the position touched by the user on the touch panel 213. The orientation of the cursor 60 indicates an orientation of the cursor 60 in the virtual space.

(Game Process of Second Embodiment)

Next, the game process will be described in detail, with reference to FIG. 21 to FIG. 27. FIG. 21 is a main flowchart showing in detail the game process according to the second embodiment. When the game apparatus 200 is powered on, the information processing section 231 (the CPU 311) of the game apparatus 200 executes a boot program stored in the ROM to initialize each unit, such as the main memory 232. Next, the RAM (specifically, the main memory 232) reads the game program 70 stored in a non-volatile memory (the external memory 244 or the like; the computer-readable storage medium), and the CPU 311 of the information processing section 231 starts executing the program. The information processing section 231 (the CPU 311 or the GPU 312) performs the process shown in the flowchart in FIG. 21 after the completion of the above-mentioned process.

Figure 21:
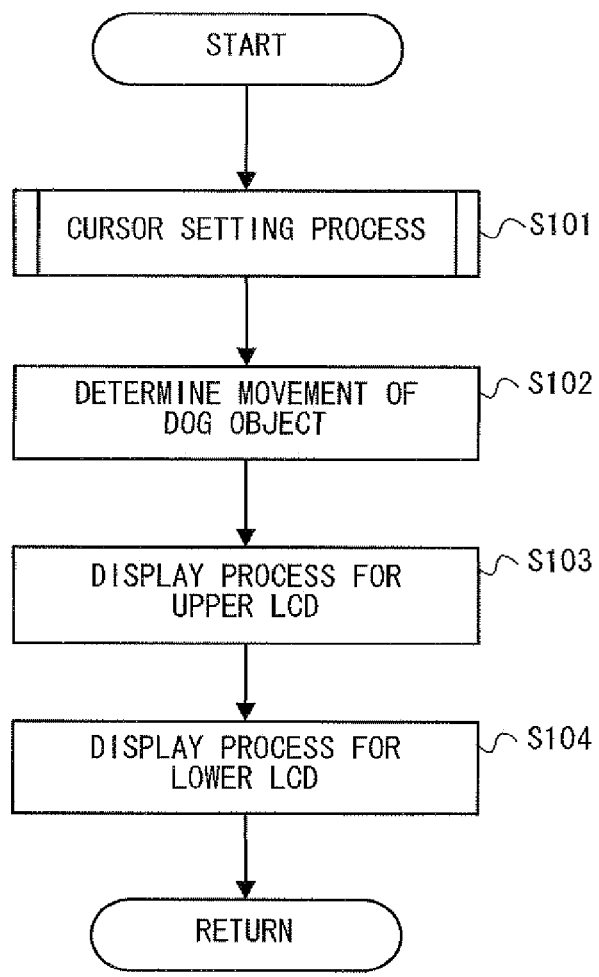
FIG. 21 is a main flowchart showing in detail a game process according to the second embodiment.
Figure 22:
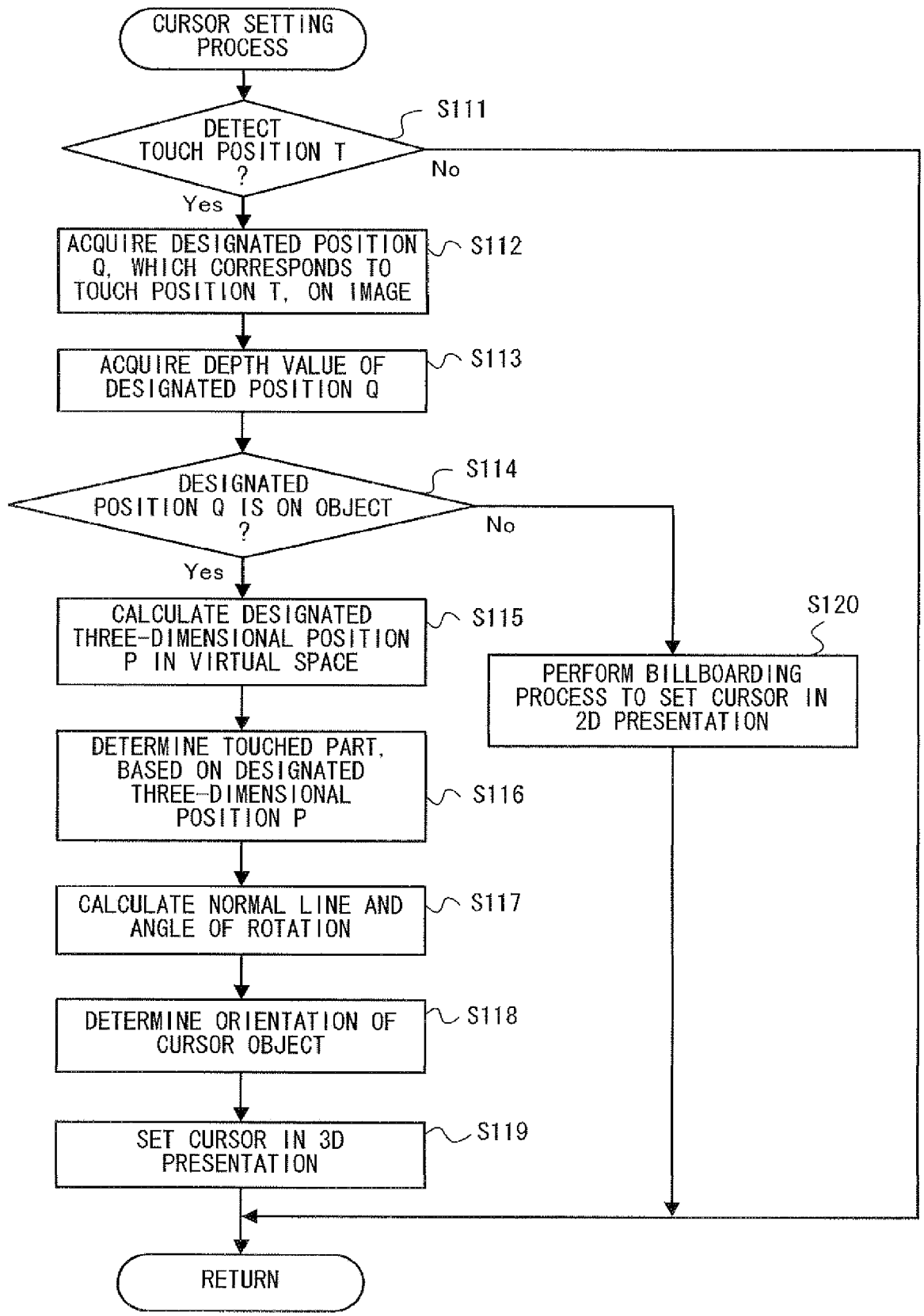
FIG. 22 is a flowchart showing in detail a cursor setting process (step S101)

The description of processes, which does not directly relate to the present invention, is omitted in FIG. 21. A processing loop of step S101 through step S104 shown in FIG. 21 is repeatedly executed for each frame (for example, 1/30 second or 1/60 seconds, which is referred to as frame time).

Initially, in step S101, the information processing section 231 executes a cursor setting process. Here, the position in the virtual space and the orientation of the cursor 60 are calculated based on the touch position detected by the touch panel 213. The cursor setting process performed in step S101 will be described in detail, with reference to FIG. 22. FIG. 22 is a flowchart showing in detail the cursor setting process (step S101).

In step S111, the information processing section 231 determines whether or not the touch panel 213 has detected the touch position T. If the touch panel 213 has detected the touch position T, the information processing section 231 stores the touch position T (Tx, Ty) in the touch position data 271 as latest touch position, and executes a process of step S112. On the other hand, if the touch position T is not detected by the touch panel 213, the information processing section 231 ends the cursor setting process shown in FIG. 22.

In step S112, the information processing section 231 acquires a designated position Q on the image, which corresponds to the touch position T detected in step S111 on the touch panel 213. Here, the designated position Q indicates a position, on the image displayed on the lower LCD 212, which corresponds to the touch position T. Specifically, the information processing section 231 transforms the coordinates of the touch position T detected by the touch panel 213 in step S111 to acquire the designated position Q (Qx, Qy) on the image.

If the display screen (and the touch panel 213) of the lower LCD 212 and the image displayed on the lower LCD 212 (that is, an image generated in step S104 described below) have the same size as each other, the touch position T coincides with the designated position Q. On the other hand, if the image displayed on the lower LCD 212 is greater in size than the display screen of the lower LCD 212 (and the touch panel 213), the touch position T is converted according to a ratio of the size, and the designated position Q is obtained. As described above, the touch position T and the designated position Q, which correspond to each other in a one-to-one fashion, indicate positions represented by two different coordinate systems, respectively.

Hereinafter, the position, which is detected by the touch panel 213, and which is represented by the coordinate system of the touch panel 213, is denoted as the "touch position T", and the position, which corresponds to the touch position T, and which is represented by the coordinate system of the image displayed on the lower LCD 212, is denoted as the "designated position Q". Also, the position, which corresponds to the designated position Q, and which is represented by the coordinate system (the XYZ coordinate system) of the three-dimensional virtual space, is denoted as the "designated three-dimensional position P". The information processing section 231 next executes a process of step S113.

In step S113, the information processing section 231 acquires the depth value (a Z value) in the designated position Q. Specifically, the information processing section 231 refers to the depth value data 273 to acquire the depth value of the pixel at the designated position Q (Qx, Qy). In step S104 described below, the depth value (the position in the depth direction) for each pixel of the image is stored in the depth value data 273, when the image is displayed on the lower LCD 212. Here, the information processing section 231 refers to the depth value data 273 updated in a previous frame in step S104 to acquire the depth value stored in the depth value data 273. Next, a process of step S114 is executed.

In step S114, the information processing section 231 determines whether or not the designated position Q is on the dog object 50. That is, the information processing section 231 determines whether or not the designated position Q acquired in step S112 falls within the silhouette image 50B of the dog object 50 displayed on the lower LCD 212. For example, the information processing section 231 refers to the depth value data 273 to determine whether or not the depth value of the pixel at the designated position Q falls within a predetermined range. As described above, the depth value data 273 is the data which indicates the depth values of respective pixels of the image displayed on the lower LCD 212. In the image displayed on the lower LCD 212, only the dog object 50 to be operated is displayed. Therefore, the depth value (0.9 through 1.0, for example) in the predetermined range is stored in the depth value data 273 for each pixel in an area (a display area of the silhouette image 50B) in which the dog object 50 is displayed, and a predetermined depth value (0, for example) is stored in the depth value data 273 for an area in which the dog object 50 is not displayed. Thus, the information processing section 231 can determine whether or not the dog object 50 has been touched by using the depth value data 273. If the determination result is affirmative, a process of step S115 is next executed. If the determination result is negative, a process of step S120 is next executed.

In step S115, the information processing section 231 calculates the designated three-dimensional position P (X, Y, Z). Specifically, the information processing section 231 calculates the designated three-dimensional position P in the virtual space, based on the designated position Q (Qx, Qy) acquired in step S112 and the depth value (the Z value) acquired in step S113. The designated position Q is the position on the image displayed on the lower LCD 212. The positions in the up-down and left-right directions (the X-axis and Y-axis directions in the camera coordinate system), in which the virtual space is viewed from the third virtual camera, are calculated, based on the designated position Q. The depth value acquired in step S113 is the depth value at the designated position Q on the image displayed on the lower LCD 212, and represents a position in the depth direction (the imaging direction; Z-axis direction in the camera coordinate system) in which the virtual space is viewed from the third virtual camera. Thus, the position in the depth direction of the third virtual camera is calculated based on the depth value. That is, the three-dimensional position in the virtual space is converted to a two-dimensional position on the image by a viewing transformation and a projective transformation. Therefore, the three-dimensional position in the virtual space can be obtained by a reverse transformation which uses the two-dimensional position (the positions in the up-down and left-right directions of the third virtual camera) on the image and its depth value (the position in the imaging direction of the third virtual camera). More specifically, the information processing section 231 uses an inverse matrix of a perspective projection transformation matrix and an inverse matrix of a viewing matrix of the third virtual camera to calculate the designated three-dimensional position P (X, Y, Z) in the virtual space. The information processing section 231 then stores the calculated designated three-dimensional position P in the RAM as the cursor data 275. Next, the information processing section 231 executes a process of step S116.

In step S116, the information processing section 231 determines the touched part, based on the designated three-dimensional position P. The dog object 50 is formed by a plurality of parts, and the touched part is determined in step S116.

Figure 23:
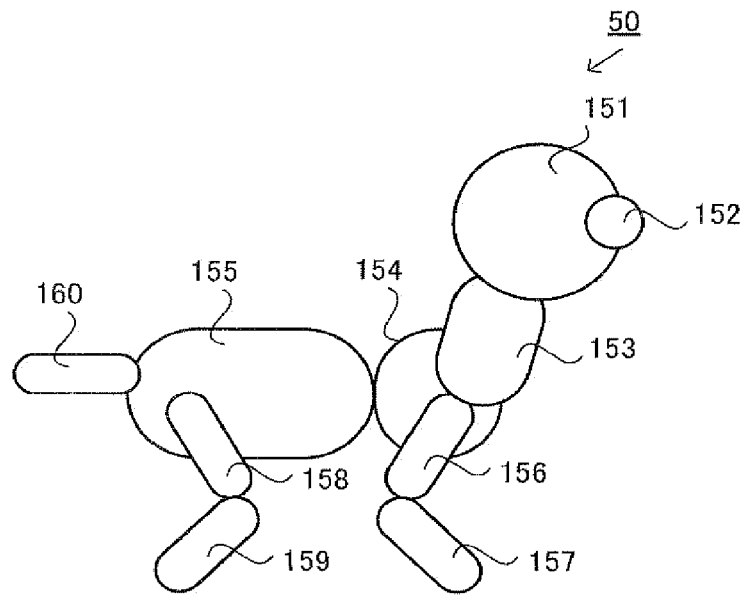
FIG. 23 is a diagram illustrating how the dog object 50 is formed of a plurality of parts.
Figure 24:
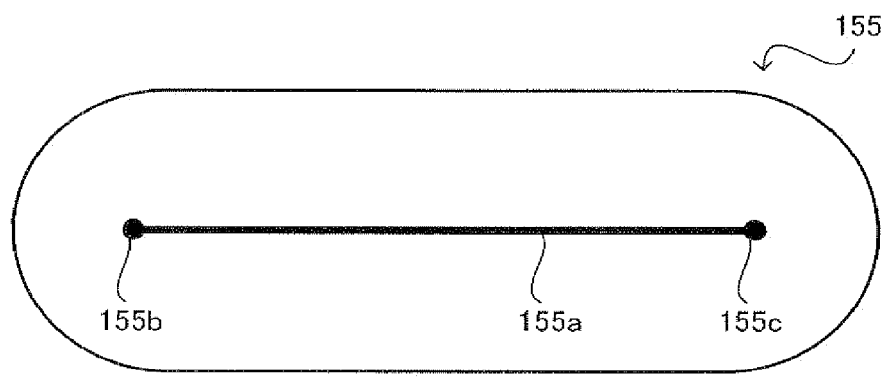
FIG. 24 is a diagram illustrating in detail a part 155 of the rear half of the dog object 50.

FIG. 23 is a diagram illustrating a state in which the dog object 50 is formed by the plurality of parts. As shown in FIG. 23, the dog object 50 is formed by the plurality of parts, and a part 151 forms the head, and a part 155 forms a rear half of the dog, for example. In the dog object information data 274, information regarding each part is included. Each part has a spherical shape, a cylindrical shape, a capsule shape (the part 155 shown in FIG. 23, for example), or the like. More specifically, each part is represented by a line segment (bone), and defined by determining a distance from the line segment to a point on a surface of the part. FIG. 24 is a diagram illustrating in detail the part 155, which is the rear half of the dog. As shown in FIG. 24, the part 155 is represented by a line segment 155a which connects a point 155b and a point 155c. Information regarding the part 155, among the dog object information data 274 includes the position and length (coordinate values of the point 155b and the point 155c in the three-dimensional virtual space) of the line segment 155a, and a distance from the line segment 155a to a point on the surface of the part 155.

The information processing section 231 refers to the dog object information data 274 to search for a line segment (bone) closest to the designated three-dimensional position P, thereby determines the touched part. Next, the information processing section 231 executes a process of step S117.

In step S117, the information processing section 231 calculates a normal line at the designated three-dimensional position P and an angle of rotation. Specifically, the information processing section 231 calculates a line, which passes through the designated three-dimensional position P, and which is normal to the surface of the touched part.

Figure 25A:
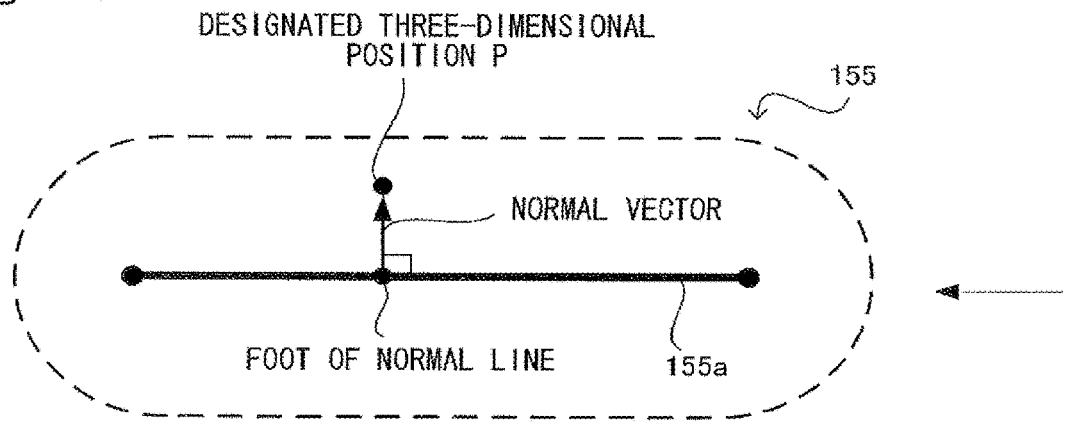
FIG. 25A is a diagram of the touched part 155 viewed from the front, illustrating a normal vector on the part 155 at a designated three-dimensional position P.
Figure 25B:
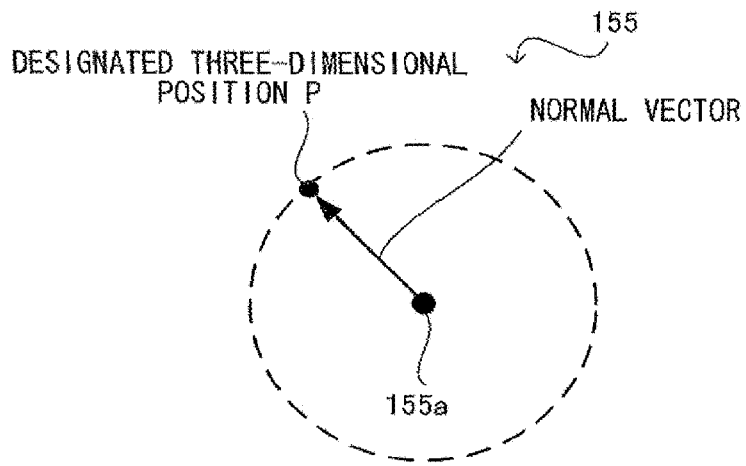
FIG. 25B is a diagram of the part 155 viewed from a direction as indicated by an arrow shown in FIG. 25A, illustrating the normal vector on the part 155 at the designated three-dimensional position P.

FIG. 25A is a diagram of the touched part 155 viewed from the front thereof, and illustrates a normal vector at the designated three-dimensional position P on the part 155. FIG. 25B is a diagram of the part 155 viewed from a direction as indicated by an arrow shown in FIG. 25A, and illustrates the normal vector at the designated three-dimensional position P on the part 155. As shown in FIG. 25A and FIG. 25B, the information processing section 231 calculates a foot of the normal line extending from the designated three-dimensional position P toward the line segment 155a in order to calculate a vector extending from the foot of the normal line toward the designated three-dimensional position P as the normal vector. The normal vector calculated as such is a vector normal to the surface of the part 155. A method of calculating the normal line at the designated three-dimensional position P on the touched part is not limited to as described above and may be any method.

Figure 26:
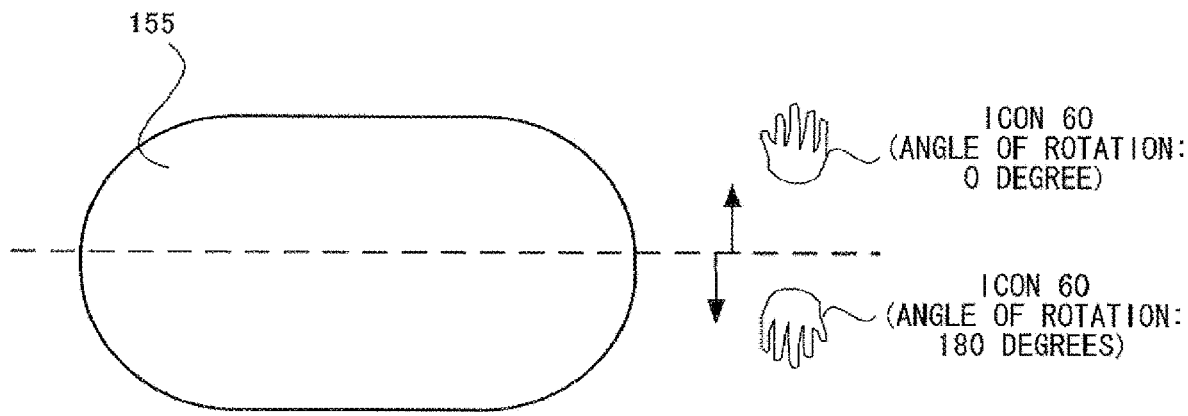
FIG. 26 is a diagram illustrating a determination of an angle of rotation of an icon 60, depending on an area in which the designated three-dimensional position P exists in the part 155, when the part 155 is touched.

In step S117, the information processing section 231 calculates the angle of rotation of the cursor 60, based on the designated three-dimensional position P. The angle of rotation of the cursor 60 to be calculated here is an angle which indicates rotation about the normal vector. The angle of rotation of the cursor 60 is determined based on the designated three-dimensional position P relative to the touched part. FIG. 26 is a diagram illustrating, in the case where the part 155 has been touched, how the angle of rotation is determined depending on the location of the designated three-dimensional position P in an area in the part 155. As shown in FIG. 26, for example, if an upper half of the part 155 has been touched, the angle of rotation of the cursor 60 is set to 0 degree. If a lower half of the part 155 has been touched, the angle of rotation of the cursor 60 is set to 180 degrees.

After the calculation of the normal line and the angle of rotation, the information processing section 231 executes a process of step S118.

In step S118, the information processing section 231 determines the orientation of the cursor 60 in the virtual space, based on the normal line and the angle of rotation calculated in step S117. Specifically, the information processing section 231 arranges the cursor 60 in the virtual space such that the cursor 60 is normal to the normal line calculated in step S117, and rotates the cursor 60 about the normal line by the angle of rotation calculated in step S117. The information processing section 231 then stores the determined orientation in the RAM as the cursor data 275. When the orientation of the cursor 60 is thus detected and the cursor 60 is displayed on the upper LCD 222, the cursor 60 is displayed so as to be along the surface of the part touched by the user (such that the palm contacts the surface of the part). The information processing section 231 next executes a process of step S119.

In step S119, the information processing section 231 sets the cursor 60 to 3D mode. Specifically, the information processing section 231 sets data which indicates a display mode of the cursor 60 to 3D display mode and stores the data in the RAM. The cursor 60 is stereoscopically displayed on the upper LCD 222 by performing a display process (step S103) described below for the upper LCD 222. In this case, the cursor 60 is displayed so as to be along the surface of the touched part, and for example, when the touched part is displayed in a front direction with respect to the screen of the upper LCD 222, the cursor 60 is also displayed so as to be arranged in the front direction with respect to the screen. After the process of step S119, the information processing section 231 ends the process of the flowchart shown in FIG. 22.

On the other hand, in step S120, the information processing section 231 sets the cursor 60 to 2D mode. Specifically, the information processing section 231 sets the data which indicates the display mode of the cursor 60 to 2D display mode, and stores the data in the RAM. The cursor 60 is displayed on the upper LCD 222 by the display process (step S103) described below for the upper LCD 222 being performed.

Figure 27:
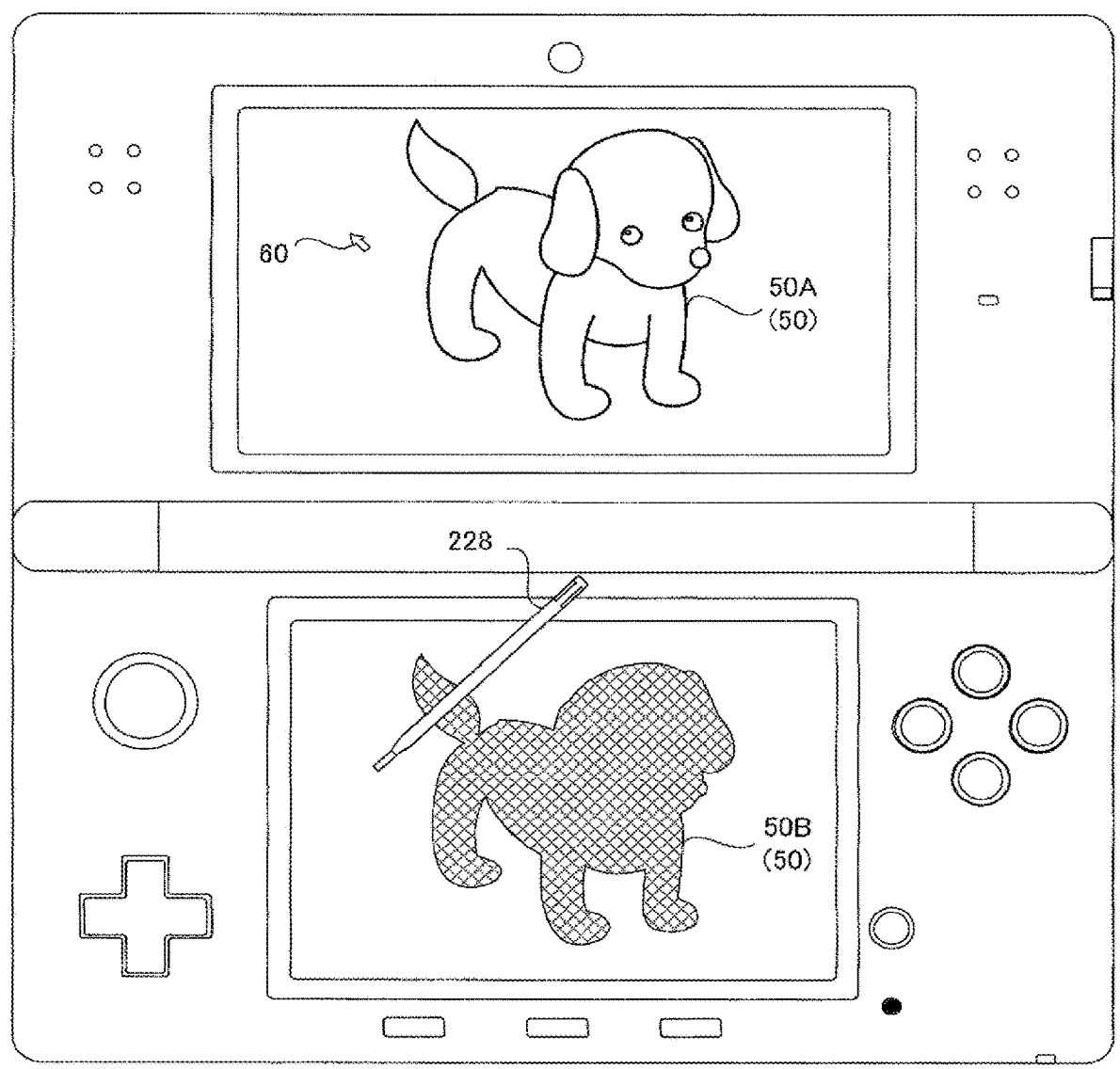
FIG. 27 is a diagram illustrating an example of the screens in a case where the dog object 50 is not touched when the touch panel 213 has detected a touch.

FIG. 27 is a diagram illustrating an example of screens in the case where the dog object 50 is not touched when the touch panel 213 has detected a touch. As shown in FIG. 27, if an area different from the display area of the silhouette image 50B of the dog object 50 is touched, the cursor 60 is displayed on the upper LCD 222 at a position corresponding to the touch position T (the designated position Q). Here, the billboarding process is performed on the cursor 60, and the cursor 60 is displayed as a planar arrow-shaped cursor. Moreover, the cursor 60 is displayed so as to be arranged on the screen of the upper LCD 222 (that is, when the left-eye image and the right-eye image are displayed on the upper LCD 222, the display position of the cursor 60 in the left-eye image coincides with the display position of the cursor 60 in the right-eye image). After the process of step S120 is performed, the information processing section 231 ends the process of the flowchart shown in FIG. 22.

Returning to FIG. 21, the information processing section 231 executes a process of step S102 after the process of step S101.

In step S102, the information processing section 231 determines the movement of the dog object 50. Specifically, on the basis of the touch position T (the designated position Q) acquired in step S101, the information processing section 231 determines an operation performed on the dog object 50 and determines the movement of the dog object 50 according to the determination result. Next, the information processing section 231 executes a process of step S103.

In step S103, the information processing section 231 performs the display process for the upper LCD 222. Specifically, the information processing section 231 causes the dog object 50 to move according to the determination made in step S102. Furthermore, the information processing section 231 arranges the cursor 60 in the virtual space, according to the result of the cursor setting process made in step S101. For example, if the setting has been made in the cursor setting process to set the cursor to 3D display mode (that is, if the process of step S119 has been performed), the cursor object 60 is arranged in the virtual space in the orientation determined in step S118 at the designated three-dimensional position P calculated in step S115. The information processing section 231 then takes images of the dog object 50, the ball object 51, and the cursor object 60 by the virtual stereo camera (the virtual cameras at the left and at the right; the first and the second cameras) set in the virtual space. Thus, the left-eye image and the right-eye image taken of the virtual space including the dog object 50, the ball object 51, and the cursor object 60 are generated. The information processing section 231 then outputs the generated the left-eye image and the right-eye image to the upper LCD 222. Next, the information processing section 231 executes a process of step S104.

In step S104, the information processing section 231 performs the display process for the lower LCD 212. Specifically, the information processing section 231 takes the image of the dog object 50 by using the virtual camera (the third virtual camera) arranged at the middle position between the virtual cameras at the left and at the right which are the components of the virtual stereo camera. Here, a setting is made so that the silhouette of the dog object 50 is displayed, and other objects, which are the ball object 51 and the cursor object 60, are set hidden. Therefore, only the silhouette image 50B of the dog object 50 is displayed on the lower LCD 212. More specifically, the information processing section 231 uses the viewing matrix of the virtual camera (the third virtual camera) to perform the viewing transform on the coordinates of the dog object 50 represented in the XYZ coordinate system and further performs the projective transformation on the dog object 50 by using a projection matrix. Therefore, the image (the silhouette image 50B shown in FIG. 18 and FIG. 19) of the dog object 50 taken by the third virtual camera is generated. In addition, the information processing section 231 stores the depth value (the Z value), which is obtained by generating the image, in the RAM as the depth value data 273. The information processing section 231 then outputs the generated image to the lower LCD 212. The third virtual camera is not necessarily set at the middle between the virtual cameras at the left and at the right, which are the components of the virtual stereo camera, and may be set at any position between the virtual cameras at the left and at the right. This is the end of the description of the flowchart shown in FIG. 21.

The order of the process is not limited to the one shown in FIG. 21, and for example, the cursor setting process may be performed after the respective display processes for the upper LCD and the lower LCD. Although, in the above description, the cursor 60 is arranged in the virtual space by using the depth value of the image already displayed on the lower LCD 212, in order to arrange the cursor 60 in the virtual space, the third virtual camera may be used to take the image of the virtual space, and thereby the image and the depth value may be generated. That is, the image of the virtual space may be taken by the third virtual camera before the cursor setting process is performed, and, by using the taken image and the depth value, the cursor 60 may be arranged in the virtual space. After the cursor 60 is arranged in the virtual space, the image of the virtual space may be again taken by the third virtual camera, and the taken image may be displayed on the lower LCD 212.

As described above, in the second embodiment, the touch position T is detected by the touch panel 213, and by using the designated position Q on the image, which corresponds to the touch position T, and the depth value of the designated position Q, the designated three-dimensional position P in the virtual space is obtained. The cursor 60 is then arranged at the designated three-dimensional position P. The orientation of the cursor 60 is set based on the normal line on the touched part at the designated three-dimensional position P. Therefore, the cursor 60 can be arranged in the virtual space at the position corresponding to the designated position Q.

In the second embodiment, because the designated three-dimensional position P in the virtual space is calculated by using the depth value calculated in the display process for the lower LCD 212, the position, which corresponds to the touch position T, in the three-dimensional virtual space can be obtained without the necessity of complex calculations. For example, to obtain the position in the three-dimensional virtual space, which corresponds to the touch position T detected by the touch panel 213, it is considered to obtain the position in the three-dimensional virtual space by geometric calculations. That is, a three-dimensional straight line extending from the touch position T toward the imaging direction of the virtual camera is calculated to determine whether or not the three-dimensional straight line contacts with any of the parts of the dog object 50. If there is a part with which three-dimensional straight line contacts, a point at which the part and three-dimensional straight line intersects with each other is obtained as the position, which corresponds to the touch position T, in the three-dimensional virtual space. However, in such a geometric method, the calculation becomes complex and thus the processing burden increases. For example, if a portion, which connects the parts each other, is touched, unless the designated three-dimensional position P is accurately obtained, the cursor 60 may be hidden when displayed on the screen, depending on the part on which the cursor 60 exists. Therefore, the designated three-dimensional position P needs to be accurately obtained. However, in geometric methods, the more accurately the designated three-dimensional position P must be obtained, the more strictly the shape of a virtual model (the dog object) needs to be defined. Thus, geometric methods require more complex calculation to more accurately obtain the designated three-dimensional position P, causing an increase in the processing burden. On the other hand, according to the method of the second embodiment, because the depth value, which is obtained in the display process, is used, no special calculation is required to accurately obtain the designated three-dimensional position P in the three-dimensional virtual space, which corresponds to the touch position T detected by the touch panel 213. Furthermore, because the designated three-dimensional position P is calculated by using the designated position Q on the image already displayed and the depth value at the designated position Q of the image, the calculated designated three-dimensional position P is a portion of the touched part which is displayed on the screen. Therefore, calculating the designated three-dimensional position P by using the method according to the second embodiment to arrange and display the cursor 60 at the designated three-dimensional position P displays the cursor 60 on the surface of the part.

Also, in the second embodiment, the cursor 60 is displayed so as to be along the surface of the touched part. That is, in the second embodiment, the orientation of the cursor 60 is determined based on the normal line of the part, at the designated three-dimensional position P, of the dog object 50. The cursor 60 is displayed by being arranged in the three-dimensional virtual space so as to be along the surface of the part, which is designated by the user, of the dog object 50, thereby giving the user a feel of touching the dog object 50.

(Modification)

In the second embodiment, the silhouette image of the dog object 50 is displayed on the lower LCD 212, and the stereoscopic image of the dog object 50 is displayed on the upper LCD 222. In another embodiment, a planar image may be displayed on the upper LCD 222, instead of the stereoscopic image. Also, the same image as displayed on the upper LCD 222 may be displayed on the lower LCD 212, instead of the silhouette image.

Further, in the second embodiment, the designated three-dimensional position P in the virtual space is calculated by using the depth value of the image displayed on the lower LCD 212. In another embodiment, the designated three-dimensional position P may be calculated by using the depth value of either of the left-eye image and the right-eye image which are displayed on the upper LCD 222.

Further, in the second embodiment, the depth value for each pixel of the image displayed on the lower LCD 212 is stored. In another embodiment, the depth value for each pixel needs not to be stored, and the depth value for each partial area formed of the plurality of pixels (a small rectangular area formed of four pixels, for example) may be stored.

Further, in another embodiment, the game apparatus 200 may be configured to include a single screen, instead of two screens. For example, the stereoscopic image (or the planar image) of the dog object 50 may be displayed on the display screen, and a position on the image (screen) may be designated by using a position designating means (a touch pad, a mouse, or the like, for example), which is different from the touch panel 213. Alternatively, a touch panel (the position designating means) may be provided on the screen of the game apparatus 200 configured to include the single screen, and a stereoscopic image may be displayed on the screen. In this case, the designated three-dimensional position in the three-dimensional virtual space is calculated, based on the designated position, which is designated by the position designating means, on the image (either of the left-eye image and the right-eye image, or the image taken by the virtual camera set between the virtual cameras at the left and at the right) and the depth value of the designated position. The cursor object 60 is then arranged at the calculated designated three-dimensional position and the image of the cursor object 60 is taken by the virtual camera, and thereby the cursor object 60 is displayed on the upper LCD 222.

Further, the game apparatus 200 may be configured to include a single screen, and the single screen may be divided in two areas. For example, in one of the two areas of the screen, a color image (the color image may or may not be a stereoscopic image) of the dog object 50 may be displayed, and in another of the two areas of the screen, the silhouette image of the dog object 50 may be displayed. The user may designate a position on the silhouette image displayed in the another of the two areas.

Further, in the second embodiment, the normal line of the designated part, among the plurality of pats of the dog object 50, is calculated, and the cursor object 60 formed in a shape of a hand is arranged such that the cursor object 60 is normal to the normal line. The cursor object 60 is then rotated about the normal line, according to the position on the designated part (the designated three-dimensional position relative to the designated part). In another embodiment, the angle of rotation of the cursor object 60 may be determined with consideration, for example, of the direction of movement of the cursor 60, or the like. For example, if the cursor 60 moves in the left-right directions of the screen, the cursor 60 may be rotated 90 degrees about the normal line.

Further, in another embodiment, not only the dog object 50, any game object (which is formed of one or more parts) may be displayed on the screen and the game object may be operated (given an instruction) by using the cursor 60.

Further, in the second embodiment, the cursor 60, which indicates the position designated by the user, is displayed. In another embodiment, any object, which is not limited to the cursor 60, may be arranged in the virtual space for display. That is, the designated three-dimensional position may be calculated based on the position designated by the user and the depth value of the designated position, and any object may be arranged at the calculated designated three-dimensional position.

Further, in another embodiment, the above-described display control method may be applied, not limited to the game apparatus, but also to any electronic apparatus, for example, PDAs (Personal Digital Assistant), advanced mobile phones, personal computers, and the like.

Further, in another embodiment, the game apparatus is not limited to the handheld game apparatus, and may be a stationary game apparatus including an input device for designating a position on the screen. This game apparatus displays a video on a television receiver (hereinafter, referred to as a television) or the like, and includes the input device for designating a position on a screen of the television. For example, by receiving the infrared radiation emitted from a marker section provided on the periphery of the television, the input device detects the position designated by the user on the television screen. Alternatively, the input device may emit the infrared radiation and a photodetector provided on the periphery of the television receives the infrared radiation emitted from the input device, and thereby the game apparatus detects the position designated by the user. As described above, the three-dimensional position in the virtual space may be calculated, and thereby the object may be arranged in the three-dimensional position by using the position designated on the screen by the user by the use of the input device, and the depth value (the depth value of the image displayed on the screen) of the position.

Further, in the second embodiment, the LCD capable of displaying the stereoscopic images which can be viewed by the naked eye is employed. In another embodiment, the present invention is applicable to viewing the stereoscopic images by means of glasses having the time division scheme or the deflecting scheme, the anaglyphic format (the red-blue glasses format), or the like.

Further, in another embodiment, the processes may be divided and performed by a plurality of information processing apparatuses communicatively connected by wire or wirelessly to each other, and thereby the display control system, which realizes the above display control method, may be constructed. For example, the position designating means, which is used by the user for designation of the position, may be configured to be separated from the information processing apparatus, and connected to the information processing apparatus wirelessly, or the like. The information processing apparatus and the display device may also be connected to each other, being configured to be separated from each other.

Further, the game process described above may be applied to online games. For example, the display device and the position designating means (such as the touch panel or the mouse), which designates a position on a screen of the display device, may be connected to a terminal, and the terminal and the server are connected to each other via the Internet to execute the game. In such online game, while the game advances by distributing processes between the terminal and the server, the processes may be distributed in any manner. For example, a game space may be built in the server, and the position of the dog object 50 in the game space is managed on the server. The user may use the position designating means to designate a position on the screen of the display device, while viewing an image displayed on the display device. For example, the terminal may acquire the position (the designated position Q) on the image displayed on the screen and the depth value at the position, based on the position (the touch position T) detected by the position designating means, and transmit, to the server, information including the position on the image and the depth value. On the basis of the information, the server may calculate the three-dimensional position in the virtual space and arrange the cursor object 60 in the virtual space (arrange the position and set the orientation of the cursor 60). Next, the server may cause the dog object 50 to move to change the position in the virtual space and the orientation of the dog object 50, and additionally, transmit, to the terminal, the information regarding the position and the orientation of the dog object and the information regarding the position and the orientation of the cursor object 60. On the basis of these pieces of information, the terminal may arrange the dog object and the cursor object in the virtual space, take an image of the virtual space by using the virtual camera, and display the taken image on the display device.

Further, in the embodiment described above, the processes in the flowcharts described above are performed by the information processing section 231 of the game apparatus 200 executing a predetermined program. In another embodiment, a part or the entirety of the processes may be performed by a dedicated circuit included in the game apparatus 200.

Further, the game program (information processing program) may be provided to the game apparatus 200 by being stored in, but not limited to the memory, but also in a computer-readable storage medium such as optical discs or magnetic discs. For example, the program may be stored in a RAM (storage medium) in a server on a network, and the program is provided to the game apparatus 200 by the game apparatus 200 connected to the network.

While the technology presented herein has been described in detail, the foregoing description is in all aspects illustrative and not restrictive. It is understood that numerous other modifications and variations can be devised without departing from the scope of the present technology.

What is claimed is:

1. A non-transitory computer-readable storage medium having stored therein a display control program having computer-executable code or instructions which, when executed by one or more processors of a computerized display control, causes the display control to function and perform operations comprising:
   generating a two-dimensional image of a three-dimensional virtual space taken by a virtual camera, the virtual space including an object;
   acquiring a designated position on the generated two-dimensional image, wherein the designated position on the generated two-dimensional image is provided via an input device;
   determining a position within the three-dimensional virtual space as viewed from the virtual camera which corresponds to the designated position;
   determining whether the position within the three-dimensional virtual space coincides with the object in the three-dimensional virtual space;
   producing a virtual designating object at the position in the three-dimensional virtual space; and
   displaying an image taken of the three-dimensional virtual space which includes the virtual designating object and the object arranged therein, where when the position does not coincide with the object, the virtual designating object is arranged in a predetermined orientation and
   wherein when the position coincides with the object, the virtual designating object is formed in a three-dimensional manner.

2. The non-transitory computer-readable storage medium having stored therein the display control program according to claim 1, wherein when the position coincides with the object, the display control program further causes the display control to perform operations comprising:
   determining, based on the position, an orientation of the virtual designating object; and
   displaying the image taken of the three-dimensional virtual space with the virtual designating object in the determined orientation.

3. The non-transitory computer-readable storage medium having stored therein the display control program according to claim 2, wherein the orientation of the virtual designating object is set along a surface of the object when the position coincides with the object.

4. The non-transitory computer-readable storage medium having stored therein the display control program according to claim 3, wherein when the virtual designating object is operated while on the surface of the object, the object changes in accordance with the operation.

5. The non-transitory computer-readable storage medium having stored therein the display control program according to claim 2, wherein the determined orientation is based on a location of the designated position with respect to the object when the position coincides with the object.

6. The non-transitory computer-readable storage medium having stored therein the display control program according to claim 1, further comprising:
   setting depth values to be associated with each pixel position in the two-dimensional image.

7. The non-transitory computer-readable storage medium having stored therein the display control program according to claim 6, further comprising:
   acquiring an associated depth value for a pixel of the generated two-dimensional image corresponding to the designated position;
   determining a spatial position in a depth direction in the three-dimensional virtual space as viewed from the virtual camera using the associated depth value, wherein the virtual designated object is produced at the determined spatial position.

8. The non-transitory computer-readable storage medium having stored therein the display control program according to claim 7, wherein the spatial position corresponds to a designated three-dimensional position in the three-dimensional virtual space, which is based on the designated position and the set depth values and wherein virtual designating object is produced at the designated three-dimensional position in the three-dimensional virtual space.

9. The non-transitory computer-readable storage medium having stored therein the display control program according to claim 8, wherein the designated three-dimensional position in the three-dimensional virtual space is determined based on a location of the designated position on the two-dimensional image in up-down and left-right direction in the three-dimensional virtual space as viewed from the virtual camera and the associated depth value.

10. A non-transitory computer-readable storage medium having stored therein a display control program having computer-executable code or instructions which, when executed by one or more processors of a computerized display control, causes the display control to function and perform operations comprising:
    generating a two-dimensional image of a three-dimensional virtual space taken by a virtual camera, the virtual space including an object;
    acquiring a designated position on the generated two-dimensional image, wherein the designated position on the generated two-dimensional image is provided via an input device;
    determining a position within the three-dimensional virtual space as viewed from the virtual camera which corresponds to the designated position;
    determining whether the position within the three-dimensional virtual space coincides with the object in the three-dimensional virtual space;
    producing a virtual designating object at the position in the three-dimensional virtual space; and
    displaying an image taken of the three-dimensional virtual space which includes the virtual designating object and the object arranged therein, where when the position does not coincide with the object, the virtual designating object is arranged in a predetermined orientation, wherein when the position does not coincide with the object, the virtual designating object is formed in a planar manner.

11. A non-transitory computer-readable storage medium having stored therein a display control program having computer-executable code or instructions which, when executed by one or more processors of a computerized display control, causes the display control to function and perform operations comprising:

generating a two-dimensional image of a three-dimensional virtual space taken by a virtual camera, the virtual space including an object;
setting depth values to be associated with each pixel position in the two-dimensional image;
acquiring a designated position on the generated two-dimensional image, wherein the designated position on the generated two-dimensional image is provided via an input device;
acquiring an associated depth value for a pixel of the generated two-dimensional image corresponding to the designated position;
determining a spatial position in a depth direction in the three-dimensional virtual space as viewed from the virtual camera using the associated depth value, wherein the spatial position corresponds to a designated three-dimensional position in the three-dimensional virtual space, which is based on the designated position and the set depth values;
determining whether the spatial position within the three-dimensional virtual space coincides with the object in the three-dimensional virtual space;
producing a virtual designating object at the spatial position in the three-dimensional virtual space; and
displaying an image taken of the three-dimensional virtual space which includes the virtual designating object and the object arranged therein, where when the spatial position does not coincide with the object, the virtual designating object is arranged in a predetermined orientation wherein when the spatial position within the three-dimensional virtual space does not coincide with the object, the designated three-dimensional position in the virtual space is determined based on the designated position and a constant depth value.

12. A non-transitory computer-readable storage medium having stored therein a display control program having computer-executable code or instructions which, when executed by one or more processors of a computerized display control, causes the display control to function and perform operations comprising:
generating a two-dimensional image of a three-dimensional virtual space taken by a virtual camera, the virtual space including an object;
acquiring a designated position on the generated two-dimensional image, wherein the designated position on the generated two-dimensional image is provided via an input device;
determining a position within the three-dimensional virtual space as viewed from the virtual camera which corresponds to the designated position;
determining whether the position within the three-dimensional virtual space coincides with the object in the three-dimensional virtual space;
producing a virtual designating object at the position in the three-dimensional virtual space; and
displaying an image taken of the three-dimensional virtual space which includes the virtual designating object and the object arranged therein, where when the position does not coincide with the object, the virtual designating object is arranged in a predetermined orientation, wherein when the position coincides with the object, the display control program further causes the display control to perform operations comprising:
determining, based on the position, an orientation of the virtual designating object; and
displaying the image taken of the three-dimensional virtual space with the virtual designating object in the determined orientation,
wherein the determined orientation is based on a location of the designated position with respect to the object when the position coincides with the object, and
wherein the object is formed of a plurality of parts, and wherein the determining of the orientation comprises determining a designated part from among the plurality of parts and wherein the determined orientation is based on the determined designated part.

13. The non-transitory computer-readable storage medium having stored therein the display control program according to claim 12, wherein the determined orientation is determined according to a normal line of the determined designated part.

14. The non-transitory computer-readable storage medium having stored therein the display control program according to claim 13, wherein the determining of the orientation comprises setting an angle of rotation of the virtual designating object according to the position relative to the determined designated part and rotating the virtual designating object about the normal line by the angle of rotation.

15. A display control method implemented using an information processing apparatus having one or more processors for controlling a displaying of an image on a display device, the method comprising:
generating a two-dimensional image of a three-dimensional virtual space taken by a virtual camera, the virtual space including an object;
acquiring a designated position on the generated two-dimensional image, wherein the designated position on the generated two-dimensional image is provided via an input device;
determining a position within the three-dimensional virtual space as viewed from the virtual camera which corresponds to the designated position;
determining whether the position within the three-dimensional virtual space coincides with the object in the three-dimensional virtual space;
producing a virtual designating object at the position in the three-dimensional virtual space; and
displaying an image taken of the three-dimensional virtual space which includes the virtual designating object and the object arranged therein, where when the position does not coincide with the object, the virtual designating object is arranged in a predetermined orientation and
wherein when the position coincides with the object, the virtual designating object is formed in a three-dimensional manner.

16. A display control system comprising:
a processing system, including at least one computer processor, the processing system being configured to;
generate a two-dimensional image of a three-dimensional virtual space taken by a virtual camera, the virtual space including an object;
acquire a designated position on the generated two-dimensional image, wherein the designated position on the generated two-dimensional image is provided via an input device;
determine a position within the three-dimensional virtual space as viewed from the virtual camera which corresponds to the designated position;

determine whether the position within the three-dimensional virtual space coincides with the object in the three-dimensional virtual space;

produce a virtual designating object at the position in the three-dimensional virtual space; and display an image taken of the three-dimensional virtual space which includes the virtual designating object and the object arranged therein, where when the position does not coincide with the object, the virtual designating object is arranged in a predetermined orientation, and wherein when the position coincides with the object, the virtual designating object is formed in a three-dimensional manner.

17. An apparatus comprising:

a display;

a touch panel;

at least one processor configured to:

generate a two-dimensional image of a three-dimensional virtual space taken by a virtual camera, the virtual space including an object acquire a designated position on the generated two-dimensional image, wherein the designated position on the generated two-dimensional image is provided via an input device on the touch panel;

determine a position within the three-dimensional virtual space as viewed from the virtual camera which corresponds to the designated position;

determine whether the position within the three-dimensional virtual space coincides with the object in the three-dimensional virtual space;

produce a virtual designating object at the position in the three-dimensional virtual space; and display an image taken of the three-dimensional virtual space which includes the virtual designating object and the object arranged therein on the display, where when the position does not coincide with the object, the virtual designating object is arranged in a predetermined orientation, and wherein when the position coincides with the object, the virtual designating object is formed in a three-dimensional manner.

* * * * *